(12) United States Patent
Nagasawa et al.

(10) Patent No.: US 9,919,671 B2
(45) Date of Patent: Mar. 20, 2018

(54) VEHICLE SEAT AIRBAG SYSTEM AND VEHICLE SEAT

(71) Applicant: Fuji Jukogyo Kabushiki Kaisha, Tokyo (JP)

(72) Inventors: Isamu Nagasawa, Tokyo (JP); Yoshihiro Kamata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/181,885

(22) Filed: Jun. 14, 2016

(65) Prior Publication Data

US 2016/0288759 A1    Oct. 6, 2016

Related U.S. Application Data

(62) Division of application No. 14/503,665, filed on Oct. 1, 2014, now Pat. No. 9,409,539.

(30) Foreign Application Priority Data

| Oct. 1, 2013 | (JP) | 2013-206794 |
| Oct. 1, 2013 | (JP) | 2013-206800 |
| Aug. 11, 2014 | (JP) | 2014-163516 |

(51) Int. Cl.
  *B60R 21/207*  (2006.01)
  *B60N 2/42*    (2006.01)
  (Continued)

(52) U.S. Cl.
  CPC ............ *B60R 21/207* (2013.01); *B60N 2/427* (2013.01); *B60N 2/4221* (2013.01);
  (Continued)

(58) Field of Classification Search
  CPC .......................................... B60R 2021/23153
  See application file for complete search history.

(56) References Cited

U.S. PATENT DOCUMENTS

| 2,834,606 A | 5/1958 | Betrand |
| 5,562,324 A | 10/1996 | Massara et al. |
(Continued)

FOREIGN PATENT DOCUMENTS

| DE | 10104456 A1 | 9/2002 |
| DE | 10201836 A1 | 8/2003 |
(Continued)

OTHER PUBLICATIONS

U.S. Notice of Allowance in U.S. Appl. No. 14/503,665 dated Apr. 15, 2016.
(Continued)

*Primary Examiner* — Nicole T Verley
(74) *Attorney, Agent, or Firm* — McGinn IP Law Group, PLLC.

(57) ABSTRACT

A vehicle seat airbag system includes an airbag which is caused by a vehicle seat airbag system to inflate and develop within a seat back. The airbag is disposed between a seat pad and a rear board provided in a rear of the seat back. Inflation and development of the airbag in the seat back allows the airbag to elastically support an upper body of a seated person, and causes the rear board to be pushed rearwardly to allow the airbag to elastically receive an impact force which is applied to the rear board.

15 Claims, 40 Drawing Sheets

(51) Int. Cl.
  *B60R 21/013* (2006.01)
  *B60R 21/0134* (2006.01)
  *B60N 2/60* (2006.01)
  *B60N 2/427* (2006.01)
  *B60R 21/0136* (2006.01)
  *B60R 21/01* (2006.01)
  *B60R 21/231* (2011.01)
  *B60R 21/00* (2006.01)

(52) U.S. Cl.
  CPC ......... *B60N 2/4228* (2013.01); *B60N 2/4279* (2013.01); *B60N 2/6009* (2013.01); *B60R 21/013* (2013.01); *B60R 21/0134* (2013.01); *B60R 21/0136* (2013.01); *B60R 2021/0032* (2013.01); *B60R 2021/0051* (2013.01); *B60R 2021/01231* (2013.01); *B60R 2021/23153* (2013.01); *B60R 2021/23161* (2013.01); *B60R 2021/23169* (2013.01)

(56) References Cited

U.S. PATENT DOCUMENTS

| | | | |
|---|---|---|---|
| 5,738,368 A * | 4/1998 | Hammond | B60N 2/68 280/730.1 |
| 5,782,529 A * | 7/1998 | Miller | B60R 21/207 280/730.1 |
| 5,902,010 A | 5/1999 | Cuevas | |
| 6,164,694 A * | 12/2000 | Yoshida | B60R 21/01504 280/735 |
| 6,390,549 B1 | 5/2002 | Mayer | |
| 6,557,887 B2 * | 5/2003 | Wohllebe | B60R 21/207 280/730.1 |
| 6,935,456 B2 | 8/2005 | Korechika | |
| 7,021,706 B2 | 4/2006 | Aufrere | |
| 8,231,138 B2 | 7/2012 | Sadr | |
| 8,393,667 B2 * | 3/2013 | Hashimoto | B60N 2/0276 296/65.16 |
| 9,573,554 B2 * | 2/2017 | Nagasawa | B60N 2/4228 |
| 9,586,552 B1 * | 3/2017 | Whitens | B60R 21/207 |
| 2012/0133114 A1 * | 5/2012 | Choi | B60R 21/214 280/728.2 |
| 2015/0091280 A1 | 4/2015 | Nagasawa | |
| 2015/0091281 A1 | 4/2015 | Nagasawa | |

FOREIGN PATENT DOCUMENTS

| | | |
|---|---|---|
| JP | S 47-030343 U | 12/1972 |
| JP | 10-273000 A | 10/1998 |
| JP | 2000-510078 A | 8/2000 |
| JP | 2007-320361 A | 12/2007 |
| JP | 2010-052621 A | 3/2010 |
| WO | WO 0055006 A1 | 9/2000 |

OTHER PUBLICATIONS

U.S. Office Action in U.S. Appl. No. 14/503,665 dated Feb. 11, 2016.
U.S. Office Action in U.S. Appl. No. 14/503,665 dated Oct. 21, 2015.
Japanese Office Action, dated Aug. 25, 2017, in Japanese Application No. 2014-163516 and English Translation thereof.
Chinese Office Action, dated Aug. 15, 2017, in Chinese Application No. 201410497435.1 and English Translation thereof.

* cited by examiner

VEHICLE SEAT AIRBAG SYSTEM AND VEHICLE SEAT

The present application is a Divisional Application of U.S. patent application Ser. No. 14/503,665, filed on Oct. 1, 2014, which is based on and claims priority from Japanese Patent Application No. 2013-206794 filed on Oct. 1, 2013, Japanese Patent Application No 2013-206800, filed on Oct. 1, 2013, and Japanese Patent Application No. 2014-163516, filed on Aug. 11, 2014, the entire contents of which are incorporated herein by reference.

BACKGROUND

1. Technical Field

The present disclosure relates to a vehicle seat airbag system and a vehicle seat, and particularly to a vehicle seat airbag system and a vehicle seat equipped with an airbag within a seat back of the seat.

2. Related Art

In a vehicle seat such as an automobile seat, an airbag system is known that protects a seated person against an impact at the time of a collision by inflation and development of an airbag which is disposed in a seat back For example, the vehicle seat disclosed in Japanese Unexamined Patent Application Publication (JP-A) No. 10-273000 includes a seat pad on the front surface of an elastic installation supporting member which is installed inward of a seat back frame, and an airbag in a contracted state is disposed in a space between the elastic installation supporting member and a supporting plate which is disposed rearwardly of the elastic installation supporting member and has a robust structure.

With this vehicle seat, an operation of an inflator corresponding to detection of an impact greater than or equal to a predetermined value causes the airbag to inflate between the elastic installation supporting member and the supporting plate so that rearward movement of a seated person at the time of a collision is elastically supported and regulated from the rear, and the impact energy is absorbed by pressure reduction and contraction of the airbag.

In Japanese Unexamined Patent Application Publication (JP-A) No. 2010-52621, a first airbag, which is designed to inflate and develop toward a seated person on the rear seat, is installed in the lower portion of the rear surface of the seat back of the front seat, and a second airbag in a flat state is disposed on the front surface of an elastic installation supporting member which is installed inside a seat back frame within the seat back of the front seat.

Consequently, an operation of an inflator corresponding to detection of an impact greater than or equal to a predetermined value causes the first airbag to inflate and develop toward a seated person on the rear seat, thus even when the seated person on the rear seat is moved forward due to an impact at the time of a collision, the seated person is prevented from strongly hitting the rear surface of the seat back of the front seat. Furthermore, rearward movement of the upper body of a seated person on the front seat at the time of a collision is elastically supported, regulated from the rear and protected by the inflation and development of the second airbag. The inflation timing for the first and second airbags is controlled, and an appropriate protection for a seated person is achieved.

As described above, the vehicle seat disclosed in JP-A No. 10-273000 achieves the protection of a seated person on the vehicle seat by the presence of the air bag and the supporting plate which is disposed outward rearwardly of the air bag and has a robust structure. That is, the impact of rearward movement of a seated person is reduced by the airbag, and an impact applied from the rear of the seat back is received by the supporting plate and is absorbed by the airbag.

Therefore, when a rear seat is present and a seated person is on the rear seat, a collision of the seated person with the front seat from the rear of the seat back causes a large impact when the seated person collides with the supporting plate. Therefore, an impact from the rear cannot be received softly, which may cause not only a damage to the knees of the seated person on the rear seat, but also a significant impact to the person on the front seat.

On the other hand, according to the airbag device in JP-A No. 2010-52621, protection of the seated person on the front seat and reduction in damage may be expected by the second airbag that inflates and develops within the seat back of the front seat. Also, protection of the seated person on the rear seat is achieved by the first airbag that inflates and develops toward the seated person on the rear seat. However, not only the airbag device needs to be provided within the seat back, but also the first airbag, which inflates and develops toward the seated person on the rear seat, needs to be separately provided in the lower portion of the seat bag of the front seat. Thus, the structure of the seat bag becomes more complicated and control load for each airbag increases.

In addition, the first airbag significantly expands diagonally upward from the lower portion of the rear surface of the seat back of the front seat toward the seated person on the rear seat, and thus the inflation and development pattern becomes unstable, which does not provide sufficient stability for accurately, reliably receiving a collision of the seated person on the rear seat with the seat back of the front seat, and for absorbing the impact.

As described above, in each structure of the above-described conventional arts, there is a possibility of further improvement on direct protection of the seated person on the front seat by the airbag and protection against an impact to the seat back from the rear by adopting a simple structure.

In a vehicle such as an automobile, such a collision of the knees of the seated person on the rear seat with the seat back of the front seat may occur not only at a front-end collision, but also in a situation where the seated person on the rear seat is pushed forward due to deformation of the rear part of the vehicle at the time of a rear-end collision and the knees of the seated person strongly collides with the rear surface of the seat back of the front seat.

SUMMARY OF THE INVENTION

The present disclosure has been made in view of the above-described problems and provides a vehicle seat airbag system and a vehicle seat that are capable of achieving direct protection of a seated person by an air bag at the time of a collision and accurate reduction in impact from the rear of the seat back without adopting a complicated configuration.

A first aspect of the disclosure provides a vehicle seat airbag system including: an airbag which is caused by the seat airbag system to inflate and develop within a seat back. The airbag is disposed between a seat pad and an outer layer of a rear of the seat back, and the inflation and development of the airbag in the seat back allows the airbag to elastically support an upper body of a seated person and to elastically receive an impact force which is applied to the rear of the seat back.

The seat back may have a flexible member that covers a front of the inflated and developed airbag to allow the upper body of a seated person to be elastically supported, and the seat back may further have a flexible movable member that covers a back of the inflated and developed airbag to allow an impact force applied to the rear of the seat back to be elastically received.

A second aspect of the disclosure provides a vehicle seat airbag system including an airbag which is caused by the seat airbag system to inflate and develop within a seat back. The airbag is disposed between a seat pad and an outer layer of a rear of the seat back, and the inflation and development of the airbag in the seat back causes the outer layer to expand rearwardly and allows the airbag to elastically support an upper body of a seated person and to elastically receive an impact force which is applied to the rear of the seat back.

The outer layer may have an elastic portion in an area corresponding to the inflated and developed airbag.

At least an area of the outer layer may be composed of a material having elasticity different from elasticity of the outer layer other than the area which corresponds to the inflated and developed airbag.

The outer layer may have a gusset that enables rearward expansion of the airbag which is caused by the inflation and development of the airbag. The outer layer may have a breaking part that enables rearward expansion of the airbag which is caused by the inflation and development of the airbag.

The vehicle seat airbag system may further include a rear board that is disposed rearwardly of the outer layer along an expansion area of the outer layer.

A third aspect of the disclosure provides a vehicle seat airbag system including an airbag which is caused by a seat airbag system to inflate and develop within a seat back. The airbag is disposed between a seat pad and a rear board provided in a rear of the seat back, and the inflation and development of the airbag in the seat back allows the airbag to elastically support an upper body of a seated person, and causes the rear board to be pushed rearwardly to allow the airbag to elastically receive an impact force which is applied to the rear board.

The rear board may be supported on the rear of the seat back swingably in a direction away from the rear of the seat back.

The rear board may be removed from the rear of the seat back by the pushing.

The rear board may be removably fixed to the rear of the seat back and include: a collision prediction unit that predicts a collision to the vehicle; and a fixing release mechanism that releases the fixing based on information of collision occurrence which is predicted by the collision prediction unit.

An outer layer may be interposed between the airbag and the rear board, the outer layer being caused by the inflated and developed airbag to expand rearwardly, and the outer layer may be provided with the rear board.

The rear board may include a fragile part.

The vehicle seat airbag system may further include: a control unit that controls the inflation and development of the airbag; and a collision detection unit that detects a collision to the vehicle. The control unit may cause the airbag to inflate and develop after a predetermined time delay since the collision detection unit detects a collision.

The vehicle seat airbag system may further include: a control unit that controls the inflation and development of the airbag; and a collision prediction unit that predicts a collision to the vehicle. The control unit may start to cause the airbag to inflate and develop at a time which is determined based on a time of collision occurrence predicted by the collision prediction unit.

The airbag may inflate and develop in multiple steps within the seat back.

An fourth aspect of the disclosure provides a vehicle seat including: a seat back frame, an elastic installation supporting member installed in the seat back frame, and an airbag within a seat back, the vehicle seat causing the airbag to inflate and develop within the seat back. An inflator is attached to the seat back frame, and the inflation and development of the airbag in the seat back due to an operation of the inflator allows the airbag to elastically support an upper body of a seated person and to elastically receive an impact force which is applied to a rear of the seat back.

The seat back frame may be formed in a substantially frame shape along a seat back shape, the airbag is provided in the seat back frame in a substantially frame shape, and the inflator may be attached to a side portion of the seat back frame in a substantially frame shape.

The inflator may be disposed within the seat back frame in a substantially frame shape.

The airbag may be disposed in the vehicle body rearwardly of the elastic installation supporting member, and the inflator may be disposed in the vehicle body forwardly of the elastic installation supporting member.

The inflator may be disposed outside the seat back frame in a substantially frame shape.

A fifth aspect of the disclosure provides a vehicle seat including: a seat back frame, an elastic installation supporting member installed in the seat back frame, and an airbag within a seat back, the vehicle seat causing the airbag to inflate and develop within the seat back. An inflator is attached to the seat back frame, the seat back frame is formed in a substantially frame shape along a seat back shape, the airbag is provided in the seat back frame in a substantially frame shape, the inflator is attached to at least one of an upper portion and a lower portion of the seat back frame in a substantially frame shape, and the inflation and development of the airbag in the seat back due to an operation of the inflator allows the airbag to elastically support an upper body of a seated person and to elastically receive an impact force which is applied to a rear of the seat back.

The inflator may be disposed within the seat back frame

The inflator may be disposed outside the seat back frame.

The inflator may be attached to a position near a side end of at least one of the upper portion and the lower portion of the seat back frame in a substantially frame shape.

The inflator may be attached to each of the upper portion and the lower portion of the seat back frame, and each inflator may operate with a time lag to cause the inflation and development.

The lower portion of the seat back frame to which the inflator is attached may be a cylindrical cross member that extends in a width direction along a lower side of the seat back, and the inflator may be fixed to an inside of the cross member.

A sixth aspect of the disclosure provides a vehicle seat including: a seat back frame, an elastic installation supporting member installed in the seat back frame, and an airbag within a seat back, the vehicle seat causing the airbag to inflate and develop within the seat back. An inflator is attached to the seat back frame, the seat back frame is formed as a whole in a substantially frame shape along a seat back shape, the airbag is provided in the seat back frame in a substantially frame shape, the inflator is attached to the seat back frame in a substantially frame shape at a corner portion or a bending portion thereof, and the inflation and development of the airbag in the seat back due to an operation of the inflator allows the airbag to elastically support an upper body of a seated person and to elastically receive an impact force which is applied to a rear of the seat back.

The attachment of the inflator to the seat back frame may be achieved by bridging the inflator between both side positions of the seat back frame including the corner portion or the bending portion.

The seat back frame may have a lower cross member and an upper cross member that extend in a width direction at a lower and an upper positions respectively, and a pair of side frames that are disposed on both sides in the width direction. The corner portion or the bending portion may serve as a connecting portion between the side frames and the lower cross member. The inflator may be bridged between and attached to the side frames and the lower cross member.

The seat back frame may have a lower cross member and an upper cross member that extend in a width direction at a lower and an upper positions respectively, and a pair of side frames that are disposed on both sides in the width direction. The corner portion or the bending portion may be located between the side frames and the upper frame. The inflator may be bridged between and attached to the side frames and the upper cross member.

DETAILED DESCRIPTION (First Implementation)

Figure 1:
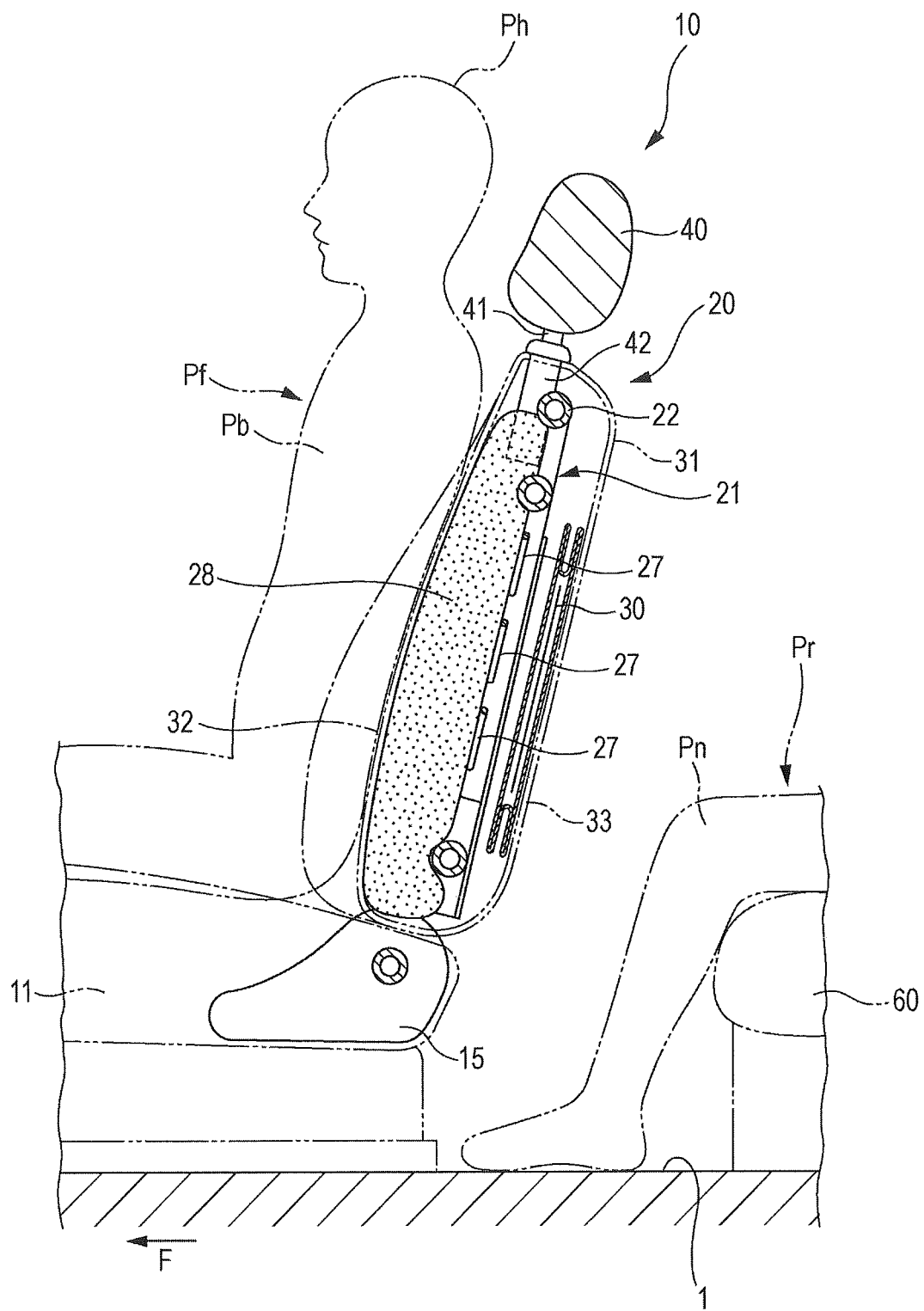
FIG. 1 is a schematic vertical cross-sectional view of a vehicle seat illustrating the outline of a vehicle seat airbag system according to a first implementation.
Figure 2:
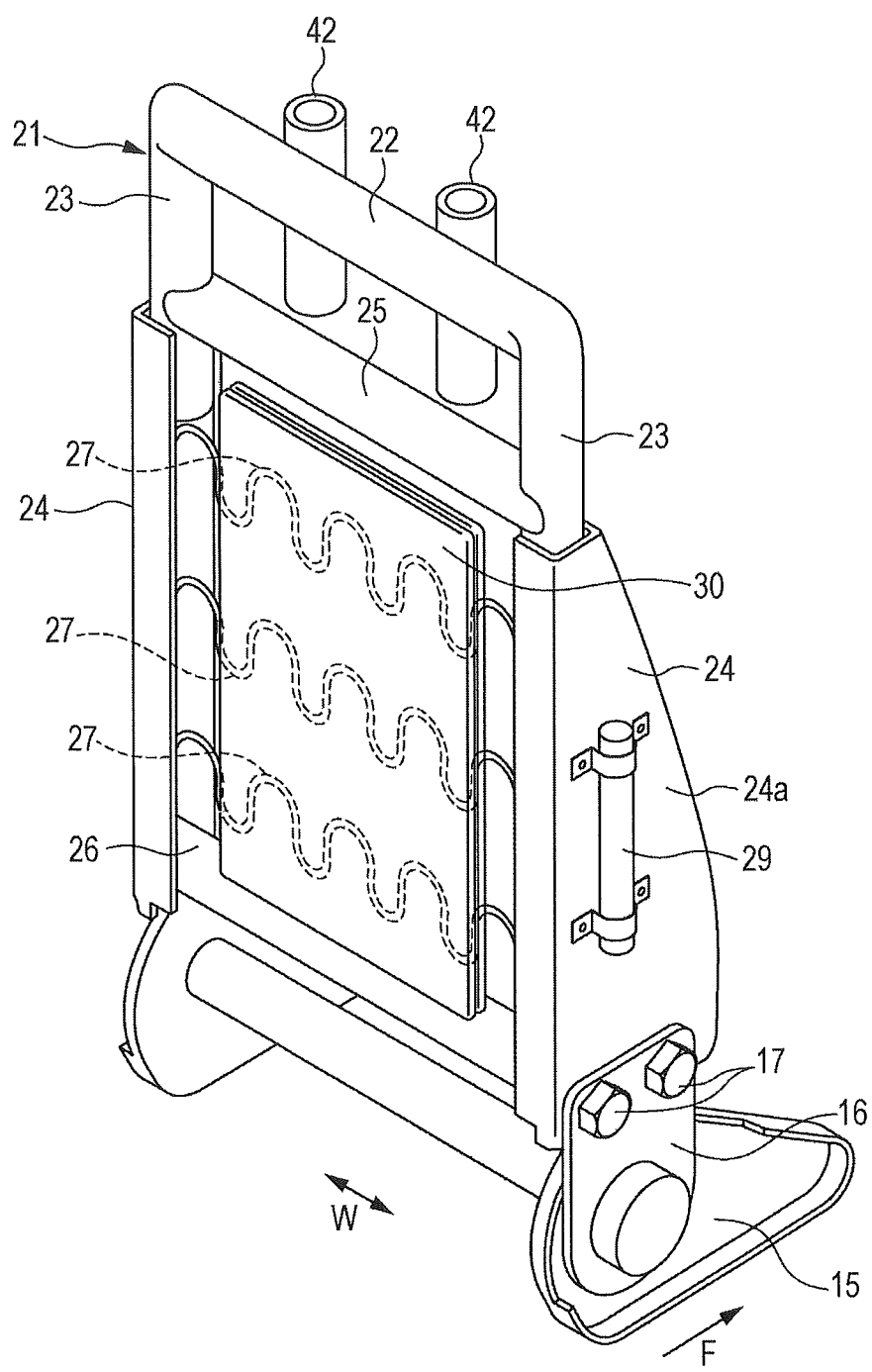
FIG. 2 is a schematic perspective view with partial cutaway of the vehicle seat as seen from the rear.
Figure 3:
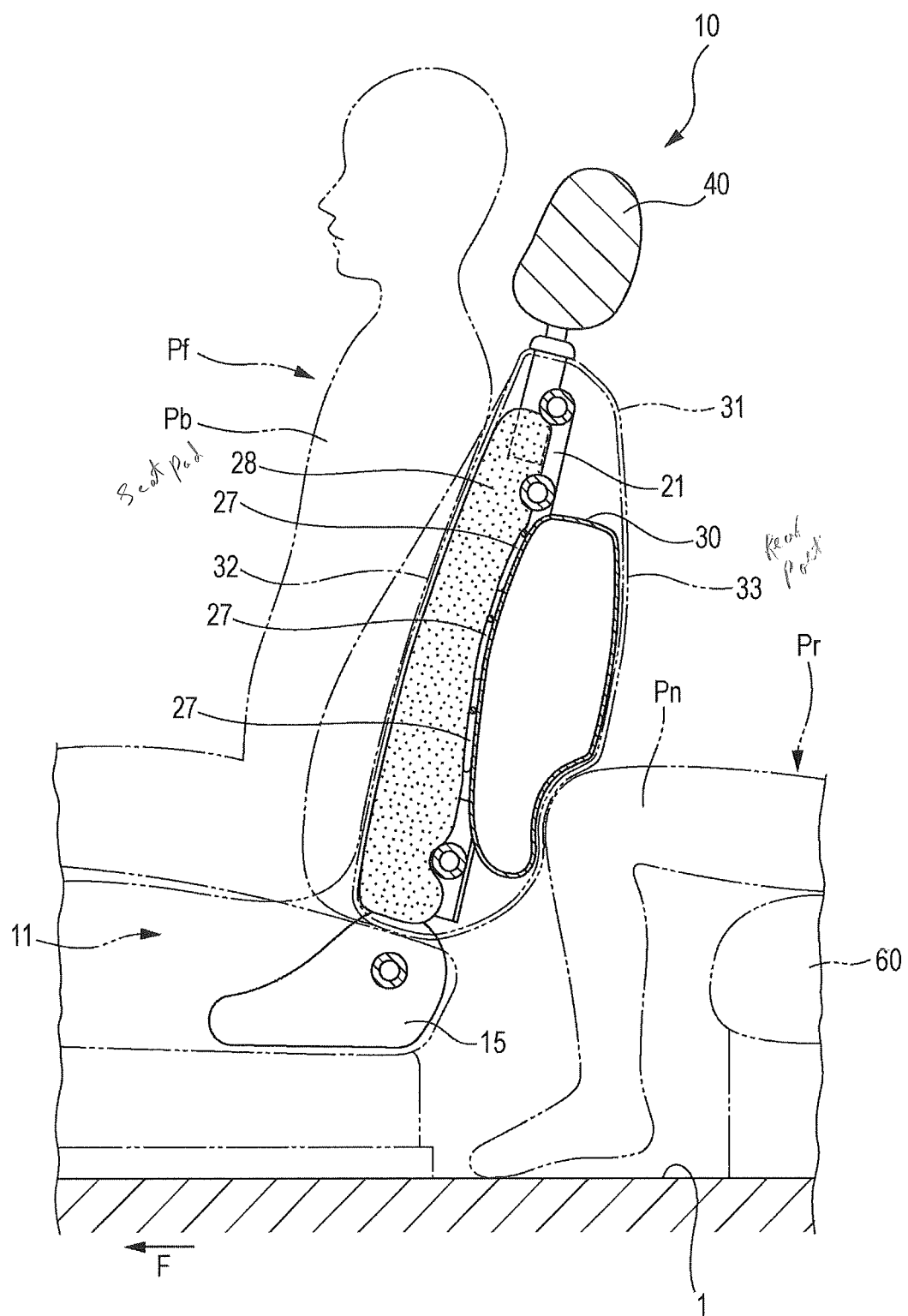
FIG. 3 is an operation explanatory diagram of the vehicle seat when an impact occurs.

Hereinafter, a first implementation of a vehicle seat airbag system according to the present disclosure will be described with reference to the accompanying drawings. FIG. 1 is a schematic vertical cross-sectional view illustrating the outline of a vehicle seat; FIG. 2 is a schematic perspective view with partial cutaway of the seat for a vehicle as seen from the rear; and FIG. 3 is an operation explanatory diagram of the seat for a vehicle when an impact occurs. It is to be noted that arrow F indicates the forward direction of the vehicle and arrow W indicates a vehicle width direction in each figure.

As illustrated in FIG. 1, a front seat 10 and a rear seat 60 are disposed in parallel at the front and rear as vehicle seats on a floor 1 in the vehicle cabin. The front seat 10 has a seat cushion 11 that is supported on the floor 1 and supports the buttocks of a seated person Pf, a seat back 20 that supports an upper body Pb which is from a waist to a chest of the seated person Pf, and a headrest 40 which is located upwardly of the seat back 20 and supported on the seat back 20. Although the seated person Pf may rest a head Ph on the headrest 40 while driving a vehicle, this posture makes it difficult to perform driving operations, and so normally, the seated person Pf is seated with the head Ph slightly away from the headrest 40.

As illustrated in FIGS. 1 and 2, in the front seat 10, a plurality of elastic installation supporting members 27 is provided in a seat back frame 21 that forms the framework of the seat back 20, a seat pad 28 is disposed on the front surface of the elastic installation supporting members 27, an airbag 30 in a contracted state is disposed rearwardly of the elastic installation supporting members 27, and all of these components are covered by an outer layer 31 in a bag shape.

The seat back frame 21 is formed in a substantially rectangular frame shape by a U-shaped tube frame, a pair of right and left side brackets 24, a tube-shaped upper cross member 25, and a lower cross member 26, the U-shaped tube frame including an upper frame 22 extending in a vehicle width direction and a pair of side frames 23 curving or bending downward from both ends of the upper frame 22 and extending downward, the pair of right and left side brackets 24 being fixedly disposed at the side edges of the side frames 23, the tube-shaped upper cross member 25 extending in a vehicle width direction and being installed between the vicinities of the upper ends of the right and left side frames 23, the lower cross member 26 being installed between the vicinities of the lower ends of the right and left side brackets 24.

A plurality of the elastic installation supporting members 27 such as zigzag springs made of metal is provided to be bridged between the opposed side frames 23 and between the side brackets 24. In the present implementation, three elastic installation supporting members 27 are provided to be bridged therebetween at substantially the same intervals.

The seat pad 28, which elastically supports the upper body Pb of the seated person Pf, is disposed on the front surface of the elastic installation supporting members 27, the seat pad being composed of a urethane foam material. The airbag 30, which is flatly folded in a rectangular shape in a contracted state, is disposed in the rear of the elastic installation supporting members 27.

The whole thing including the seat back frame 21, the seat pad 28, and the air bag 30 is covered by the outer layer 31 in a bag shape having a front surface 32 that covers the front of the seat pad 28 and a rear part 33 that covers the air bag 30 with an expandable/contractible and flexible fabric (textile, knit, non-woven fabric) or leather (natural leather, synthetic leather), thereby forming the seat back 20. A rear board, which is a movable member, may be disposed at the rear portion. The air bag 30 is held in, for example, the outer layer 31 by a retaining unit (not illustrated) so as to allow inflation and development. The air bag 30 is provided with a gas inlet (not illustrated) and is connected to a cylindrical inflator 29 which is attached to a side surface 24a outward of the side bracket 24 in the vehicle body.

The base end of each side bracket 24 included in the seat back frame 21 of the seat back 20 is attached to a rotation arm 16 of a reclining device 15 disposed in the rear of the seat cushion 11 by screwing a mounting bolt 17, and thus the seat back frame 21 is integrally connected to the rotation arm 16 of the reclining device 15. It is to be noted that existing publicly known reclining device 15 may be used, which is not directly related to the present disclosure and thus detailed description is omitted.

As illustrated in FIGS. 1 and 2, a pair of right and left cylindrical stay brackets 42 is integrally formed with the upper frame 22 of the seat back frame 21. Stays 41 mounted in the headrest 40 are inserted in and retained to the stay brackets 42 via a headrest holder, and thus the headrest 40 is mounted on the upper end of the seat back 20.

Thus, as illustrated in FIGS. 1 and 2, the airbag 30 contracted in a substantially rectangular plane shape is disposed between the elastic installation supporting members 27 and the rear part 33 of the outer layer 31 and thus is incorporated in the seat back 20. The seat back 20 covers the front of the expandable and developable airbag 30 with the elastic installation supporting members 27 capable of elastically supporting rearward movement of the seated person Pf, and flexible members such as the seat pad 28 and the front surface 32 of the outer layer 31. On the other hand, the seat back 20 covers the rear of the airbag 30 with the rear part 33 of the outer layer 31 which a flexible member or a movable member capable of elastically receiving an impact force which is applied to the rear of the seat back.

The airbag 30 is designed to instantly expand and develop two-dimensionally due to expanded gas injection of the inflator 29. The airbag 30 has orifices (not illustrated) that release internal gas to the outside. The diameter and number of orifices are set so as to allow the internal gas to be released gradually with the contraction of the airbag 30 after the inflation and development thereof.

This configuration ensures bending deformation of the elastic installation supporting members 27 and the seat pad 28 which are provided within the seat back frame 21 disposed within the seat back 20, and thus elastic support of the seated person Pf in a normal seating state is appropriately obtained and favorable seating performance may be ensured.

On the other hand, when the airbag 30 inflates and develops two-dimensionally between the elastic installation supporting members 27 and the rear part 33 of the outer layer 31 due to expanded gas injection of the inflator 29, as illustrated in FIG. 3, the airbag 30 pushes forward and urges the elastic installation supporting members 27 and the seat pad 28 so as to allow the upper body Pb of the seated person Pf to be elastically supported from the rear side, and the airbag 30 further develops and causes the rear part 33 of the outer layer 31 to expand rearwardly so as to allow an impact force applied to the rear part of the seat back 20 to be elastically received. The inflation and development of the airbag 30 is covered by the elastic installation supporting members 27 that hold the airbag 30 and the rear part 33 of the outer layer 31 that extends and expands, and thus development behavior and development pattern are controlled and stable inflation and development are maintained, and also sufficient volume of inflation and development is obtained, and the energy absorbing stroke of the airbag 30 in a fore-and-aft direction of the vehicle body may be ensured.

Figure 4:
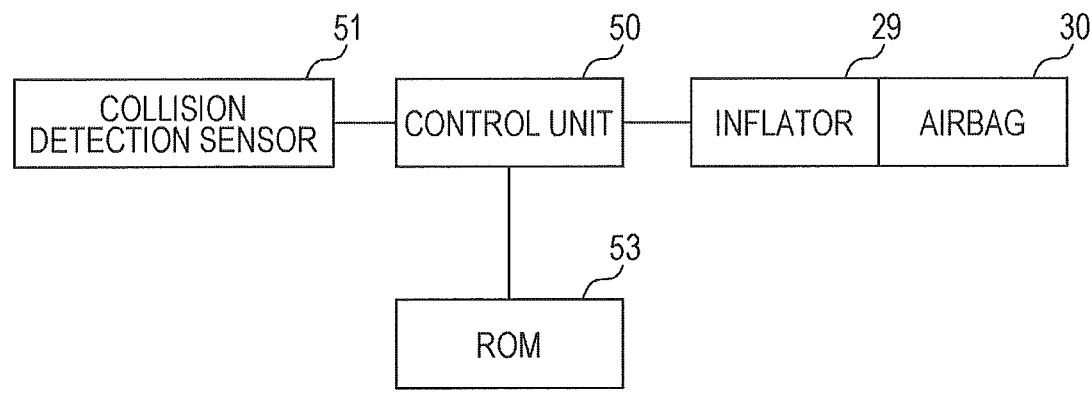
FIG. 4 is a control circuit block diagram of the vehicle seat airbag system.

FIG. 4 illustrates a control circuit of the vehicle seat airbag system. The control circuit includes a control unit 50 that controls inflation and development of the airbag 30, and the control unit 50 is electrically connected to a collision detection sensor 51 and the inflator 29 to control the operation of the inflator 29 according to collision occurrence information from the collision detection sensor 51 and a program stored in a ROM 53, the collision detection sensor being a collision detection unit to detect a collision to the rear of a vehicle, that is, an impact of a rear-end collision.

The collision detection sensor 51 includes an acceleration sensor that issues a signal according to acceleration which represents an impact force at the time of a rear-end collision. The control unit 50 determines whether or not a rear-end collision has occurred based on comparison between acceleration detected by the collision detection sensor 51 and a predetermined threshold value. Based on the determination of rear-end collision occurrence, the control portion 50 operates the inflator 29 to cause the airbag 30 to expand and develop when a rear-end collision has occurred.

The operation of the vehicle airbag system having the above configuration will be described.

In a vehicle equipped with the vehicle airbag system, when an impact greater than or equal to a predetermined impact is applied to the vehicle due to a rear-end collision or the like, the impact is detected by the collision detection sensor 51, and the control unit 50 outputs a drive signal to the inflator 29, which is ignited and expanded gas jets from the inflator 29. In this manner, as illustrated in FIG. 3, the airbag 30 instantly inflates and develops between the elastic installation supporting members 27 and the rear part 33 of the outer layer 31. Thus, rearward movement, due to a rear-end collision, of the upper body Pb of the seated person Pf on the front seat 10 is elastically received and regulated by the airbag 30 via the front surface 32 of the outer layer 31, the seat pad 28, and the elastic installation supporting members 27.

On the other hand, because of vehicle body deformation due to an impact and/or inertia due to a rear-end collision, the upper body of the seated person Pr on the rear seat 60 is moved rearward and pressed against the seat back, then is moved linearly forward by rebounding. Then, for example, knees Pn come into contact with the rear part of the seat back 20 of the front seat 10, and an impact force is applied to the rear part of the front seat 10. At this point, the knees Pn are elastically received by the airbag 30 which has expanded and developed between the elastic installation supporting members 27 and the rear part 33 of the outer layer 31 in the seat back 20, and thus forward movement are regulated, and the upper body Pb of the seated person Pf on the front seat 10 avoids receiving an impact force from the knees Pn of the seated person Pr on the rear seat 60, and consequently the seated person Pf on the front seat 10 is protected. Similarly, the knees Pn of the seated person Pr moving forward on the rear seat 60 are elastically received and protected by the airbag 30 which inflates and develops.

In the above description, when the collision detection sensor 51 detects an impact greater than or equal to a predetermined impact, the control unit 50 instantly operates and controls the inflator 29 to cause the airbag 30 to expand and develop. The control unit 50, however, may control the airbag 30 so that the airbag 30 inflates and develops after a predetermined time delay since the collision detection unit 51 detects an impact. That is, the control unit 50 determines whether or not a rear-end collision has occurred based on comparison between acceleration detected by the collision detection sensor 51 and a predetermined threshold value, and operates the inflator 29 to cause the airbag 30 to expand and develop after elapse of a predetermined time since a rear-end collision occurred.

In this manner, the airbag 30 inflates and develops after elapse of a predetermined time since an occurrence of a rear-end collision, and so at an occurrence of a rear-end collision, the seat pad 28 of the seat back 20 and the elastic installation supporting members 27 undergo bending deformation because of inertia, and the upper body Pb of the seated person Pf on the front seat 10 is moved rearward quickly to be pressed into the seat back 20. Then the head Ph is instantly restrained and supported by the headrest 40 after the collision and thus a load applied to the neck is reduced. Subsequently, due to expanded gas injection of the inflator 29, the airbag 30 inflates and develops two-dimensionally between the elastic installation supporting members 27 and the outer layer 31 that forms the rear part of the seat back 20, then the airbag 30 pushes forward and urges the elastic installation supporting members 27 and the seat pad 28 so as to elastically support the upper body Pb of the seated person Pf, then develops and causes the rear part 33 of the outer layer 31 to expand rearwardly so as to allow an impact force applied to the rear part of the seat back 20 to be elastically received. Accordingly, rearward movement, due to a rear-end collision, of the upper body Pb of the seated person Pf on the front seat 10 is elastically received and rearward movement is regulated by the airbag 30 via the outer layer 31 of the seat back 20, the seat pad 28, and the elastic installation supporting members 27, the airbag 30 ensuring the amount of development and inflation, and the energy absorbing stroke in a fore-and-aft direction of the vehicle body.

In this manner, similarly to what has been described above, the seated person Pf on the front seat 10 and the seated person Pr on the rear seat 60 are protected by the airbag 30 which inflates and develops, and at an occurrence of a rear-end collision, the upper body Pb of the seated person Pf on the front seat 10 is moved rearward quickly to be pressed into the seat back 20, then the head Ph is supported by the headrest 40 to reduce a load applied to the neck, and thus occurrence of whiplash injury of the seated person Pf is reduced.

This vehicle seat airbag system may control its operation using a collision prediction unit instead of the above-mentioned control circuit.

Figure 5:
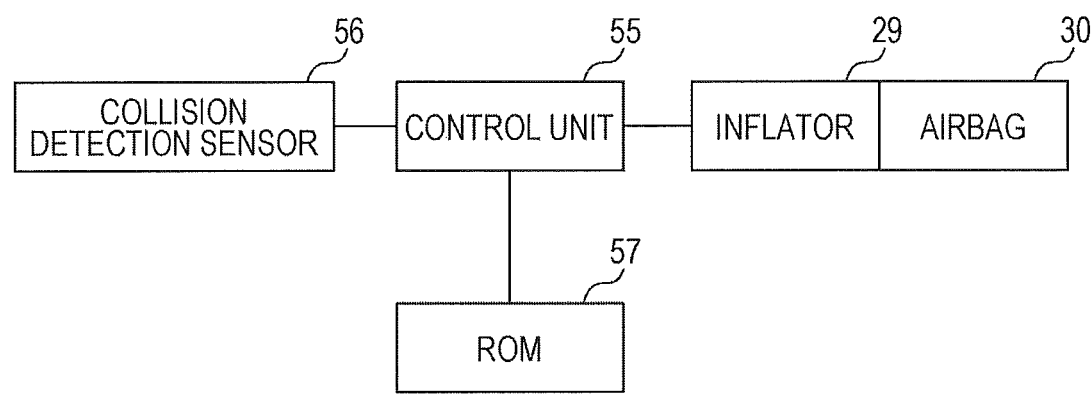
FIG. 5 is a control circuit block diagram of the vehicle seat airbag system.

FIG. 5 illustrates the control circuit of the vehicle seat airbag system. The control circuit includes a control unit 55 that controls inflation and development of the airbag 30, and the control unit 55 controls the operation of the inflator 29 according to collision occurrence information from the collision detection sensor 56 and a program stored in a ROM 57, the collision detection sensor being a collision prediction unit to predict a rear-end collision and an impact load to a vehicle.

Here, the control unit 55 has a built-in timer and measures time by starting the timer from a rear-end collision predicted time. Also, the collision detection sensor 56 includes, for example, a distance sensor such as a millimeter wave sensor, and predicts a rear-end collision by measuring a relative distance and/or a relative speed between the self-vehicle and another vehicle with which a rear-end collision may occur. In addition, the collision detection sensor 56 predicts an impact load at the occurrence of predicted rear-end collision.

In this manner, at a predicted occurrence time of collision, similarly to what has been described above, as illustrated in FIG. 3, the airbag 30 instantly inflates and develops between the elastic installation supporting members 27 and the rear part 33 of the outer layer 31, and rearward movement of the upper body Pb of the seated person Pf on the front seat 10 is elastically received and the rearward movement is regulated. On the other hand, even when the knees Pn of the seated person Pr on the rear seat 60 come into contact with the rear part of the seat back 20 of the front seat 10, the knees Pn are elastically received by the airbag 30 which has expanded and developed and rearward movement is regulated, and thus the seated person Pf on the front seat 10 is protected.

In addition, when inevitability of a rear-end collision of a vehicle is predicted based on signals from the collision detection sensor 56, the control unit 55 may control the airbag 30 so that the airbag 30 starts to expand and develop after a predetermined time delay since the predicted occurrence time of collision. That is, when the control unit 55 predicts inevitability of a rear-end collision of the vehicle based on signals from the collision detection sensor 56, inflation and development of the airbag 30 starts after elapse of a predetermined time since the predicted occurrence time of collision.

In this manner, when a rear-end collision occurs at a predicted occurrence time of collision, the seat pad 28 of the seat back 20 and the elastic installation supporting members 27 undergo bending deformation because of the inertia of the seated person Pf, and the upper body Pb of the seated person Pf on the front seat 10 is moved rearward quickly to be pressed into the seat back 20, then the head Ph is supported by the headrest 40 instantly after the collision. The airbag 30 inflates and develops after elapse of a predetermined time since a subsequent predicted occurrence time of collision. Thus, rearward movement, due to a rear-end collision, of the upper body Pb of the seated person Pf on the front seat 10 is elastically received by the airbag 30 via the outer layer 31 of the seat back 20, the seat pad 28, and the elastic installation supporting members 27, and so the rearward movement is regulated. In this manner, similarly to what has been described above, the seated person Pf on the front seat 10 and the seated person Pr on the rear seat 60 are protected by the airbag 30 which inflates and develops, and at an occurrence of a rear-end collision, the upper body Pb of the seated person Pf on the front seat 10 is moved rearward quickly to be pressed into the seat back 20, then the head Ph is supported by the headrest 40 to reduce a load applied to the neck, and thus occurrence of whiplash injury of the seated person Pf is reduced.

Furthermore, when inevitability of a rear-end collision of a vehicle is predicted based on signals from the collision detection sensor 56, the control unit 55 may control the airbag 30 so that the airbag 30 starts to expand and develop a predetermined time delay before the predicted occurrence time of collision. That is, when the control unit 55 predicts inevitability of a rear-end collision of the vehicle based on signals from the collision detection sensor 56, inflation and development of the airbag 30 starts a predetermined time before the predicted occurrence time of collision.

According to this, a predetermined time before a predicted occurrence time of collision, that is before a collision occurrence, the airbag 30 starts to expand and develop between the elastic installation supporting members 27 and the rear part 33 of the outer layer 31, the upper body Pb of the seated person Pf is pushed forward via the seat pad 28 and the front surface 32 of the outer layer 31 by the airbag 30 which inflates and develops, thereby causing the back of the seated person Pf to be stretched and the seated position and the seated posture of the seated person Pf is made to be suitable.

The airbag 30 further inflates and develops with the suitable seated position and seated posture of the seated person Pf, and thus optimal effect of inflation and development of the airbag 30 for the seated person Pf is obtained, and rearward movement of the upper body Pb of the seated person Pf on the front seat 10 at an occurrence of a rear-end collision is elastically received by the airbag 30 and the rearward movement is regulated.

Consequently, according to the present implementation, the airbag 30 disposed within the seat back 20 inflates and develops within the seat back 20, thereby making it possible to elastically receive rearward movement of the seated person Pf due to a collision and to protect the seated person pf on the vehicle seat against an impact from the rear. Thus, without adopting a complicated configuration, direct protection of a seated person by the airbag at the time of a collision and accurate reduction of an impact from the rear of the seat back may be achieved.

Moreover, because the inflator 29 is attached to the side surface 24a outward of the side bracket 24 of the seat back frame 21 in the vehicle body, the seat back frame being a frame member disposed so as to ensure seating performance, and thus uncomfortable feeling for a seated person caused by provision of the inflator 29 is completely insensible, and the support rigidity of the inflator 29 is ensured.

Furthermore, the inflator 29 is disposed outside the seat back frame 21, and thus interference between the inflator 29 and the airbag 30 which inflates and develops within the seat back 20 is completely avoided, and thus stable development of the airbag 30 is ensured.

Also, when the front seat 10 is provided with a side air bag, the inflator 29 may be used in common as an inflator of the side air bag, and the efficiency of the entire air bag device provided in the front seat 10 may be increased.

When a lumbar support mechanism is provided within the seat back frame 21 of the front seat 10, the operation of the lumbar support mechanism is not effected.

According to this implementation, the inflator 29 is not located between the opposed side brackets 24 or between the opposed side frames 23, thereby providing the effect that attachment of the elastic installation supporting members 27 to be installed between the side brackets 24 or the side frames 23 is not interfered.

As described above, the operation of the airbag 30 at an occurrence of collision to the front seat 10 has been described by taking a rear-end collision of a vehicle as an example. However, a collision is not limited to a rear-end collision. For example, even in the case of a front-end collision, although operational steps are reversed, similarly, the inflation and development of the airbag 30 first allows the front seat 10 to elastically receive an impact due to forward movement of the knees Pn of the seated person Pr on the rear seat, and subsequently, the front seat 10 is able to elastically receive rearward movement of the upper body Pb of the seated person Pf on the front seat 10.

Second Implementation

Figure 6:
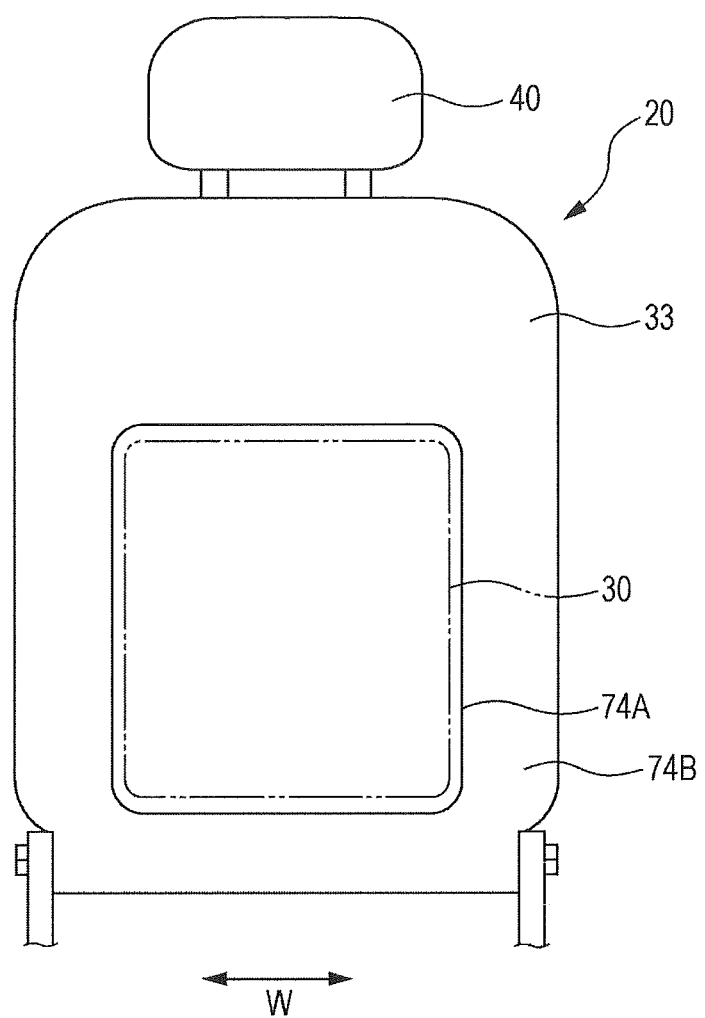
FIG. 6 is a schematic explanatory diagram as seen from the rear, illustrating the outline of a second implementation.
Figure 7:
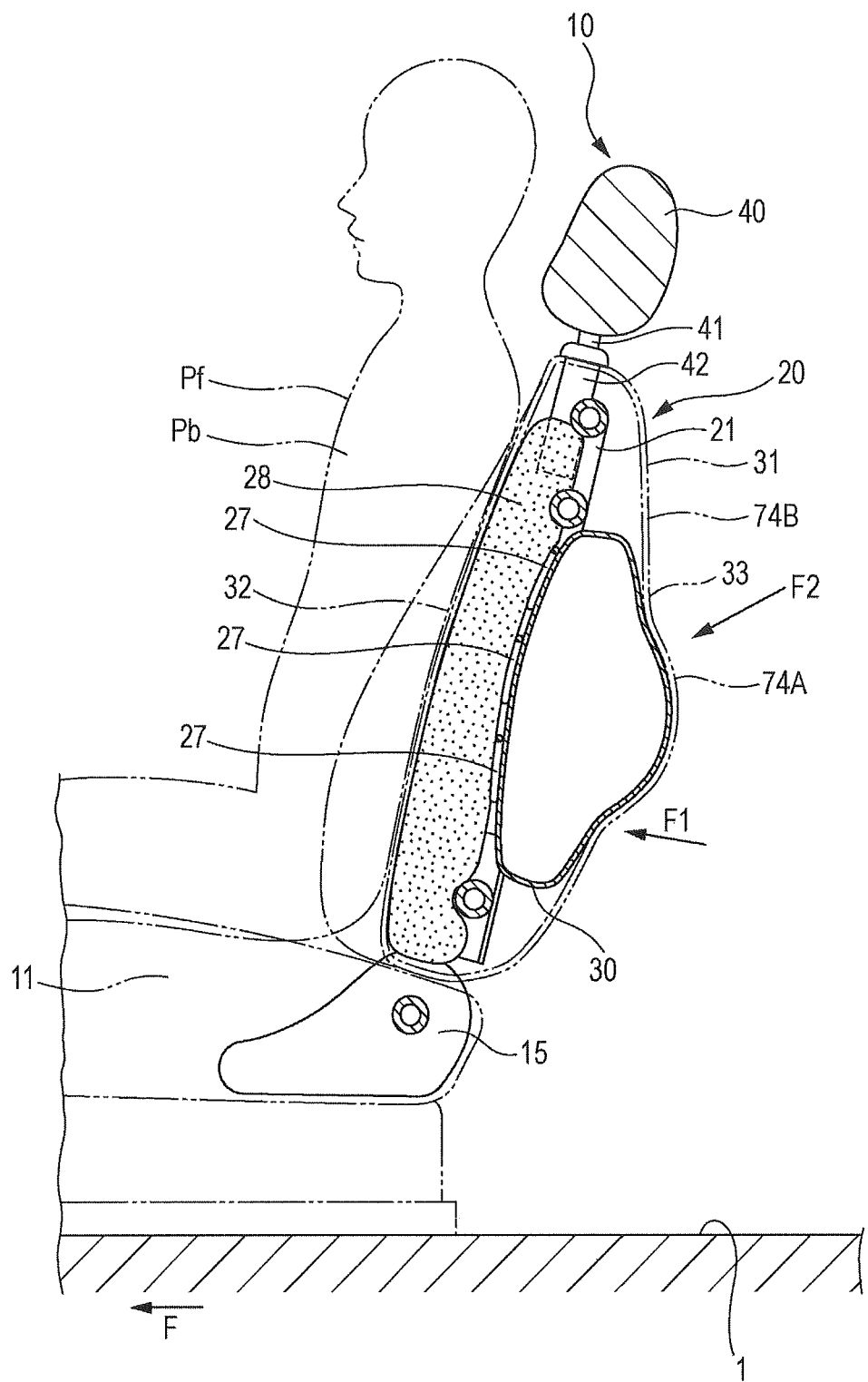
FIG. 7 is an operation explanatory diagram of the vehicle seat when an impact occurs.
Figure 8:
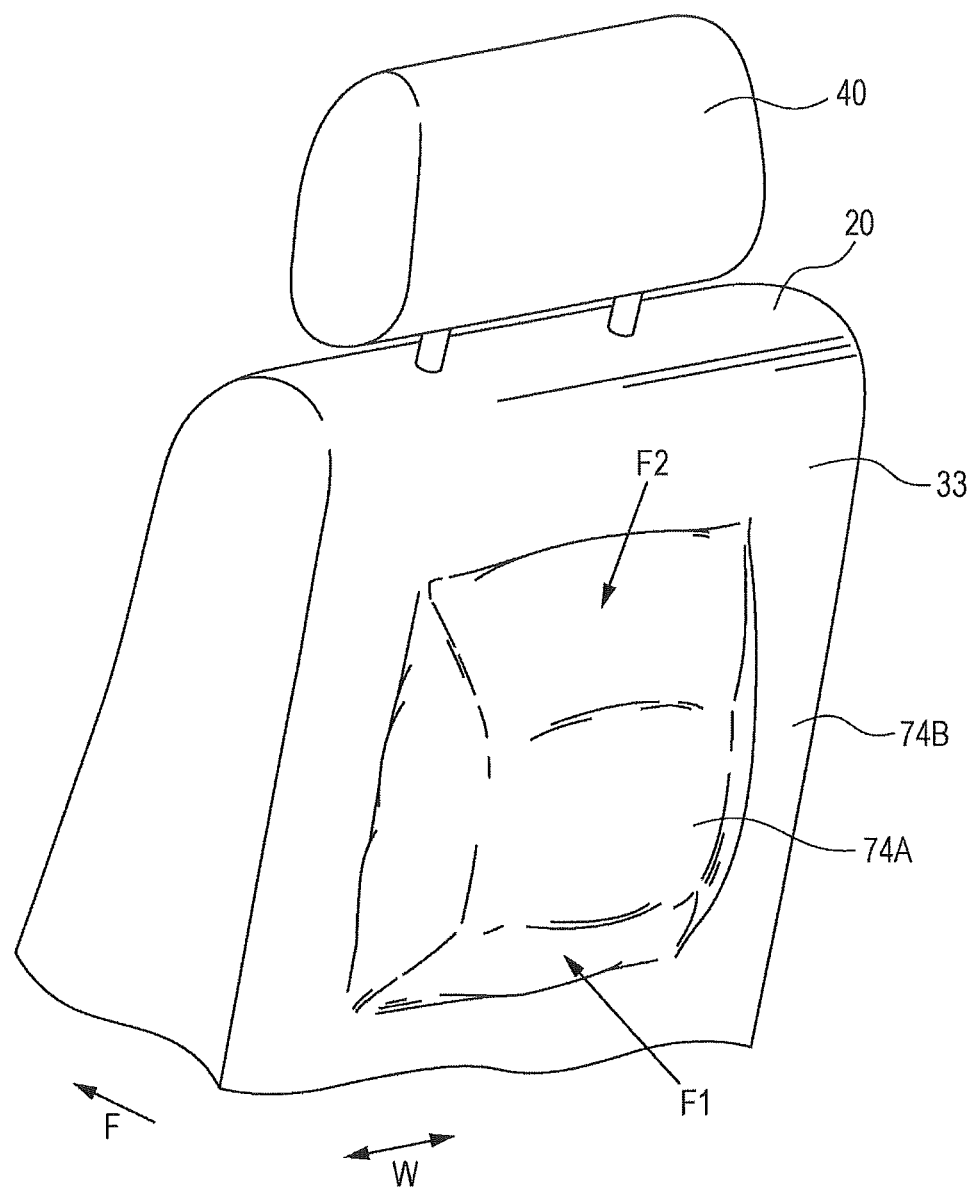
FIG. 8 is an operation explanatory diagram of the vehicle seat.

A second implementation will be described with reference to FIGS. 6 to 17. FIG. 6 is a schematic explanatory diagram as seen from the rear, illustrating the outline of the second implementation; FIG. 7 is an operation explanatory diagram of the vehicle seat when an impact occurs; and FIG. 8 is an operation explanatory diagram of the vehicle seat. It is to be noted that the components corresponding to those in the first implementation are denoted by the same symbols in FIGS. 1 to 5, and detailed description of the components is omitted.

Similarly to the first implementation, in a front seat 10, a plurality of elastic installation supporting members 27 is provided in a seat back frame 21 that forms a framework of a seat back 20, a seat pad 28 is disposed on the front surface of the elastic installation supporting members 27, an airbag 30 in a contracted state is disposed rearwardly of the elastic installation supporting members 27, and all of these components are covered by an outer layer 31 in a bag shape.

As illustrated in FIG. 6, in a rear part 33 of the outer layer 31, a substantially rectangular airbag corresponding area 74A, which corresponds to the airbag 30, is composed of an outer layer material which is superior in elasticity compared with the outer layer material of a rear part area 74B which surrounds the airbag corresponding area 74A. Thus, an elastic portion is formed correspondingly to the airbag 30.

On the other hand, when the airbag 30 inflates and develops two-dimensionally between the elastic installation supporting members 27 and the rear part 33 of the outer layer 31 due to expanded gas injection of the inflator 29, as illustrated in the cross-sectional view of FIG. 7 and in the main perspective view of the rear part 33 of FIG. 8, the airbag 30 pushes forward and urges the elastic installation supporting members 27 and the seat pad 28 so as to allow the upper body Pb of the seated person Pf to be elastically supported from the rear side. On the other hand, in the rear part 33 of the outer layer 31, particularly the area 74A corresponding to the airbag 30 expands rearwardly in a rectangular dome-shaped, the volume of inflation and development of the airbag 30 is sufficiently ensured, and the airbag 30 develops to allow an impact force applied to the rear part of the seat back 20 to be elastically received, the airbag being composed of an outer layer material superior in elasticity.

The inflation and development of the airbag 30 is covered by the elastic installation supporting members 27 that hold the airbag 30 and the rear part 33 of the outer layer 31 that extends and expands, and thus development behavior and development pattern are controlled and stable inflation and development are maintained. In addition, the expandable/contractible elastic installation supporting members 27 and the rear part 33 of the outer layer 31 are caused to expand, inflate and develop, thereby making it possible to obtain the volume of inflation and development of the airbag 30, and the energy absorbing stroke in a fore-and-aft direction of the vehicle body in the airbag 30 may be ensured.

In a vehicle provided with vehicle seats having the above configuration, when an impact greater than or equal to a predetermined impact is applied to the vehicle due to a rear-end collision or the like, the impact is detected by the collision detection sensor, and the control unit outputs a drive signal to the inflator 29, which is ignited and expanded gas jets from the inflator 29. In this manner, as illustrated in FIGS. 7 and 8, the airbag 30 instantly inflates and develops between the elastic installation supporting members 27 and the rear part 33 of the outer layer 31. Thus, rearward movement, due to a rear-end collision, of the upper body Pb of the seated person Pf on the front seat 10 is elastically received by the airbag 30 via the front surface 32 of the outer layer 31, the seat pad 28, and the elastic installation supporting members 27, and so the rearward movement is regulated.

On the other hand, the seated person Pr on the rear seat 60 may be moved rearward due to a rear-end collision and pressed against the seat back, then is moved linearly forward by rebounding. Then, for example, the knees Pn may come into contact with the rear part of the seat back 20 of the front seat 10. At this point, the knees Pn are elastically received via the outer layer 31 which inflates and develops by the airbag 30 which has expanded and developed between the elastic installation supporting members 27 and the rear part 33 of the outer layer 31 in the seat back 20, and thus forward movement is restrained and the upper body Pb of the seated person Pf on the front seat 10 is protected against an impact force F1 from the knees Pn of the seated person Pr on the rear seat 60. Similarly, the impact force F1 from the knees Pn and an impact force F2 from the upper body of the seated person Pr moving forward on the rear seat 60 are elastically received and protected by the airbag 30 which has expanded and developed and ensures the volume of inflation and development and the energy absorbing stroke.

Figure 9A:
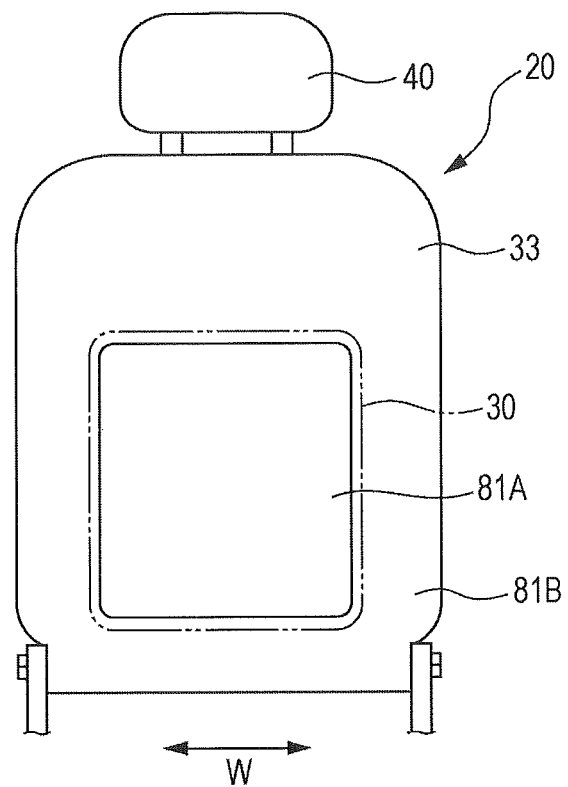
FIG. 9A is a schematic explanatory diagram of the rear part of a seat back and FIG. 9B is an operation explanatory diagram of the seat back.

In the rear part 33 which is of the outer layer 31 of the seat back 20 and expands along with the inflation and development of the airbag 30, as illustrated in FIG. 9A, a rear part area 81B, which surrounds a substantially rectangular airbag corresponding area 81A, may be composed of an outer layer material which is superior in elasticity compared with the outer layer material of the airbag corresponding area 81A corresponding to the airbag 30. Thus, an elastic portion may be formed in the rear part area 81B surrounding the airbag corresponding area 81A.

Figure 9B:
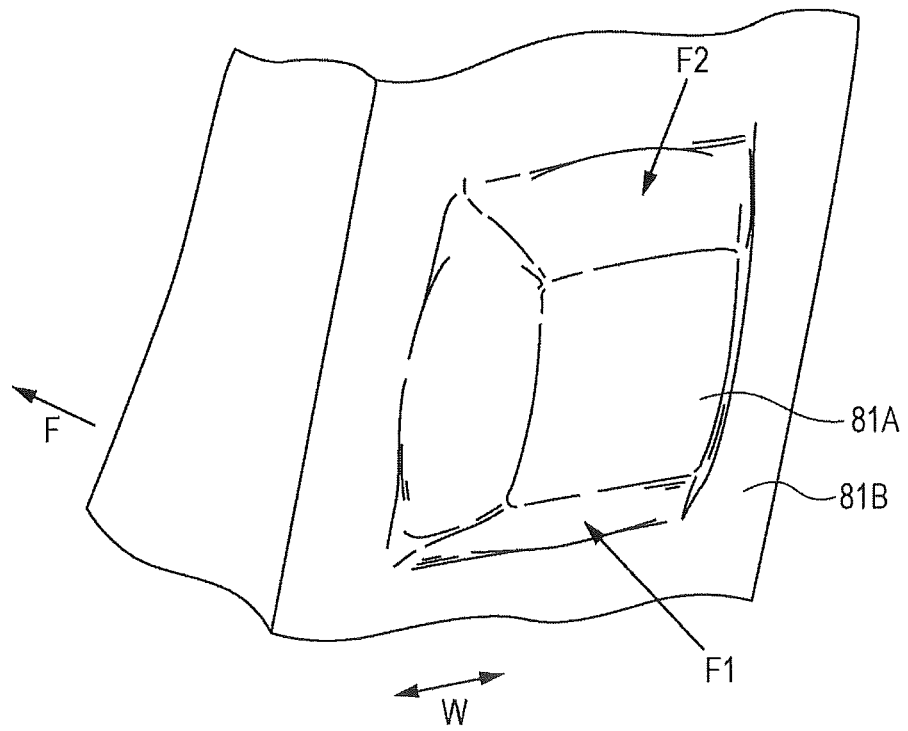

In this manner, the airbag 30 inflates and develops between the elastic installation supporting members 27 and the rear part 33 of the outer layer 31 due to a rear-end collision or the like. As illustrated in FIG. 9B, the airbag 30 inflates and develops so as to expand due to extension of the rear part area 81B which surrounds the airbag corresponding area 81A included in the rear part 33. Thus, rearward movement, due to a rear-end collision, of the upper body Pb of the seated person Pf on the front seat 10 is elastically received by the airbag 30 and the rearward movement is regulated.

On the other hand, the knees Pn of the seated person Pr on the rear seat 60 is elastically received by the airbag 30 which has expanded and developed between the elastic installation supporting members 27 and the outer layer 31, and thus the upper body Pb of the seated person Pf on the front seat 10 is protected against the impact force F1. Similarly, the impact force F1 from the knees Pn and the impact force F2 from the upper body of the seated person Pr moving forward on the rear seat 60 are elastically received and protected by the airbag 30 which has expanded and developed.

The inflation and development of the airbag 30 are controlled by the elastic installation supporting members 27 and mainly the rear part 33 of the outer layer 31, that expands due to extension of the rear part area 81B surrounding the airbag corresponding area 81A, and thus stable inflation and development are maintained.

Figure 10A:
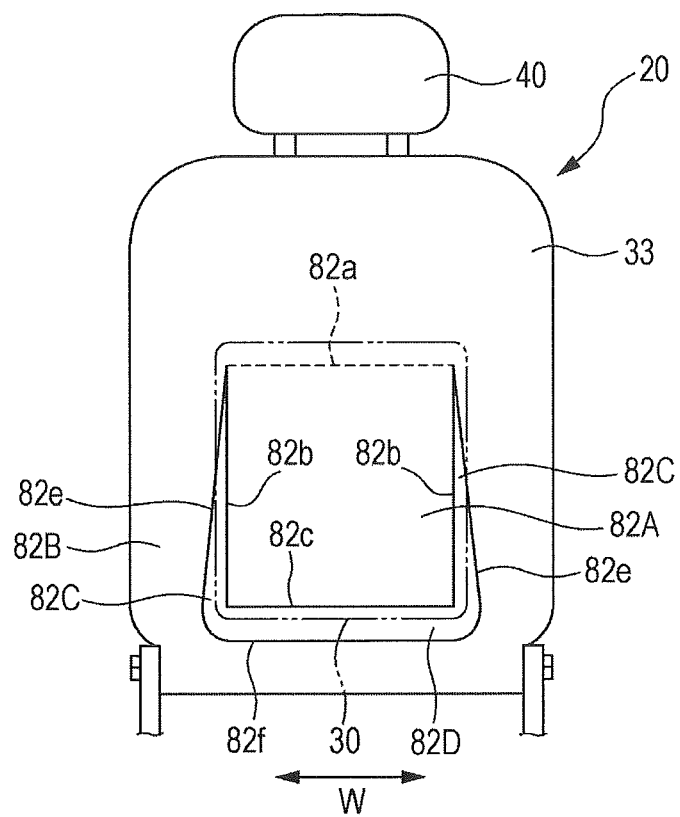
FIG. 10A is a schematic explanatory diagram of the rear part of the seat back and FIG. 10B is an operation explanatory diagram of the seat back.

Another rear part 33, which is of the outer layer 31 of the seat back 20 and expands along with the inflation and development of the airbag 30, has an airbag corresponding area 82A corresponding to the airbag 30 of the rear part 33 and a rear part area 82B surrounding the airbag corresponding area 82A as illustrated in FIG. 10A, the airbag corresponding area 82A being defined as a substantially U-shape along both side edges 82b and a lower edge 82c, the rear part area 82B having both side edges 82e and a lower edge 82f, the both side edges 82e being gradually away from the both side edges 82b as being located downward from the upper end of each side edge 82b, the lower edge 82f extending from the lower edge 82c with a predetermined distance apart and having both ends connected with the lower ends of the both side edges 82e. The airbag corresponding area 82A is formed in a lid shape having an upper edge 82a which is connected with the rear part area 82B.

A pair of elastic side areas 82C and a strip-shaped lower elastic area 82D are integrally formed, the elastic side areas 82C being formed by placing a substantially upwardly tapered outer layer material superior in elasticity between the both side edges 82b of the airbag corresponding area 82A and the both side edges 82e of the rear part area 82B and by seaming the outer layer material and corresponding both side edges together, the lower elastic area 82D being formed by placing the outer layer material between the lower edge 82c of the airbag corresponding area 82A and the lower edge 82f of the rear part area 82B and by seaming the outer layer material and corresponding lower edges together.

Figure 10B:
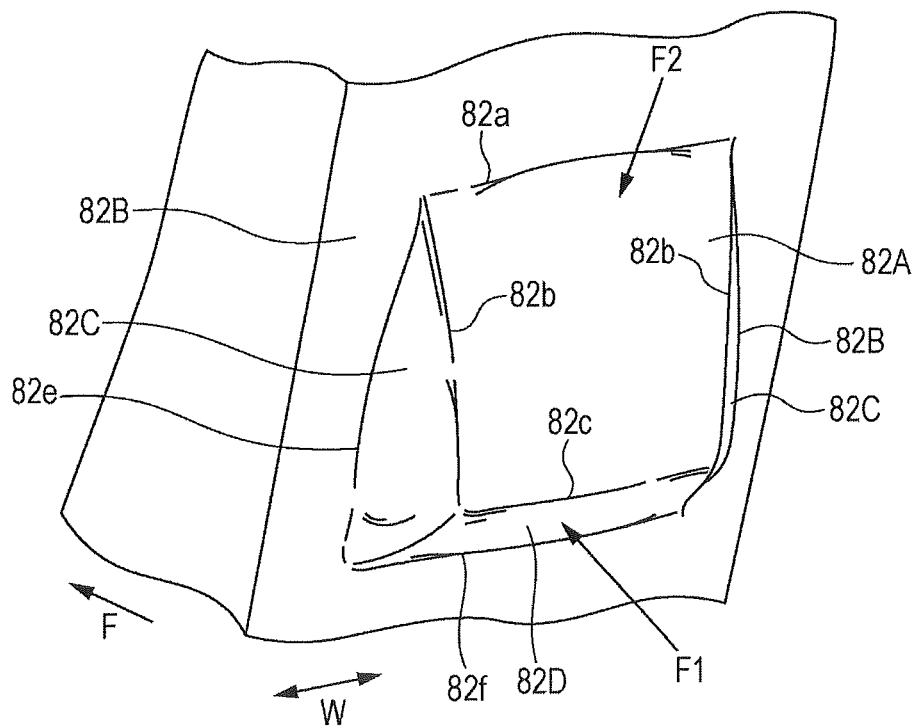

In this manner, the airbag 30 inflates and develops between the elastic installation supporting members 27 and the rear part 33 of the outer layer 31 due to a rear-end collision or the like. As illustrated in FIG. 10B, when the airbag corresponding area 82A included in the rear part 33 is pressed, the elastic both side areas 82C and the lower elastic area 82D having superior elasticity extend, and the lower edge 82c protrudes significantly rearward with respect to the upper edge 82a of the lid-shaped airbag corresponding area 82A, and thus the volume of inflation and development is ensured and the airbag 30 develops in a substantially triangular cross-sectional shape with which the energy absorbing stroke in a fore-and-aft direction of the vehicle body may be ensured.

The inflation and development of the airbag 30 are controlled and stable inflation and development are maintained by the elastic installation supporting members 27 and mainly the rear part 33 of the outer layer 31, that expands by the rear part area 82B surrounding the airbag corresponding area 82A and the expandable elastic both side areas 82C and lower elastic area 82D. Thus, rearward movement, due to a rear-end collision, of the upper body Pb of the seated person Pf on the front seat 10 is elastically received by the airbag 30 and the rearward movement is restrained.

On the other hand, diagonally upwardly pushed knees Pn of the seated person Pr on the rear seat 60 are elastically received effectively by the lower portion of the airbag 30 which has significantly expanded and developed between the elastic installation supporting members 27 and the outer layer 31 in the seat back 20, and thus forward movement is restrained and the upper body Pb of the seated person Pf on the front seat 10 avoids receiving the impact force F1 from the knees Pn of the seated person Pr on the rear seat 60. Similarly, the impact force F1 from the knees and the impact force F2 from the upper body of the seated person Pr moving forward on the rear seat 60 are elastically received and protected by the airbag 30 which inflates, develops and expands.

Figure 11A:
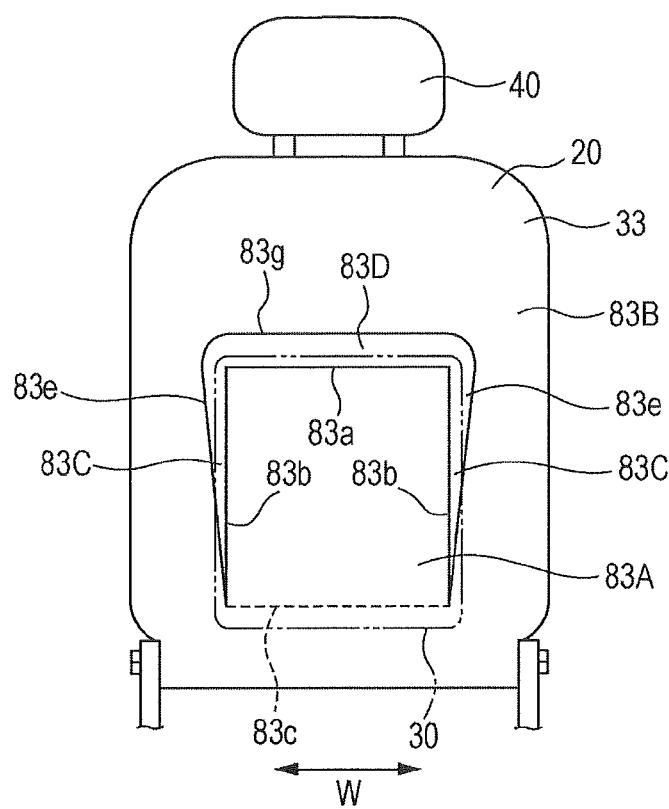
FIG. 11A is a schematic explanatory diagram of the rear part of the seat back and FIG. 11B is an operation explanatory diagram of the seat back.

Another rear part 33, which is of the outer layer 31 of the seat back 20 and expands along with the inflation and development of the airbag 30, has an airbag corresponding area 83A corresponding to the airbag 30 of the rear part 33 and a rear part area 83B surrounding the airbag corresponding area 83A as illustrated in FIG. 11A, the airbag corresponding area 83A being defined as a substantially U-shape along both side edges 83b and a upper edge 83a, the rear part area 83B having both side edges 83e and a upper edge 83g, the both side edges 83e being gradually away from the both side edges 83b as being located downward from the lower end of each side edge 83b, the upper edge 83g extending from the upper edge 83a with a predetermined distance apart and having both ends connected with the upper ends of the both side edges 83e. The airbag corresponding area 83A is formed in a substantially rectangular lid shape having an lower edge 83c which is connected with the rear part area 83B.

A pair of elastic side areas 83C and a strip-shaped upper elastic area 83D are integrally formed, the elastic side areas 83C being formed by placing a substantially downwardly tapered outer layer material superior in elasticity between the both side edges 83b of the airbag corresponding area 83A and the both side edges 83e of the rear part area 83B and by seaming the outer layer material and corresponding both side edges together, the upper elastic area 83D being formed by placing the outer layer material between the upper edge 83a of the airbag corresponding area 83A and the upper edge 83g of the rear part area 83B and by seaming the outer layer material and corresponding upper edges together.

Figure 11B:
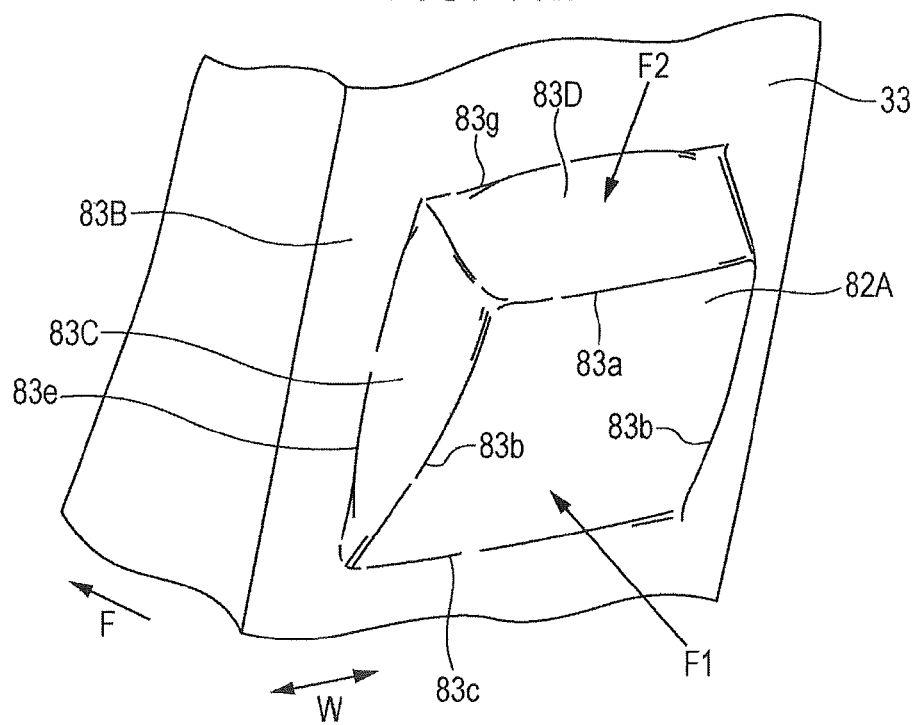

In this manner, the airbag 30 inflates and develops between the elastic installation supporting members 27 and the outer layer 31 due to a rear-end collision or the like. As illustrated in FIG. 11B, when the airbag corresponding area 83A is pressed from the inner side of the seat back including the rear part 33, the elastic both side areas 83C and the upper elastic area 83D having superior elasticity extend, and the airbag 30 inflates and develops in a substantially triangular cross-sectional shape in which the upper edge 83a protrudes significantly rearward with respect to the lower edge 83c of the lid-shaped airbag corresponding area 83A.

The inflation and development of the airbag 30 are controlled and stable inflation and development are maintained by the elastic installation supporting members 27 and mainly the rear part 33 of the outer layer 31, that expands by the rear part area 83B surrounding the airbag corresponding area 83A and the expandable elastic both side areas 83C and upper elastic area 83D. Thus, rearward movement, due to a rear-end collision, of the upper body Pb of the seated person Pf on the front seat 10 is elastically received by the airbag 30 and the rearward movement is regulated.

On the other hand, diagonally upwardly pushed knees Pn of the seated person Pr on the rear seat 60 are elastically received effectively by the lower portion of the airbag 30 which has expanded and developed to be inclined between the elastic installation supporting members 27 and the outer layer 31 in the seat back 20, and the upper body is elastically received effectively by the upper portion of the airbag 30 which inflates and develops significantly. The upper body Pb of the seated person Pf on the front seat 10 is protected against the impact force F1 from the knees Pn of the seated person Pr on the rear seat 60. Similarly, the impact force F1 from the knees Pn and the impact force F2 from the upper body of the seated person Pr moving forward on the rear seat 60 are elastically received and protected by the airbag 30 which inflates.

Figure 12A:
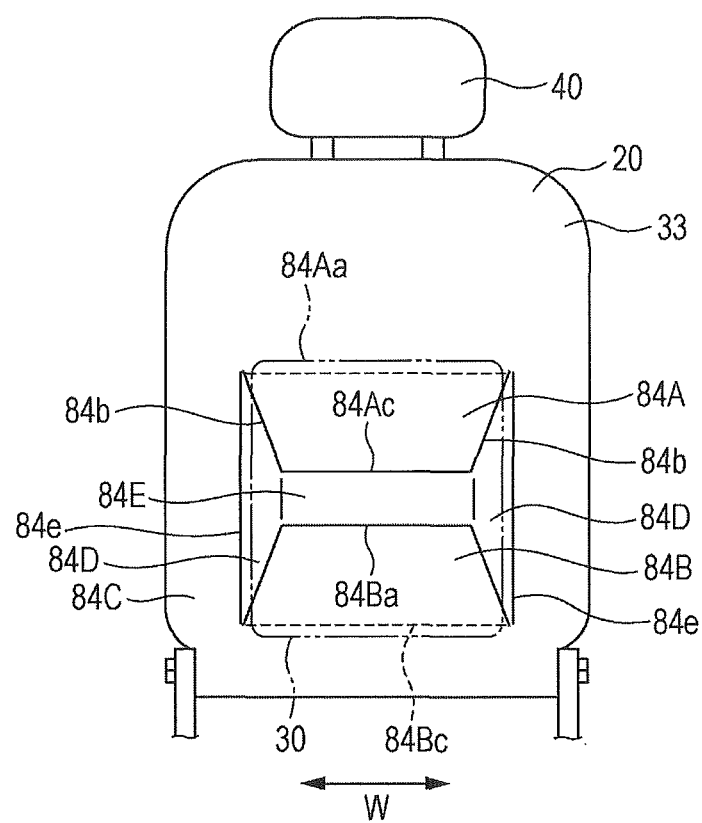
FIG. 12A is a schematic explanatory diagram of the rear part of the seat back and FIG. 12B is an operation explanatory diagram of the seat back.

As illustrated in FIG. 12A, another rear part 33, which is of the outer layer 31 of the seat back 20 and expands along with the inflation and development of the airbag 30, has an upper airbag corresponding area 84A and a lower airbag corresponding area 84B that correspond to the airbag 30 of the rear part 33, and a rear part area 84C, the upper and lower airbag corresponding areas 84A, 84B having both side edges 84b separated above and below and a lower edge 84Ac and an upper edge 84Ba separated across a central portion, a rear part area 84C surrounding the upper airbag corresponding area 84A and the lower airbag corresponding area 84B, the rear part area 84C having side edges 84e each being gradually away from the corresponding side edge 84b as being located near the center in a height direction from the lower end and the upper end of the side edge 84b. The upper airbag corresponding area 84A and the lower airbag corresponding area 84B is formed in a substantially rectangular lid shape having an upper edge 84Aa and a lower edge 84Bc which are connected with the rear part area 84C, the lower edge 84Ac and the upper edge 84Ba facing each other with a space.

A pair of elastic side areas 84D and an elastic central area 84E are integrally formed, the elastic side areas 84D being formed by placing an outer layer material superior in elasticity between the side edges 84b of the upper and lower airbag corresponding areas 84A, 84B and the side edges 84e of the rear part area 84C and by seaming the side edges 84b and the side edges 84e together, the elastic central area 84E being formed by placing a strip-shaped outer layer material superior in elasticity between the lower edge 84Ac of the upper airbag corresponding area 84A and the upper edge 84Ba of the lower airbag corresponding area 84B and by seaming the lower edge 84Ac and the upper edge 84Ba together. Consequently, the inflation and development of the airbag 30 are controlled and stable inflation and development are maintained by the elastic installation supporting members 27, and mainly the rear part area 84C surrounding the upper airbag corresponding area 84A and the lower airbag corresponding area 84B, and the rear part 33 of the outer layer 31, that expands by the expandable elastic side areas 84D and elastic central area 84E.

Figure 12B:
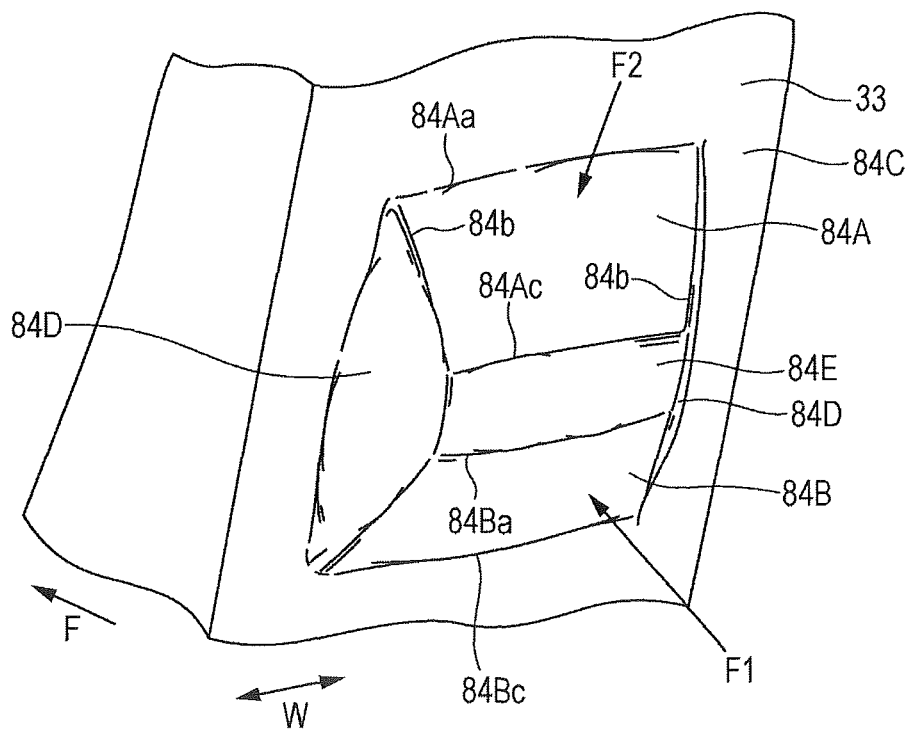

In this manner, the airbag 30 inflates and develops between the elastic installation supporting members 27 and the rear part 33 of the outer layer 31 due to a rear-end collision or the like. As illustrated in FIG. 12B, when the upper airbag corresponding area 84A and the lower airbag corresponding area 84B are pressed from the inner side of the seat back including the rear part 33, the elastic side areas 84D and the elastic central area 84E having superior elasticity extend, and the airbag 30 inflates and develops in a substantially trapezoidal cross-sectional shape in which the lower edge 84Ac protrudes rearwardly with respect to the upper edge 84Aa of the lid-shaped upper airbag corresponding area 84A, the upper edge 84Ba protrudes rearwardly with respect to the lower edge 84Bc of the lower airbag corresponding area 84B, and the upper airbag corresponding area 84A and the lower airbag corresponding area 84B are inclined. Thus, rearward movement, due to a rear-end collision, of the upper body Pb of the seated person Pf on the front seat 10 is elastically received by the airbag 30 and the rearward movement is regulated.

On the other hand, diagonally upwardly pushed knees Pn of the seated person Pr on the rear seat 60 are elastically received effectively by the lower portion of the airbag 30 which has expanded and developed to be inclined, and the upper body is elastically received effectively by the upper portion of the airbag 30 which inflates and develops, and forward movement is restrained, and thus the upper body Pb of the seated person Pf on the front seat 10 avoids receiving the impact force F1 from the knees of the seated person Pr on the rear seat 60. Similarly, the impact force F1 from the knees Pn and the impact force F2 from the upper body of the seated person Pr moving forward on the rear seat 60 are elastically received and protected by the airbag 30 which inflates, develops and expands.

The inflation and development of the airbag 30 are controlled and stable inflation and development are maintained by the elastic installation supporting members 27, and mainly the rear part area 84C surrounding the upper airbag corresponding area 84A and the lower airbag corresponding area 84B, and the rear part 33 of the outer layer 31, that expands by the expandable elastic side areas 84D and elastic central area 84E.

Figure 13A:
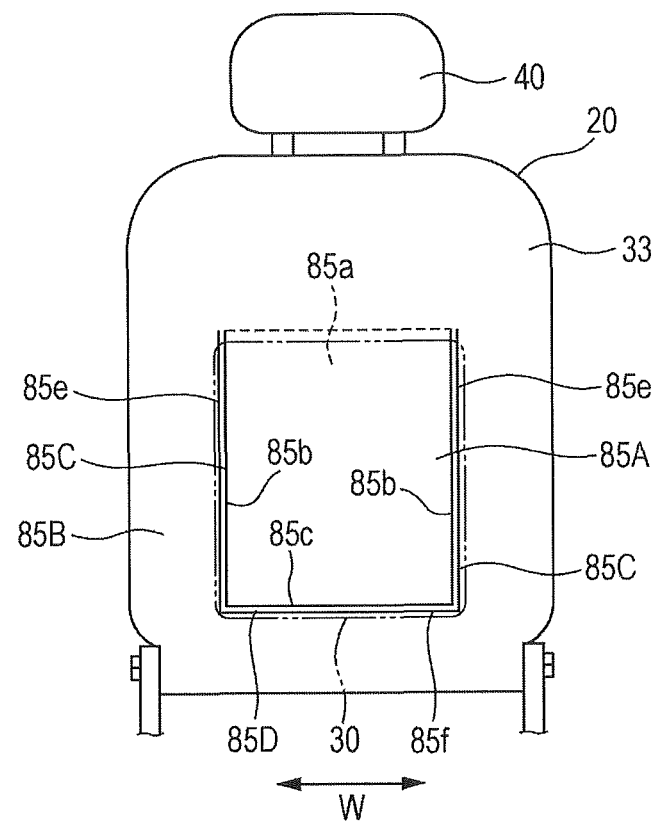
FIG. 13A is a schematic explanatory diagram of the rear part of the seat back and FIG. 13B is an operation explanatory diagram of the seat back.

Another rear part 33, which is of the outer layer 31 of the seat back 20 and expands along with the inflation and development of the airbag 30, has an airbag corresponding area 85A corresponding to the airbag 30 of the rear part 33 and a rear part area 85B surrounding the airbag corresponding area 85A as illustrated in FIG. 13A, the airbag corresponding area 85A being defined as a substantially U-shape along both side edges 85b and a lower edge 85c, the rear part area 85B having both side edges 85e and a lower edge 85f along the side edges 85b and the lower edge 85c of the airbag corresponding area 85A. The airbag corresponding area 85A is formed in a substantially rectangular lid shape having an upper edge 85a which is connected with the rear part area 85B.

A gusset 85C folded in an upward tapered shape is placed between each side edge 85b of the airbag corresponding area 85A and a corresponding side edge 85e of the rear part area 85B, and the gusset and the side edges are seamed together. Similarly, a gusset 85D folded in a strip form is placed between the lower edge 85c of the airbag corresponding area 85A and the lower edge 85f of the rear part area 85B, and the gusset and the lower edges are seamed together. Furthermore, the side edges 85b and the lower edge 85c of the airbag corresponding area 85A, and the side edge 85e and the lower edge 85f of the rear part area 85B are seamed together by a relatively fragile seam thread (not illustrated) with the corresponding edges overlapped or in contact with each other, the seam thread being breakable by the inflation and development of the airbag 30.

Figure 13B:
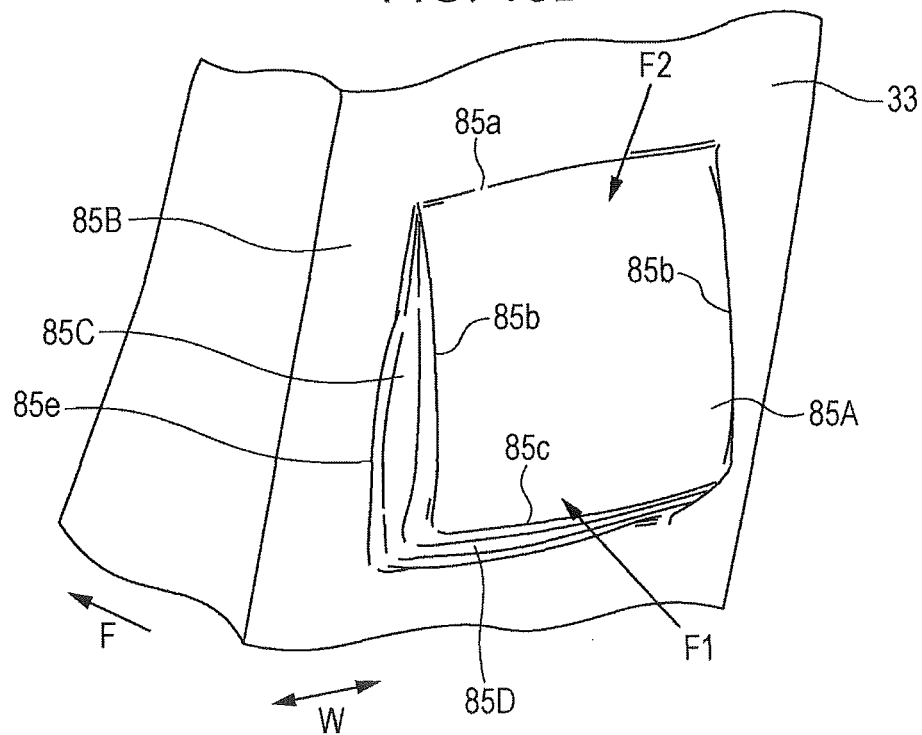

In this manner, the airbag 30 inflates and develops between the elastic installation supporting members 27 and the rear part 33 of the outer layer 31 due to a rear-end collision or the like. As illustrated in FIG. 13B, when the airbag corresponding area 85A included in the rear part 33 is pressed, the pressure causes the seam thread to be broken, the seam thread being used for seaming the side edges 85b and the lower edge 85c of the airbag corresponding area 85A, and the side edge 85e and the lower edge 85f of the rear part area 85B together. Thus, the gusset 85C and the gusset 85D extend and develop, and the airbag 30 inflates and develops in a substantially triangular cross-sectional shape in which the volume of inflation and development is ensured such that the lower edge 85c protrudes significantly rearward with respect to the upper edge 85a of the lid-shaped airbag corresponding area 85A.

In the inflation and development of the airbag 30, development behavior and development pattern are controlled and stable inflation and development pattern are maintained by the elastic installation supporting members 27, and mainly the rear part area 85B surrounding the airbag corresponding area 85A, and the expandable gusset 85C and gusset 85D. Thus, rearward movement, due to a rear-end collision, of the upper body Pb of the seated person Pf on the front seat 10 is elastically received by the airbag 30 and the rearward movement is regulated.

On the other hand, diagonally upwardly pushed knees Pn of the seated person Pr on the rear seat 60 are elastically received effectively by the lower portion of the airbag 30 which has significantly expanded and developed, and thus forward movement is restrained and the seated person Pf on the front seat 10 avoids receiving the impact force F1 from the knees Pn of the seated person Pr on the rear seat 60. Similarly, the impact force F1 from the knees Pn and the impact force F2 from the upper body of the seated person Pr moving forward on the rear seat 60 are elastically received and protected by the airbag 30 which inflates, develops and expands.

Figure 14A:
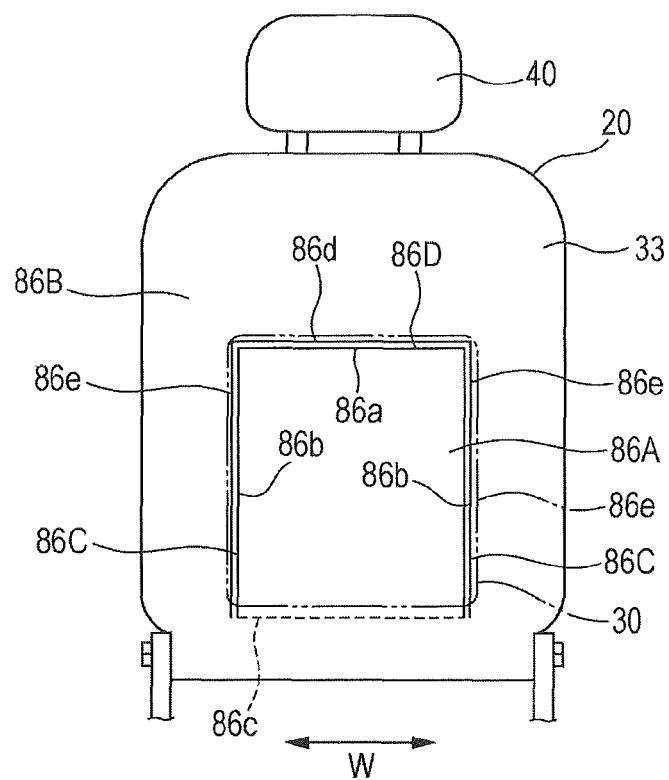
FIG. 14A is a schematic explanatory diagram of the rear part of the seat back and FIG. 14B is an operation explanatory diagram of the seat back.

Another rear part 33, which is of the outer layer 31 of the seat back 20 and expands along with the inflation and development of the airbag 30, has an airbag corresponding area 86A corresponding to the airbag 30 of the rear part 33 and a rear part area 86B surrounding the airbag corresponding area 86A as illustrated in FIG. 14A, the airbag corresponding area 86A being defined as a substantially U-shape along both side edges 86*b* and an upper edge 86*a*, the rear part area 86B having both side edges 86*e* and an upper edge 86*d* along the side edges 86*b* and the upper edge 86*a* of the airbag corresponding area 86A. The airbag corresponding area 86A is formed in a substantially rectangular lid shape having a lower edge 86*c* which is connected with the rear part area 86B.

A gusset 86C folded in a downward tapered shape is placed between each side edge 86*b* of the airbag corresponding area 86A and the corresponding side edge 86*e* of the rear part area 86B, and the gusset and the side edges are seamed together. Similarly, a gusset 86D folded in a strip form is placed between the upper edge 86*a* of the airbag corresponding area 86A and the upper edge 86*d* of the rear part area 86B, and the gusset and the lower edges are seamed together. Furthermore, the side edges 86*b* and the upper edge 86*a* of the airbag corresponding area 86A, and the side edge 86*e* and the lower edge 86*d* of the rear part area 86B are seamed together by a relatively fragile seam thread with the corresponding edges overlapped or in contact with each other, the seam thread being breakable by the inflation and development of the airbag 30.

Figure 14B:
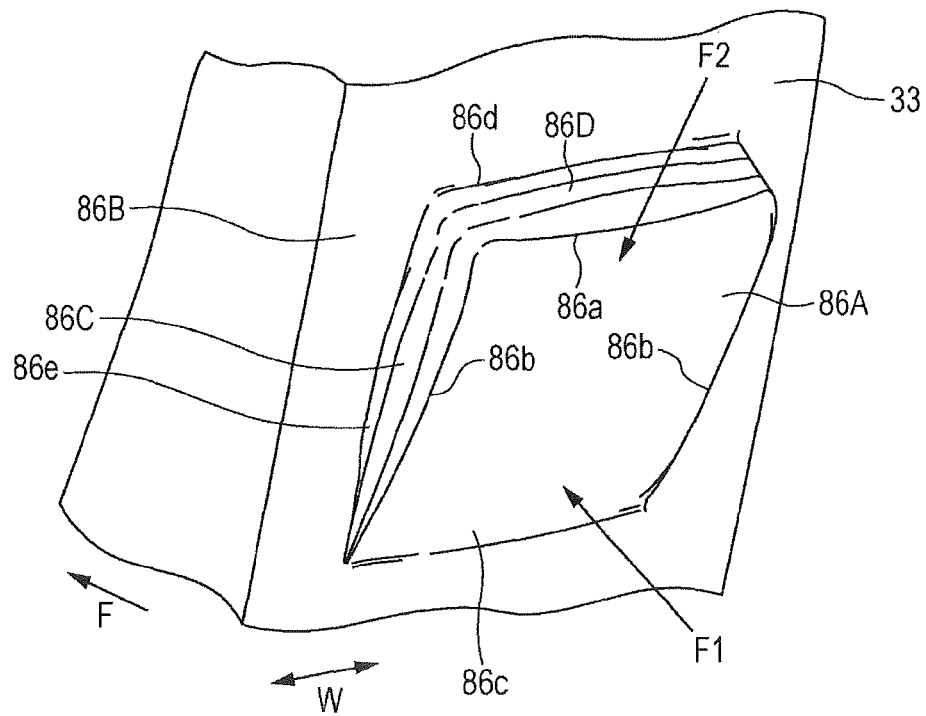

In this manner, the airbag 30 inflates and develops between the elastic installation supporting members 27 and the rear part 33 of the outer layer 31 due to a rear-end collision or the like. As illustrated in FIG. 14B, when the airbag corresponding area 86A included in the rear part 33 is pressed, the pressure causes the seam thread to be broken, the seam thread being used for seaming the side edges 86*b* and the upper edge 86*a* of the airbag corresponding area 86A, and the side edge 86*e* and the upper edge 86*d* of the rear part area 86B together. Thus, the gusset 86C and the gusset 86D extend and develop, and the airbag 30 inflates and develops in a substantially triangular cross-sectional shape in which the volume of inflation and development and the energy absorbing stroke are ensured such that the upper edge 86*a* protrudes significantly rearward with respect to the lower edge 86*c* of the lid-shaped airbag corresponding area 86A. Thus, rearward movement, due to a rear-end collision, of the upper body Pb of the seated person Pf on the front seat 10 is elastically received by the airbag 30 and is regulated.

On the other hand, the seated person Pr on the rear seat 60 is elastically received effectively by the lower portion of the airbag 30 which has significantly expanded and developed, and thus forward movement is restrained and the seated person Pf on the front seat 10 avoids receiving the impact force F1 from the knees Pn of the seated person Pr on the rear seat 60. Similarly, the impact force F1 from the knees Pn and the impact force F2 due to contact of the upper body of the seated person Pr moving forward on the rear seat 60 are elastically received and protected by the airbag 30 which inflates, develops and expands.

Figure 15A:
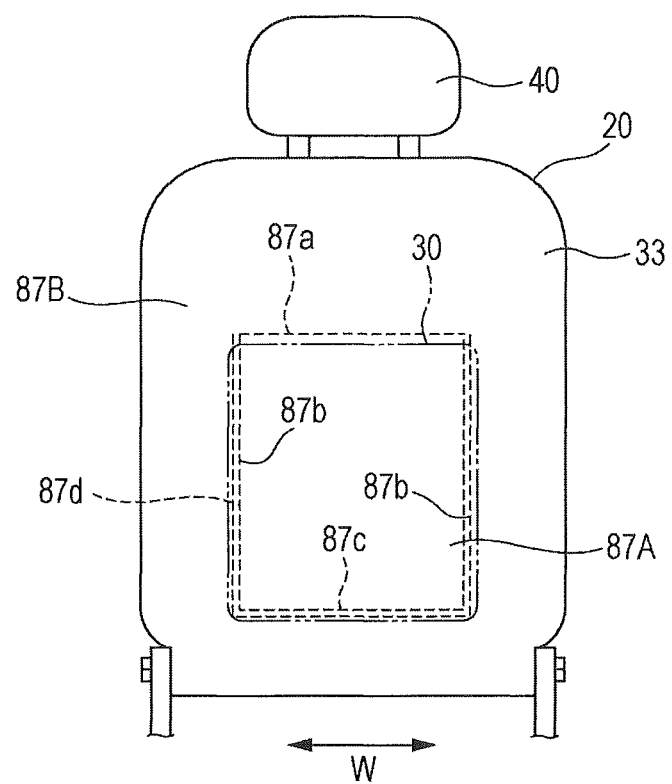
FIG. 15A is a schematic explanatory diagram of the rear part of the seat back and FIG. 15B is an operation explanatory diagram of the seat back.

Another rear part 33, which is of the outer layer 31 of the seat back 20 and expands along with the inflation and development of the airbag 30, has an airbag corresponding area 87A corresponding to the airbag 30 of the rear part 33 and a rear part area 87B surrounding the airbag corresponding area 87A as illustrated in FIG. 15A, the airbag corresponding area 87A being partitioned by a fragile portion 87*d* which is a substantially U-shape along both side edges 87*b* and a lower edge 87*c* and which serves as a rupture portion which is breakable by the inflation and development of the airbag 30. The airbag corresponding area 87A is formed in a substantially rectangular lid shape having an upper edge 87*a* which is connected with the rear part area 87B.

Figure 15B:
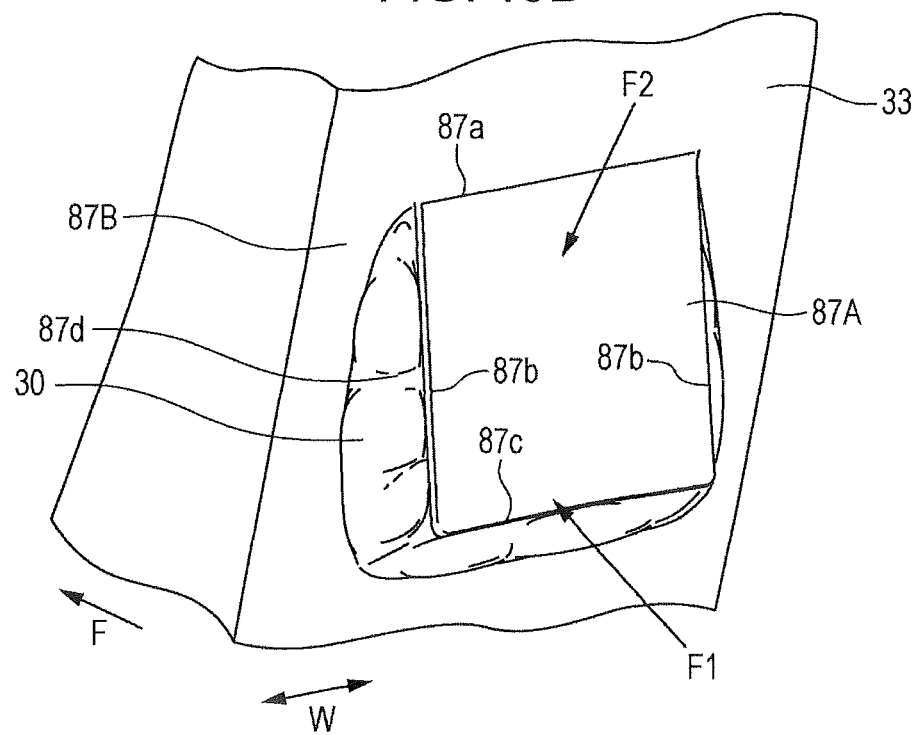

In this manner, the airbag 30 inflates and develops between the elastic installation supporting members 27 and the rear part 33 of the outer layer 31 due to a rear-end collision or the like. As illustrated in FIG. 15B, when the airbag corresponding area 87A included in the rear part 33 is pressed, the pressure causes the fragile portion 87*d* to be gradually ruptured and opened from below, and the airbag 30 inflates and develops in a substantially triangular cross-sectional shape in which the volume of inflation and development and the energy absorbing stroke are ensured such that the lower edge 87*c* of the airbag corresponding area 87A protrudes significantly rearward, the fragile portion 87*d* being formed along the area from the lower edge 87*c* to the both side edges 87*b*.

The inflation and development of the airbag 30 are controlled and thus stable inflation and development are maintained by the elastic installation supporting members 27 and the rear part area 87B surrounding the airbag corresponding area 87A which is ruptured in the fragile portion 87*d* along with the inflation and development of the airbag 30. Thus, rearward movement, due to a rear-end collision, of the upper body Pb of the seated person Pf on the front seat 10 is elastically received by the airbag 30 and the rearward movement is regulated.

On the other hand, diagonally upwardly pushed knees Pn of the seated person Pr on the rear seat 60 are elastically received effectively by the lower portion of the airbag 30 which has expanded and developed, and thus forward movement is restrained and the upper body Pb of the seated person Pf on the front seat 10 avoids receiving the impact force F1 from the knees Pn of the seated person Pr on the rear seat 60. Similarly, the impact force F1 due to contact of the knees and the impact force F2 due to contact of the upper body of the seated person Pr on the rear seat 60 are elastically received and protected by the airbag 30 which inflates, develops and expands.

Figure 16A:
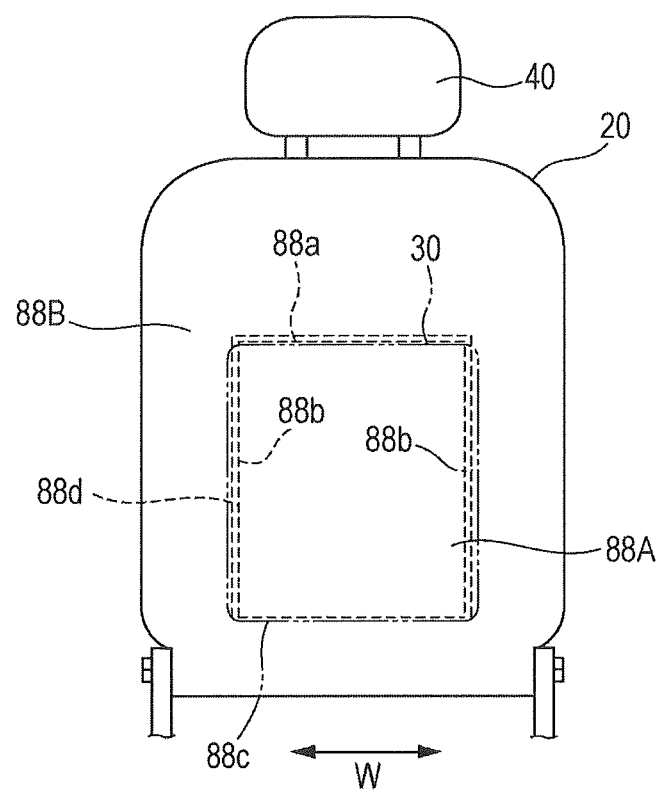
FIG. 16A is a schematic explanatory diagram of the rear part of the seat back and FIG. 16B is an operation explanatory diagram of the seat back.

Another rear part 33, which is of the outer layer 31 of the seat back 20 and expands along with the inflation and development of the airbag 30, has an airbag corresponding area 88A corresponding to the airbag 30 of the rear part 33 and a rear part area 88B surrounding the airbag corresponding area 88A as illustrated in FIG. 16A, the airbag corresponding area 88A being partitioned by a fragile portion 88*d* which is a substantially U-shape along both side edges 88*b* and an upper edge 88*a* and which serves as a rupture portion which is breakable by the inflation and development of the airbag 30. The airbag corresponding area 88A is formed in a substantially rectangular lid shape having a lower edge 88*c* which is connected with the rear part area 88B.

Figure 16B:
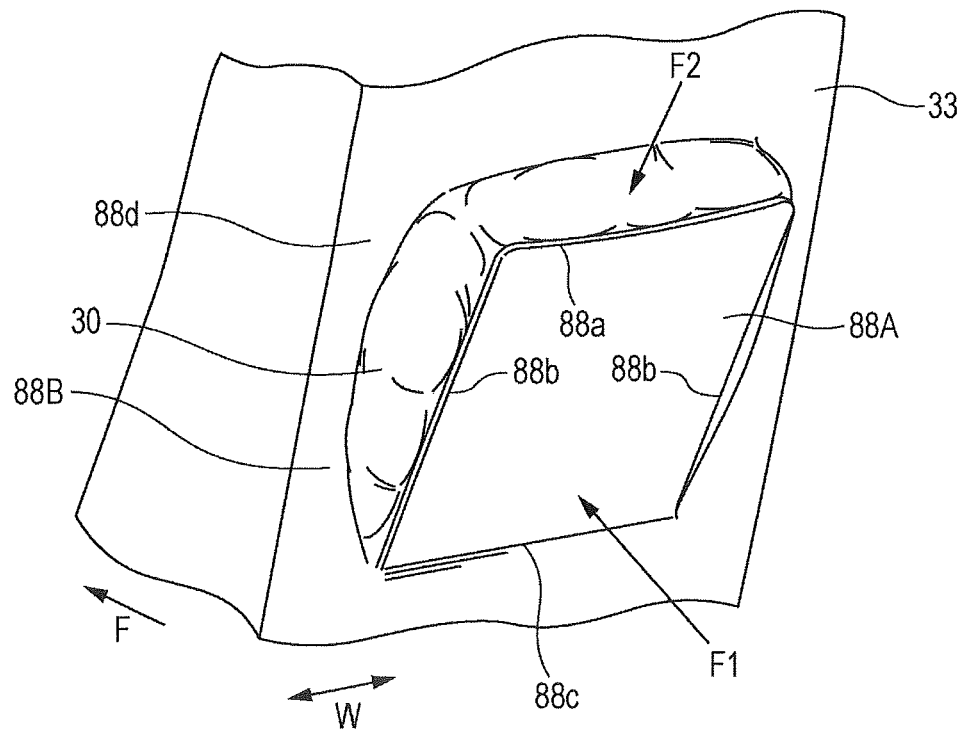

In this manner, the airbag 30 inflates and develops between the elastic installation supporting members 27 and the rear part 33 of the outer layer 31 due to a rear-end collision or the like. As illustrated in FIG. 16B, when the airbag corresponding area 88A included in the rear part 33 is pressed, the pressure causes the fragile portion 88d to be gradually ruptured and opened from above, and the airbag 30 inflates and develops in a substantially triangular cross-sectional shape in which the volume of inflation and development and the energy absorbing stroke are ensured such that the upper edge 88a of the airbag corresponding area 88A protrudes significantly rearward, the fragile portion 88d being formed along the area from the upper edge 88c to the both side edges 88b.

The inflation and development of the airbag 30 are controlled and stable inflation and development are maintained by the elastic installation supporting members 27 and the rear part area 88B surrounding the airbag corresponding area 88A which is divided via the fragile portion 88d that is ruptured along with the inflation and development of the airbag 30. Thus, rearward movement, due to a rear-end collision, of the upper body Pb of the seated person Pf on the front seat 10 is elastically received by the airbag 30 and the rearward movement is regulated.

On the other hand, diagonally upwardly pushed knees Pn of the seated person Pr on the rear seat 60 are elastically received by the lower portion of the airbag 30 and forward movement is restrained, whereas the upper body such as the chest is elastically received by the upper portion of the airbag 30 which has significantly expanded and developed, and forward movement is restrained.

In this manner, the upper body Pb of the seated person Pf on the front seat 10 avoids receiving the impact force F1 from the knees Pn of the seated person Pr on the rear seat 60. Similarly, the impact force F1 due to contact of the knees and the impact force F2 from the upper body of the seated person Pr moving forward on the rear seat 60 are elastically received and protected by the airbag 30 which inflates, develops and expands.

Another rear part 33, which is of the outer layer 31 of the seat back 20 and expands along with the inflation and development of the airbag 30, has an upper airbag corresponding area 89A and a lower airbag corresponding area 89B that correspond to the airbag 30 of the rear part 33, and a rear part area 89C surrounding the upper airbag corresponding area 89A and the lower airbag corresponding area 89B, the upper airbag corresponding area 89A, the lower airbag corresponding area 89B, and the rear part area 89C being partitioned in a substantially H-shape by fragile portions 89c, 89d which are breakable by the inflation and development of the airbag 30, the substantially H-shape extending in a width direction at the center of both side edges 89b, 89b in a height direction. A lower edge 89Ac of the upper airbag corresponding area 89A and an upper edge 89Ba of the lower airbag corresponding area 89B are connected via the fragile portion 89. The upper airbag corresponding area 89A and the lower airbag corresponding area 89B are formed in a substantially rectangular lid shape respectively having an upper edge 89Aa and a lower edge 89Bc which are connected with the rear part area 89C.

Figure 17A:
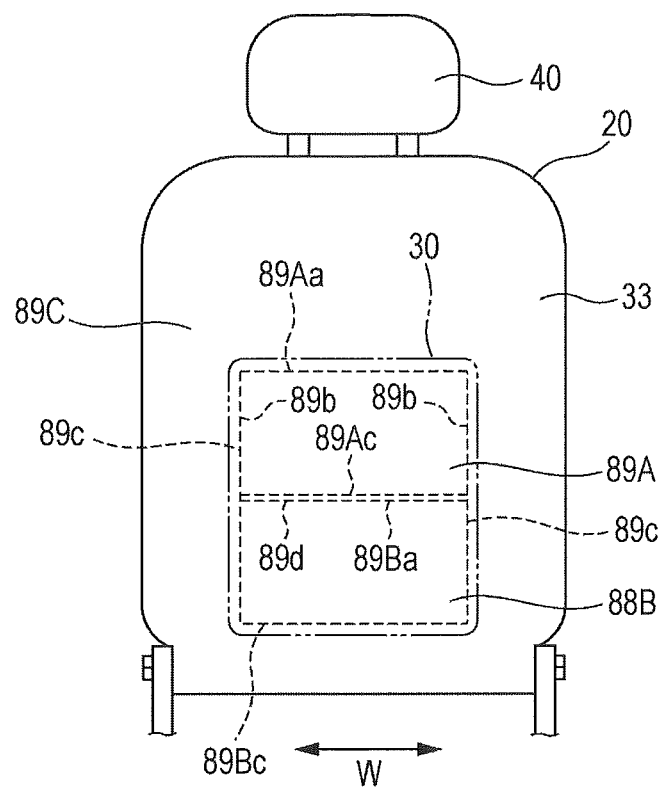
FIG. 17A is a schematic explanatory diagram of the rear part of the seat back and FIG. 17B is an operation explanatory diagram of the seat back.
Figure 17B:
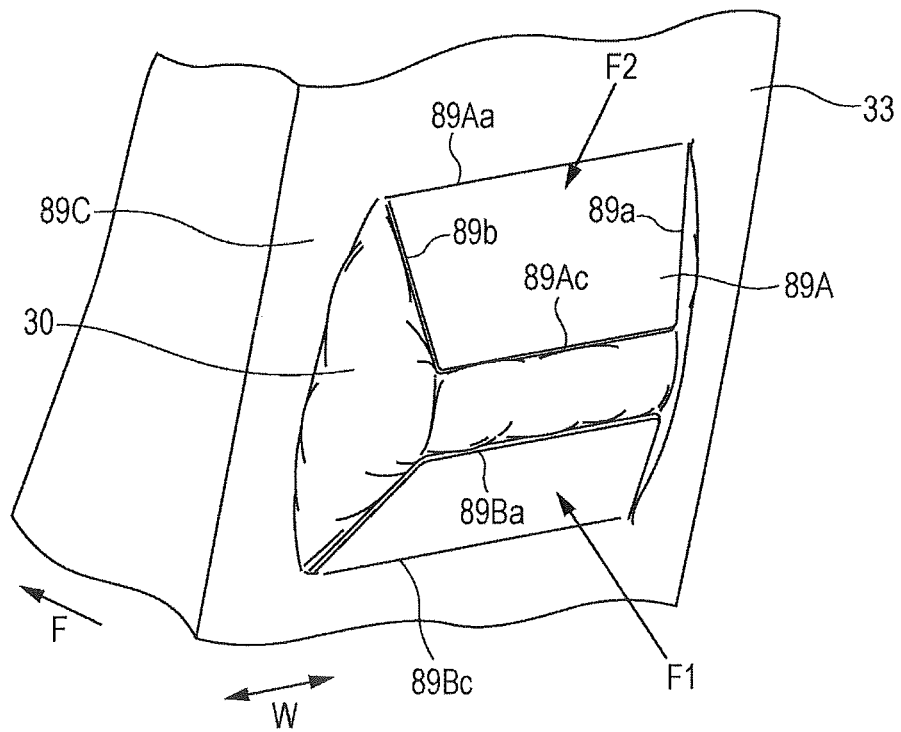

In this manner, the airbag 30 inflates and develops between the elastic installation supporting members 27 and the rear part 33 of the outer layer 31 due to a rear-end collision or the like. As illustrated in FIG. 17B, when the upper airbag corresponding area 89A and the lower airbag corresponding area 89B forming the rear part 33 are pressed, the pressure causes the fragile portion 89d and the fragile portions 89c to be gradually ruptured, the fragile portion 89d being between the upper airbag corresponding area 89A and the lower airbag corresponding area 89B, the fragile portions 89c being formed along the both side edges 89b. Then the space between the lower edge 89Ac of the upper airbag corresponding area 89A and the upper edge 89Ba of the lower airbag corresponding area 89B starts to be opened, and the airbag 30 inflates and develops in a substantially trapezoidal or triangular shape in which the volume of inflation and development and the energy absorbing stroke are available such that the lower edge 89Ac of the upper airbag corresponding area 89A and the upper edge 89Ba of the lower airbag corresponding area 89B at the center in a height direction protrude significantly rearward.

The inflation and development of the airbag 30 are controlled and stable inflation and development are maintained by the elastic installation supporting members 27, the upper airbag corresponding area 89A, the lower airbag corresponding area 89B, and the rear part area 89C surrounding the upper airbag corresponding area 89A and the lower airbag corresponding area 89B, the upper airbag corresponding area 89A and the lower airbag corresponding area 89B being ruptured in the fragile portions 89d, 89c along with the inflation and development of the airbag 30. Thus, rearward movement, due to a rear-end collision, of the upper body Pb of the seated person Pf on the front seat 10 is elastically received by the airbag 30 and the rearward movement is restrained.

On the other hand, diagonally upwardly pushed knees Pn of the seated person Pr on the rear seat 60 are elastically received by the lower portion of the airbag 30 which has expanded and developed between the elastic installation supporting members 27 and the rear part 33 of the outer layer 31 in the seat back 20, and forward movement is restrained, whereas the upper body such as the chest is elastically received by the upper portion of the airbag 30 which has significantly expanded and developed, and forward movement is restrained.

In this manner, the upper body Pb of the seated person Pf on the front seat 10 avoids receiving the impact force F1 from the knees Pn of the seated person Pr on the rear seat 60, and the seated person Pf on the front seat 10 is protected. Similarly, the impact force F1 from the knees and the impact force F2 from the upper body of the seated person Pr moving forward on the rear seat 60 are elastically received and protected by the airbag 30 which inflates, develops and expands.

In each of the above-described implementations, the rear board may be disposed along an expansion area which is formed in the rear part of the outer layer 31, and thus disposition of the rear board has no effect on the expansion deformation of the expansion area.

Thus, according to the above-described implementations, the simple configuration, in which the airbag disposed within the seat back causes the outer layer to expand rearward within the seat back, ensures the volume of inflation and development and the energy absorbing stroke of the airbag, thereby making it possible to elastically receive rearward movement of a seated person due to a collision and to protect the seated person against an impact from the rear. Consequently, without adopting a complicated configuration, direct protection of a seated person by the airbag at the time of a collision and accurate reduction of an impact from the rear of the seat back may be achieved.

Third Implementation

Figure 18:
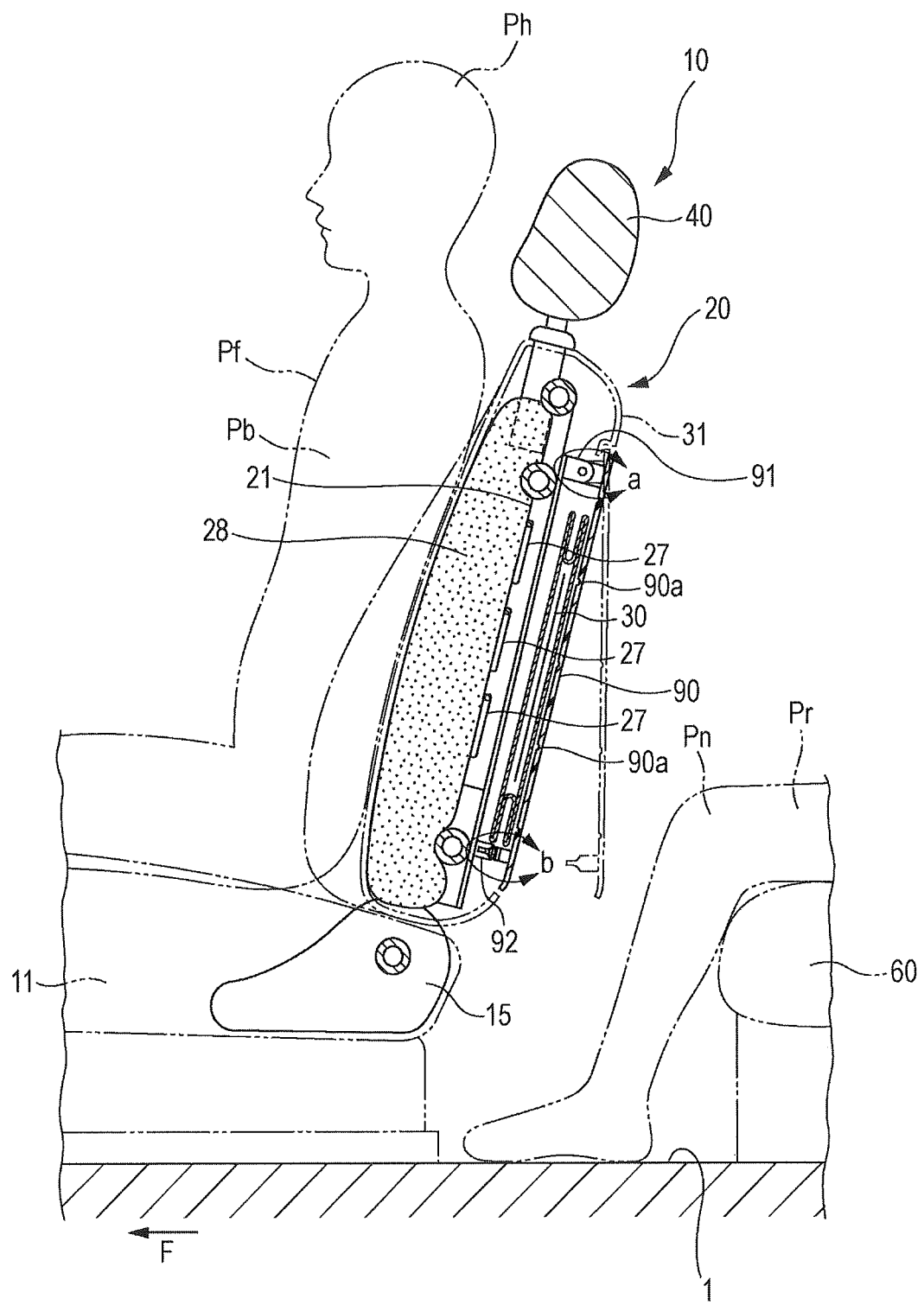
FIG. 18 is a schematic vertical cross-sectional view illustrating the outline of a vehicle seat according to a third implementation.
Figure 19:
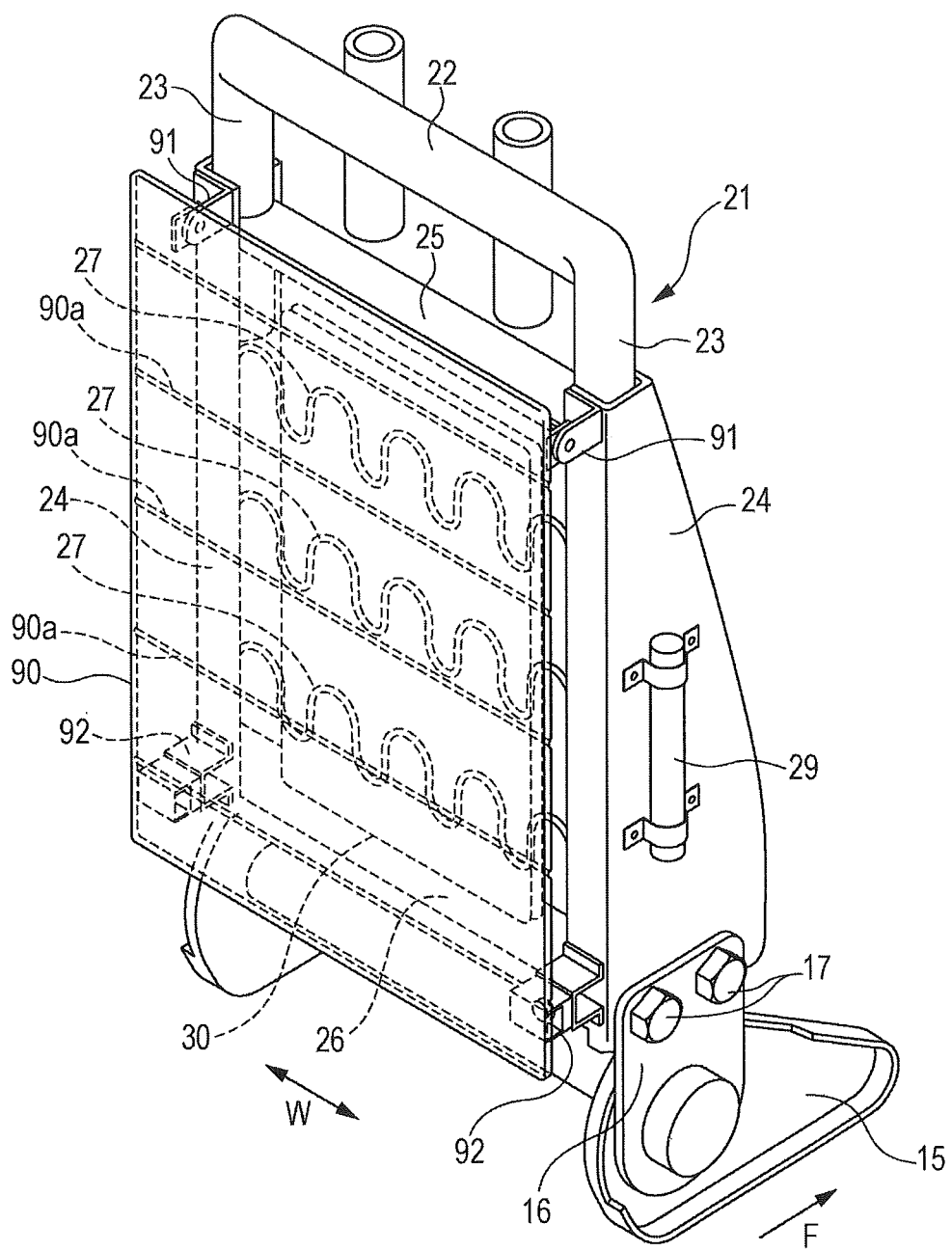
FIG. 19 is a schematic perspective view with partial cutaway of the vehicle seat as seen from the rear.
Figure 20A:
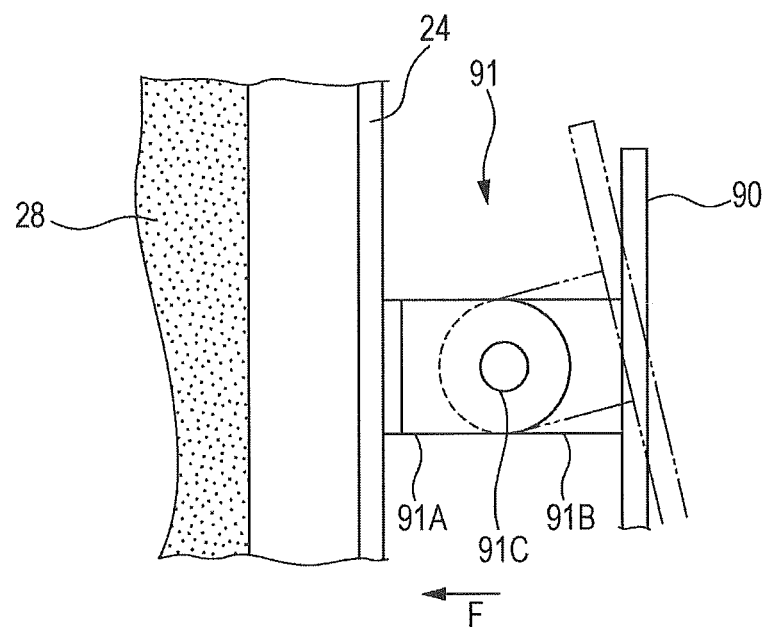
FIG. 20A is an enlarged view of portion a of FIG. 18 illustrating the outline of a rear board supporter and FIG. 20B is an enlarged view of portion b of FIG. 18 illustrating the outline of a rear board retainer.
Figure 20B:
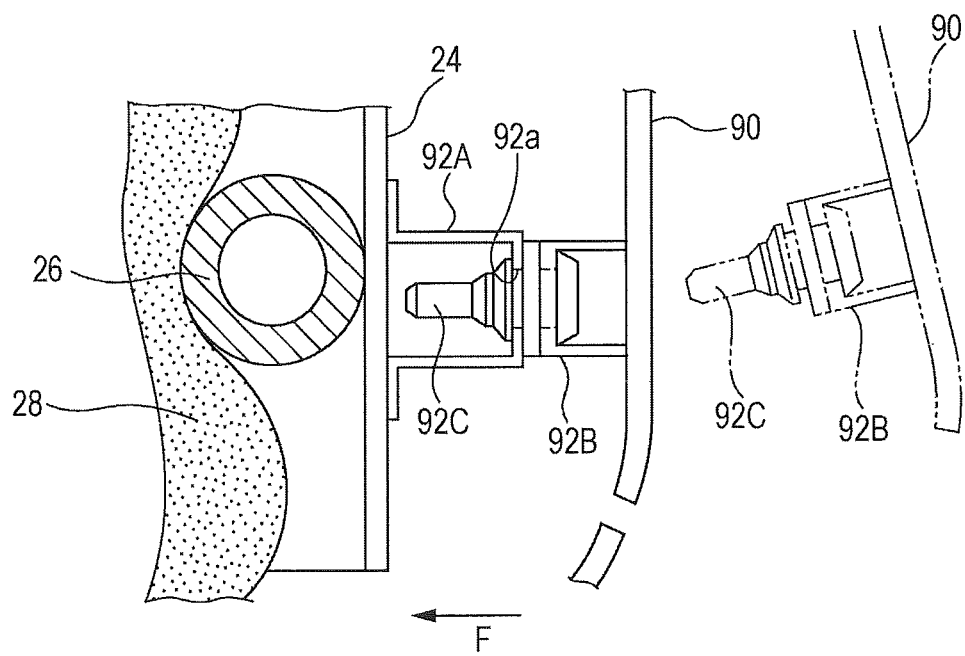
Figure 21:
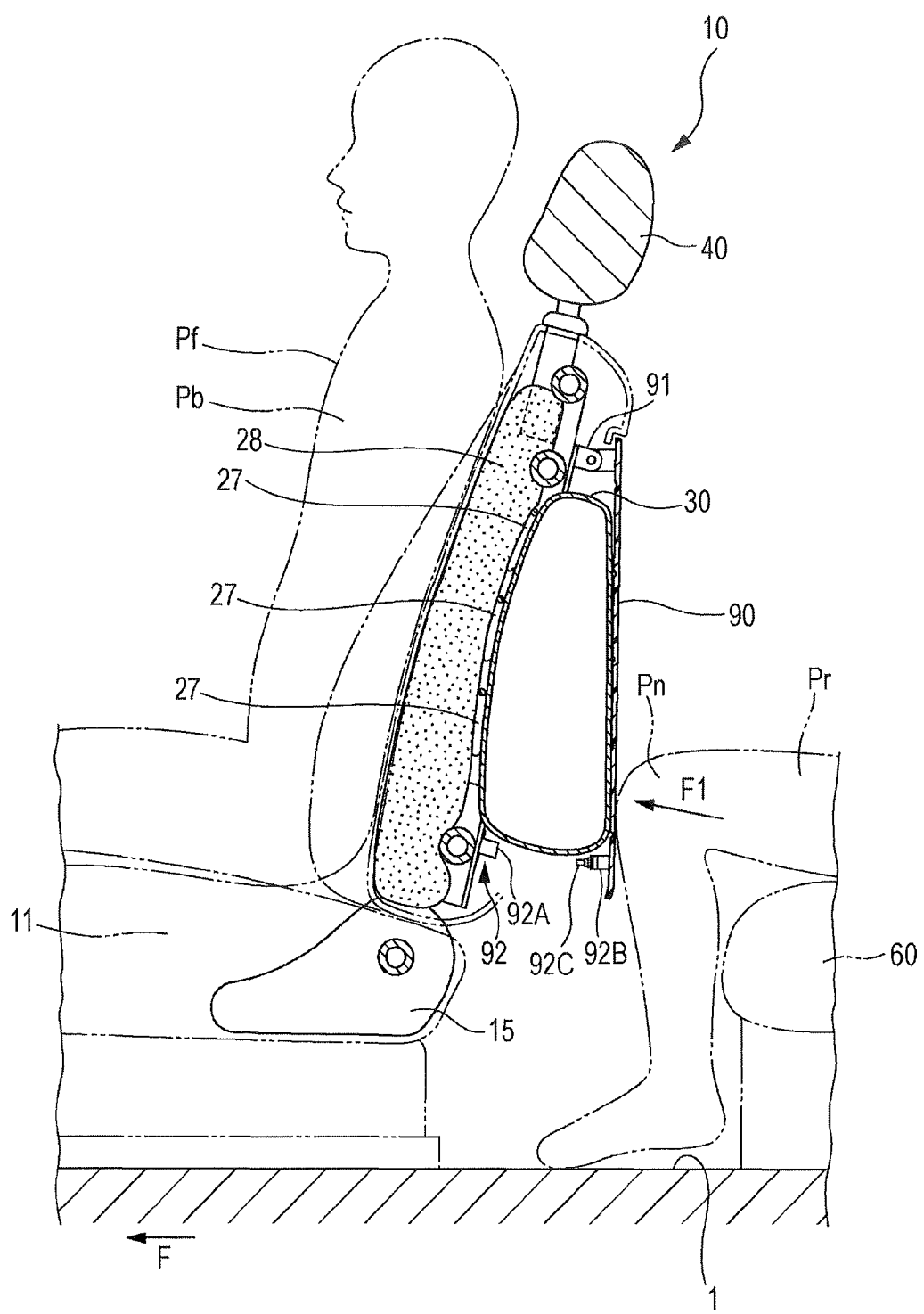
FIG. 21 is an operation explanatory diagram of the vehicle seat when an impact occurs.

A third implementation will be described with reference to FIGS. 18 to 22. FIG. 18 is a vertical cross-sectional view illustrating the outline of a vehicle seat; FIG. 19 is a schematic perspective view with partial cutaway of the vehicle seat as seen from the rear; FIG. 20A is an enlarged view of portion a of FIG. 18 illustrating the outline of a rear board supporter; FIG. 20B is an enlarged view of portion b of FIG. 18 illustrating the outline of a rear board retainer; and FIG. 21 is an operation explanatory diagram of the vehicle seat when an impact occurs. It is to be noted that the components corresponding to those in the first implementation are denoted by the same symbols and detailed description of the components is omitted.

As illustrated in FIGS. 18 and 19, in the front seat 10, a plurality of elastic installation supporting members 27 is provided in the seat back frame 21 that forms the framework of the seat back 20, the seat pad 28 is disposed on the front surface of the elastic installation supporting members 27, the airbag 30 in a contracted state is disposed between the elastic installation supporting members 27 and a rear board 90, and the entire components except for the rear board 90 are covered by the outer layer 31 in a bag shape.

The seat pad 28, which elastically supports the upper body Pb of the seated person Pf from the rear part side, is disposed on the front surface of the elastic installation supporting members 27, the seat pad being composed of a urethane foam material. The airbag 30, which is flatly folded in a rectangular shape in a contracted state, is disposed between the elastic installation supporting members 27 and the rear board 90.

The rear board 90 is in a substantially rectangular shape and covers the rear part of the seat back 20 in the rear of the airbag 30. The upper portion and the lower portion of the rear board 90 are attached to the seat back frame 21 by a rear board supporter 91 and a rear board retainer 92, respectively. It is to be noted that the rear board 90 is made of a hard resin and includes a plurality of fragile portions 90a that are each formed as a groove or a thin layer to achieve predetermined bending deformation. Also, due to the formation of the fragile portions 90a, when an excessive load is applied to the rear board 90, the rear board 90 bends along the fragile portions 90a or are ruptured along the fragile portions 90a and thus fracture of unspecified portions is prevented and at the time of fracture, occurrence of sharp protrusions on a fracture surface, that is, occurrence of sharp edges may be avoided.

As illustrated in FIGS. 18 and 20A, the rear board supporter 91 includes a supporting bracket 91A, a bracket 91B, and a hinge mechanism 91C, the supporting bracket being connected to the upper end rear face of the right and left side brackets 24 and protruding rearward, the bracket being connected to the upper both ends of the rear board 90 and protruding forward, the hinge mechanism connecting the supporting bracket and bracket in a swingable manner. In this manner, the upper portion of the rear board 90 is supported by the upper portion of the seat back frame 21 via the hinge mechanism 91C as a fulcrum in a forwardly and rearwardly swingable manner.

As illustrated in FIGS. 18 and 20B, the rear board retainer 92 is a hat-like shape which is attached to the lower end rear face of each side bracket 24, and includes a retaining bracket 92A, a clip holder 92B, and a clip 92C, the retaining bracket including a clip retaining hole 92a on a portion of the rear board 90 in a protruding manner, the clip being mounted and supported on the end of the clip holder. The clip 92C mounted and supported on the clip retainer 92B is inserted and retained in the clip retaining hole 92a of the retaining bracket 92A provided in the side bracket 24, thereby fixing the rear board 90 at a normal use position illustrated in FIG. 18.

On the other hand, when a load greater than or equal to a predetermined value is applied to the front surface of the rear board 90 from the front, as illustrated in FIGS. 18 and 20B by a virtual line, along with rearward movement of the rear board 90, the clip 92C mounted and supported on the clip retainer 92B is removed from the clip retaining hole 92a of the retaining bracket 92A and the fixing is released.

On the other hand, when the airbag 30 inflates and develops between the elastic installation supporting members 27 and the rear board 90 due to expanded gas injection of the inflator 29, as illustrated in FIG. 21, the airbag 30 pushes forward and urges the elastic installation supporting members 27 and the seat pad 28 so as to allow the upper body Pb of the seated person Pf to be elastically supported from the rear side, and the airbag 30 also pushes the rear board 90 rearward to remove the clip 92C mounted and supported on the clip retainer 92B from the clip retaining hole 92a of the retaining bracket 92A, and thus the fixing is released. In addition, the rear board 90 is moved rearward, that is, the rear board 90 is swung rearward, thereby ensuring the volume of inflation and development of the airbag 30 and the energy absorbing stroke of the airbag 30 in a fore-and-aft direction of the vehicle body. The expandable and developable airbag 30 allows an impact force applied to the rear board 90 to be elastically received.

The inflation and development of the airbag 30 are sandwiched and held by the elastic installation supporting members 27 that hold the airbag 30 and a wide area in the swingable rear board 90, and thus development behavior and development pattern are controlled and stable inflation and development are maintained. Also, the inflatable and developable airbag 30 is supported by the swingable rear board 90 from the rear part side, and inflates and develops two-dimensionally, and uniform pressure is thereby applied to a wide area in the upper body Pb of the seated person Pf.

In a vehicle equipped with the vehicle seat configured in this manner, when inevitability of a rear-end collision of the vehicle is predicted based on collision occurrence information from the collision detection sensor, a drive signal is outputted from the control unit to the inflator 29 at a predicted occurrence time of collision, the inflator 29 is ignited and expanded gas jets from the inflator 29, and the airbag 30 inflates and develops between the elastic installation supporting members 27 and the rear board 90.

As illustrated in FIG. 21, the inflated and developed airbag 30 pushes the elastic installation supporting members 27 and the seat pad 28 forward as well as pushes the rear board 90 rearward, and thus the clip 92C supported on the clip retainer 92B is removed from the clip retaining hole 92a of the retaining bracket 92A, thereby causing the rear board 90 to swing.

Thus, rearward movement, due to a rear-end collision, of the upper body Pb of the seated person Pf on the front seat 10 is elastically received by the airbag 30 that inflates and develops via the outer layer 31, the seat pad 28, and the elastic installation supporting members 27, and so the rearward movement is regulated.

On the other hand, the seated person Pr on the rear seat 60 is pushed forward and moved due to vehicle body deformation by an impact of a rear-end collision or rebounding after being moved rearward and pressed against the seat back, and for example, the knees Pn may come into contact with the rear board 90 which is caused to be swung by inflation and development of the airbag 30. The impact force F1 at the contact of the knees Pn with the rear board 90 of the front seat 10 is elastically received by a wide area in the airbag 30 via the rear board 90, and thus the upper body Pb of the seated person Pf on the front seat 10 avoids receiving the impact force F1 from the knees Pn of the seated person Pr on the rear seat 60, thereby protecting the seated person Pf on the front seat 10. Similarly, the impact force F1 from the knees Pn and the impact force from the upper body of the seated person Pr moving forward on the rear seat 60 are elastically received and protected by the airbag 30 for which the volume of inflation and development is ensured.

Particularly, when the knees Pn of the seated person Pr on the rear seat 60 come into contact with the rear part of the rear board 90 in an inclined manner, the contacting knees Pn are slid and moved along the rear part of the rear board 90, thereby reducing the impact force F1 from the knees in contact with the rear board 90. For this reason, the rear board 90 may be disposed to be inclined with respect to the fore-and-aft direction of the vehicle body.

The above-described implementations each have a configuration in which fixing of the rear board 90 by the rear board retainer 92 is released by pressing movement of the rear board 90 caused by the expanded and developed airbag 30. However, when the airbag 30 inflates and develops, fixing of the rear board 90 is released beforehand so as to be swingable and thus fixing releasing operation utilizing the inflation and development of the airbag 30 is eliminated and load to the airbag 30 that inflates and develops may be reduced.

Figure 22:
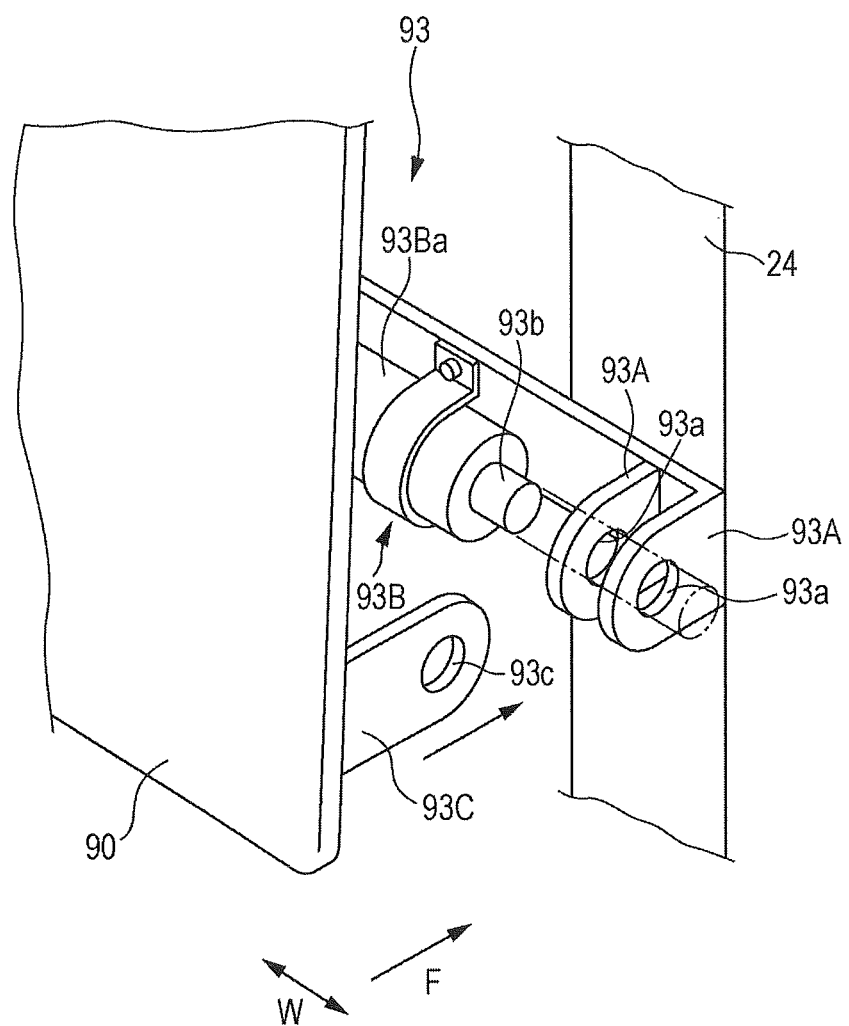
FIG. 22 is a schematic explanatory diagram illustrating another example of the third implementation.

Specifically, for example, instead of the rear board retainer 92 that fixes the seat back frame 21 and the rear board 90 together, a rear board retainer 93, which serves as a fixing releasing mechanism, is provided as illustrated in FIG. 22. The rear board retainer 93 includes a pair of retaining brackets 93A and a locking mechanism 93B, the retaining brackets having retaining holes 93a provided in the lower rear face of the side brackets 24 of the seat back frame 21, the locking mechanism for selectively moving a shaft 93b to a locked position at which the shaft is inserted through the retaining holes 93a or an unlocked position at which the shaft is retracted from the retaining holes by an electromagnetic actuator 93Ba. On the other hand, the lower end of the rear board 90 is provided with a retaining portion 93C which includes a through hole 93c and is insertable in between the pair of retaining brackets 93A at the normal use position of the rear board 90, the retaining brackets being provided in the seat back frame 21.

In this configuration, the rear board 90 is fixed at the normal use position by inserting the retaining portion 93C provided at the rear board 90 into between both retaining brackets 93A provided at the seat back frame 21, and setting the shaft 93b of the locking mechanism 93B at the locked position by inserting the shaft 93b into the through hole 93c of the retaining portion 93C. On the other hand, by moving the shaft 93b of the locking mechanism 93B to the unlocked position, the shaft 93b is retracted from the through hole 93c and fixing is released.

When inevitability of a rear-end collision of a vehicle is predicted based on collision occurrence information from the collision detection unit, a drive signal from the control unit at a predicted occurrence time of collision causes the electromagnetic actuator 93Ba to operate to move the shaft 93b to the unlocked position so that the rear board 90 becomes swingable to allow the airbag 30 to inflate and develop. Thus load to inflation and development of the airbag 30 is reduced and the inflation and development of the airbag 30 may be performed more smoothly and quickly.

It is to be noted that the rear board supporter 91 that causes the rear board 90 to be supported on the seat back frame 21, the rear board retainer 92, and the rear board retainer 93 serving as a fixing releasing mechanism are not limited to the above-described configuration, and may be formed by another suitable configuration having the above-described functions.

Fourth Implementation

Figure 23:
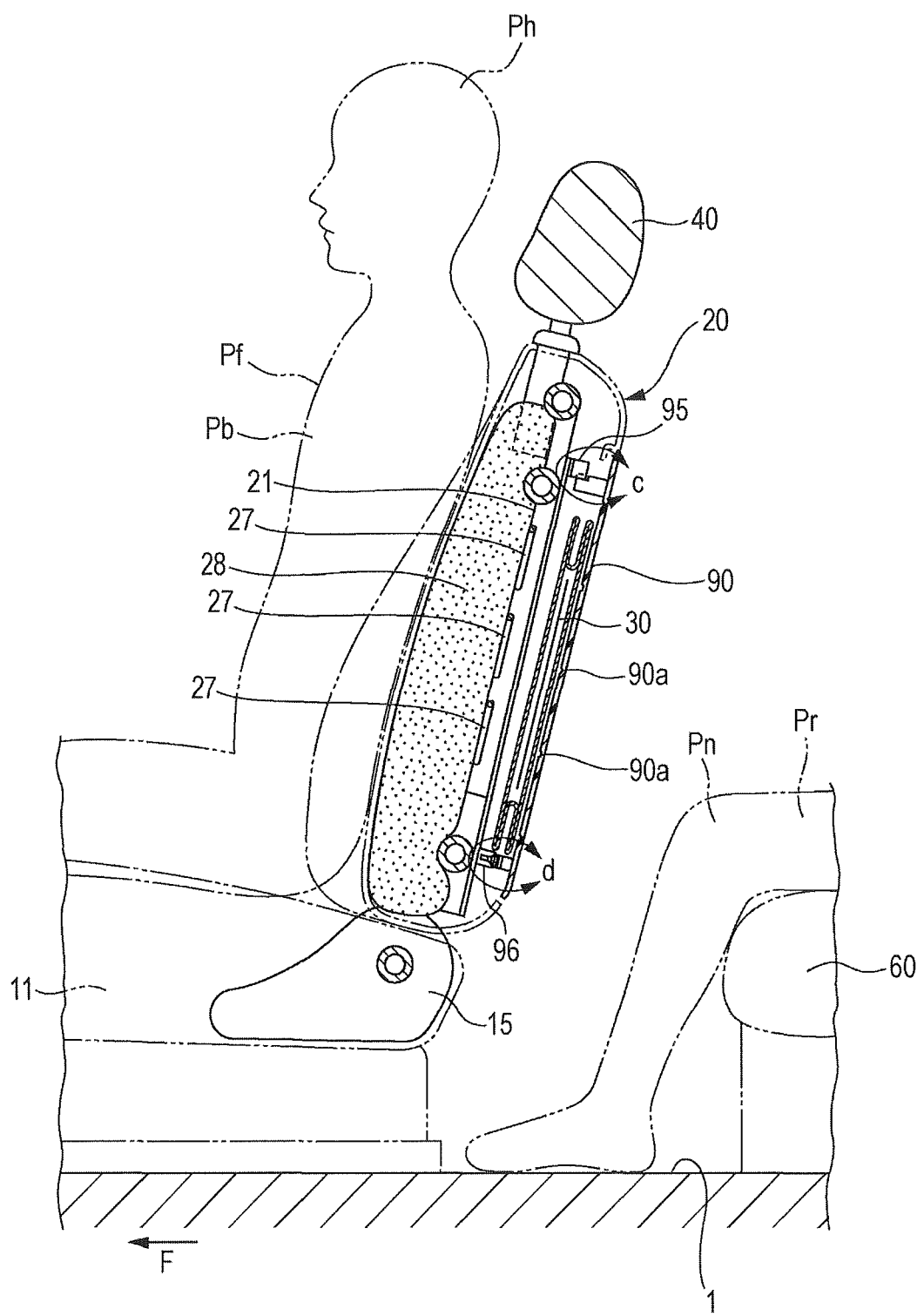
FIG. 23 is a schematic vertical cross-sectional view illustrating the outline of a vehicle seat according to a fourth implementation.
Figure 24A:
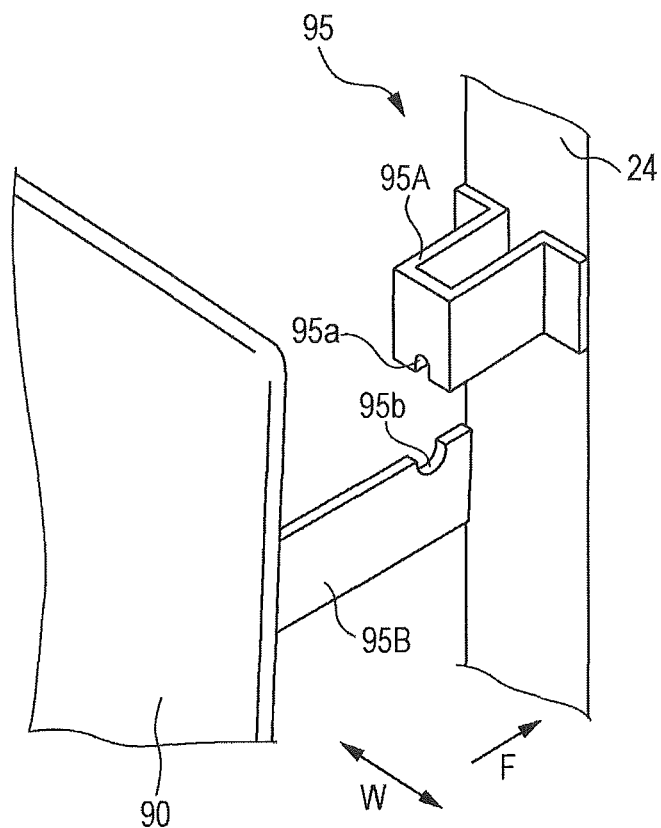
FIG. 24A is an enlarged perspective view of portion c of FIG. 23 illustrating the outline of a rear board supporter and FIG. 24B is an enlarged view of portion d of FIG. 23 illustrating the outline of a rear board retainer.
Figure 24B:
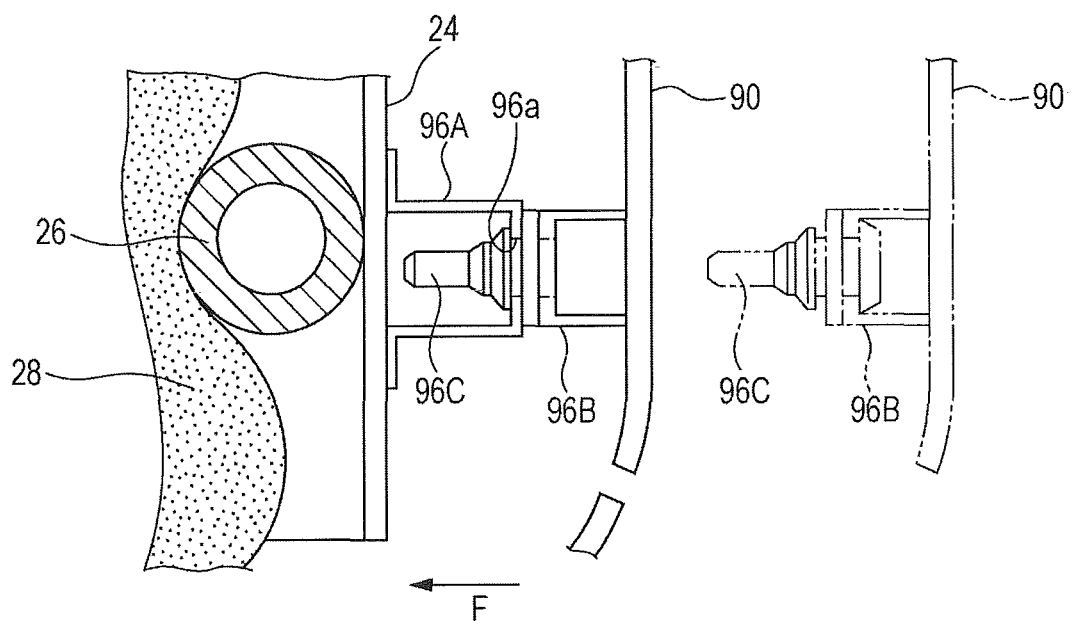
Figure 25:
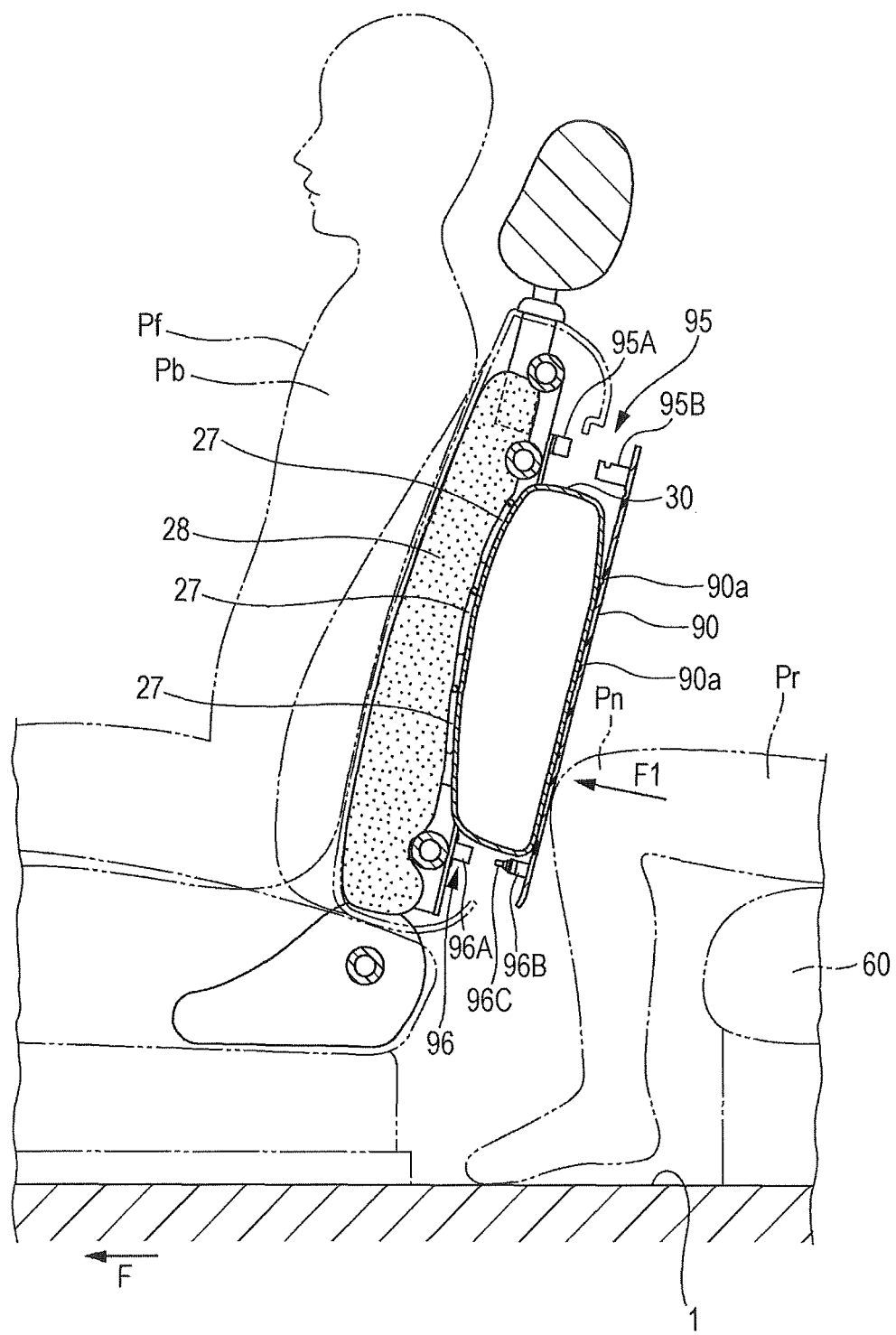
FIG. 25 is an operation explanatory diagram of a vehicle seat when an impact occurs.

A fourth implementation will be described with reference to FIGS. 23 to 25. FIG. 23 is a vertical cross-sectional view illustrating the outline of a vehicle seat; FIG. 24A is an enlarged perspective view of portion c of FIG. 23 illustrating the outline of a rear board supporter and FIG. 24B is an enlarged view of portion d of FIG. 23 illustrating the outline of a rear board retainer; and FIG. 25 is an operation explanatory diagram of a vehicle seat when an impact occurs. It is to be noted that the vehicle seat in the present implementation differs from the vehicle seat in the third implementation in mounting configuration of the rear board 90, and other major configurations are the same as those in the third implementation. The components in FIGS. 23 to 25 corresponding to those in FIGS. 18 to 22 are denoted by the same symbols and detailed description of the components is omitted and different configurations will be mainly described.

As illustrated in FIG. 23, in the rear of the airbag 30, the upper portion of the rear board 90 disposed on the rear of the seat back 20 is supported on an upper part of the seat back frame 21 by a rear board supporter 95, and the lower portion of the rear board 90 is supported on a lower part of the seat back frame 21 by a rear board retainer 96.

As illustrated in FIG. 24A which is an enlarged perspective view of the portion c of FIG. 23, the rear board supporter 95 is a hat-like shape which is connected to the upper rear face of the right and left side brackets 24, and includes a supporting bracket 95A and an engagement bracket 95B, the supporting bracket having a recessed groove-shaped retaining groove 95a at the lower end, the engagement bracket protruding forward, being connected to upper both ends of the rear board 90 and having a recessed groove-shaped engagement part 95b which may be locked in the retaining groove 95a of the supporting bracket 95A from below.

By engaging the retaining groove 95a of the supporting bracket 95A with the engagement part 95b of the engagement bracket 95B, the upper portion of the rear board 90 is held at the normal use position, and downward movement of the rear board 90 causes the engagement part 95b of the engagement bracket 95B to be removed from the retaining groove 95a of the supporting bracket 95A, and thus the engagement is released.

As illustrated in FIG. 24B which is an enlarged perspective view of the portion d of FIG. 23, a rear board retainer 96 is a hat-like shape which is attached to the lower end rear face of each side bracket 24, and includes a retaining bracket 96A, a clip holder 96B, and a clip 96C, the retaining bracket including a clip retaining hole 96a on the rear end face, the clip holder being formed in the lower both ends of the rear board 90 in a protruding manner, the clip being mounted and supported on the end of the clip holder.

The clip 96C mounted and supported on the clip retainer 96B is inserted and retained in the clip retaining hole 96a of the retaining bracket 96A provided in the side bracket 24, thereby fixing the lower portion of the rear board 90 at the normal use position. On the other hand, when a load greater than or equal to a predetermined value is applied to the front surface of the rear board 90 from the front, along with rearward movement of the rear board 90, the clip 96C supported on the clip retainer 96B is removed from the clip retaining hole 96a of the retaining bracket 96A, and thus fixing of the rear board 90 is released.

The rear board 90 is fixed at the normal use position of the rear of the seat back 20 by engaging the engagement part 95b of the engagement bracket 95B with the retaining groove 95a of the supporting bracket 95A from below and by inserting and retaining the clip 96C mounted and supported on the clip retainer 96B into the clip retaining hole 96a of the retaining bracket 96A, the engagement bracket 95B being provided in the upper portion of the rear board 90, the supporting bracket 95A being provided in the upper portion of the side bracket 24, the clip retainer 96B being provided in the rear board 90, the retaining bracket 96A being provided in the side bracket 24.

When a load greater than or equal to a predetermined value is applied to the front surface of the rear board 90 from the front, along with rearward movement of the rear board 90, the clip 96C supported on the clip retainer 96B is removed from the clip retaining hole 96a of the retaining bracket 96A, and the movement of the rear board 90 causes the engagement part 95b of the engagement bracket 95B to be removed from the retaining groove 95a of the supporting bracket 95A, and thus the engagement is released, which allows the rear board 90 to be detached from the rear of the seat back 20.

On the other hand, when the airbag 30 inflates and develops between the elastic installation supporting members 27 and the rear board 90 due to expanded gas injection of the inflator 29, as illustrated in FIG. 25, the airbag 30 pushes forward and urges the elastic installation supporting members 27 and the seat pad 28 so as to allow the upper body Pb of the seated person Pf to be elastically supported from the rear side, and the movement of the rear board 90 causes the engagement part 95b of the engagement bracket 95B to be removed from the retaining groove 95a of the supporting bracket 95A, and thus the engagement is released, which allows the rear board 90 to be detached from the rear of the seat back 20. Consequently, the inflation and development of the airbag 30 are sandwiched and held by the elastic installation supporting members 27 that hold the airbag 30 and a wide area in the rear board 90, and thus development behavior and development pattern are controlled and stable inflation and development pattern are maintained, and the amount of inflation and development and the energy absorbing stroke in the fore-and-aft direction of the vehicle body are ensured. Also, the airbag 30 is supported by the detached rear board 90 from the rear part side, and inflates and develops two-dimensionally, and uniform pressure is thereby applied to a wide area in the upper body Pb of the seated person Pf.

In a vehicle equipped with the vehicle seat configured in this manner, when inevitability of a rear-end collision of the vehicle is predicted based on collision occurrence information from the collision detection unit, a drive signal is outputted from the control unit to the inflator 29 at a predicted occurrence time of collision, expanded gas jets from the inflator 29, and the airbag 30 inflates and develops between the elastic installation supporting members 27 and the rear board 90.

The inflated and developed airbag 30 pushes the elastic installation supporting members 27 and the seat pad 28 forward, whereas the clip 96C supported on the clip retainer 96B is removed from the clip retaining hole 96a of the retaining bracket 96A, and the movement of the rear board 90 causes the engagement part 95b of the engagement bracket 95B to be removed from the retaining groove 95a of the supporting bracket 95A, and thus the engagement is released and the rear board 90 moves rearward.

Thus, rearward movement, due to a rear-end collision, of the upper body Pb of the seated person Pf on the front seat 10 is elastically received by the airbag 30 that inflates and develops via the outer layer 31, the seat pad 28, and the elastic installation supporting members 27, and so the rearward movement is regulated.

On the other hand, when the rear board 90 is pushed rearward by the inflation and development of the airbag 30, the seated person Pr on the rear seat 60 may come into contact with the rear board 90 of the front seat 10, for example, at the knees Pn. The impact force F1 at the contact of the knees Pn with the rear board 90 of the front seat 10 is elastically received by a wide area in the airbag 30 via the rear board 90, and thus the upper body Pb of the seated person Pf on the front seat 10 avoids receiving the impact force F1 from the knees Pn of the seated person Pr on the rear seat 60, thereby protecting the seated person Pf on the front seat 10. Similarly, the impact force F1 from the knees Pn and the impact force from the upper body of the seated person Pr moving forward on the rear seat 60 are elastically received and protected by the airbag 30 for which the volume of inflation and development and the energy absorbing stroke are ensured.

Although the above-described implementations each have a configuration in which fixing of the rear board 90 with the rear board retainer 96 is released by the pressure caused by the inflation and development of the airbag 30, instead of the rear board retainer 96, for example, a rear board retainer similar to the rear board retainer 93 illustrated in FIG. 22 may be provided. When the airbag 30 inflates and develops at a predicted occurrence time of collision, releasing the fixing of the rear board 90 beforehand allows the rear board 90 to be moved, and thus it is unnecessary to release the fixing of the rear board 90 by the movement of the rear board 90 which is caused by the airbag 30, and thus load to the airbag 30 at the inflation and development may be reduced.

Fifth Implementation

A fifth implementation will be described with reference to FIGS. 26 and 27. It is to be noted that FIGS. 26 and 27 correspond to FIGS. 18 and 21, and the present implementation differs from the third implementation in mounting configuration of the rear board 90, and other major configurations are the same as those in the third implementation. The components in FIGS. 26 and 27 corresponding to those in FIGS. 18 and 21 are denoted by the same symbols and detailed description of the components is omitted and different configurations will be mainly described.

Figure 26:
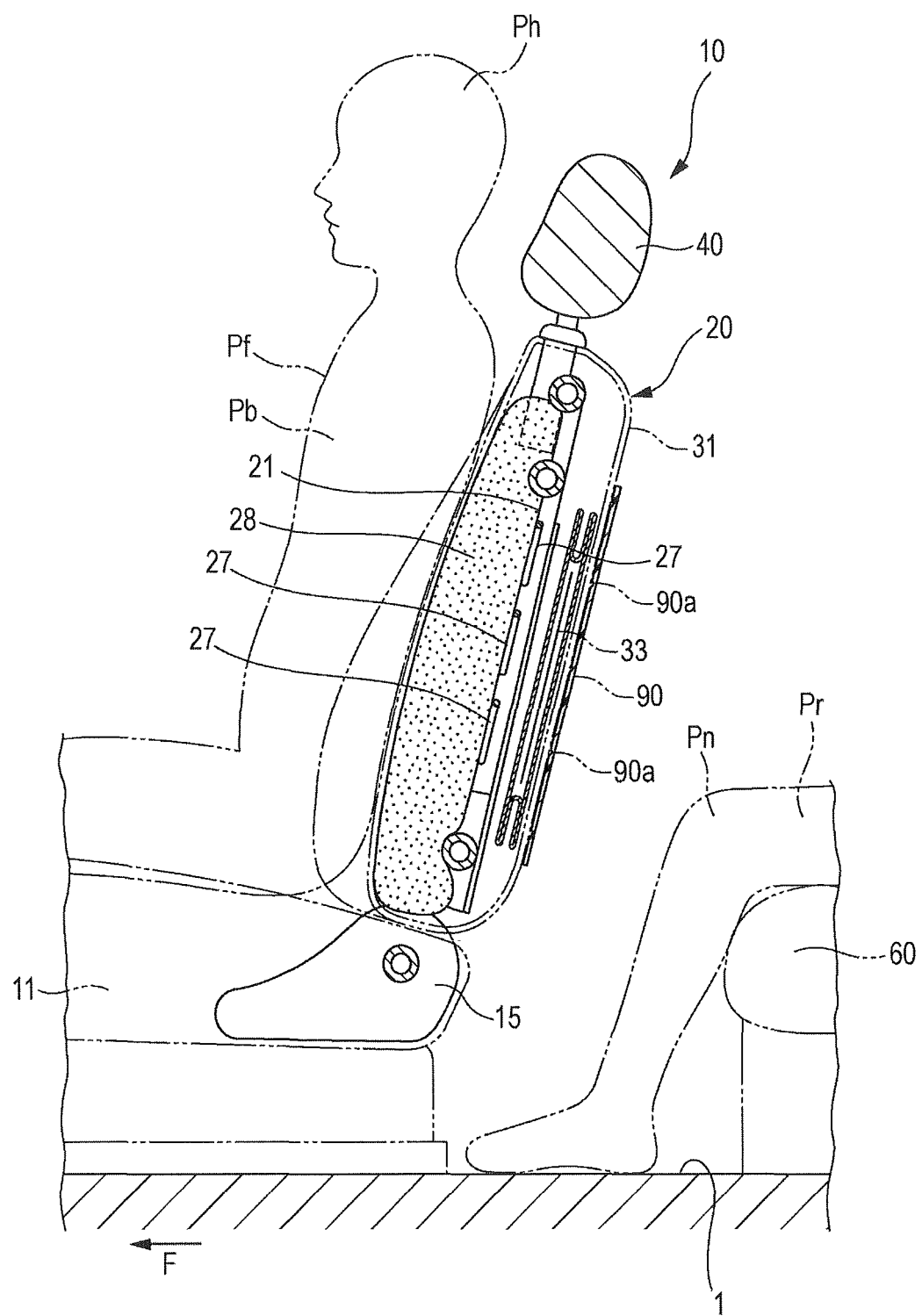
FIG. 26 is a schematic vertical cross-sectional view illustrating the outline of a vehicle seat according to a fifth implementation.

As illustrated in FIG. 26, in the outer layer 31 of the seat back 20, the airbag 30 is covered by the elastic rear part 33, and the rear board 90 is disposed in the rear of the rear part 33. The rear board 90 has a rectangular tubular shape that covers the airbag 30, and includes fragile portions 90a which are each a groove or a thin layer to facilitate predetermined bending deformation.

Figure 27:
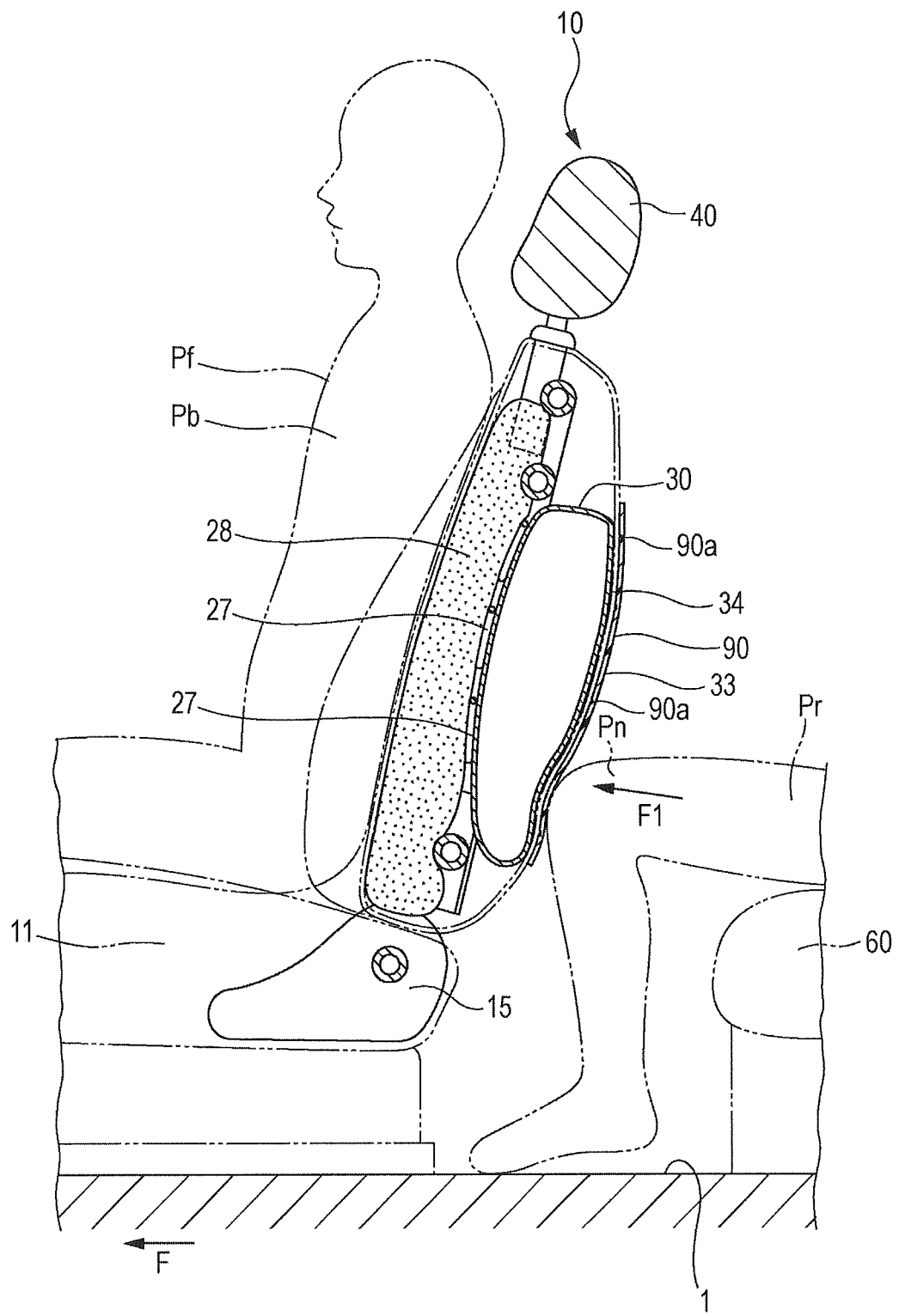
FIG. 27 is an operation explanatory diagram of a vehicle seat when an impact occurs.

When the airbag 30 inflates and develops two-dimensionally between the elastic installation supporting members 27 and the rear part 33 of the outer layer 31 due to expanded gas injection of the inflator 29, as illustrated in FIG. 27, the airbag 30 pushes forward and urges the elastic installation supporting members 27 and the seat pad 28, and causes the rear part 33 of the outer layer 31 and the rear board 90 to expand so as to sufficiently ensure the volume of inflation and development of the airbag 30 and the energy absorbing stroke of the airbag 30. The inflation and development of the airbag 30 are sandwiched and held by the elastic installation supporting members 27 that hold the airbag 30, and extending, expanding rear part 33 of the outer layer 31 and the rear board 90, and thus development behavior and development pattern are controlled and stable inflation and development pattern is maintained. Also, the airbag 30 is supported by the rear board 90 from the rear part side, and inflates and develops two-dimensionally, and uniform pressure is thereby applied to a wide area in the upper body Pb of the seated person Pf.

In a vehicle equipped with the vehicle seat configured in this manner, when inevitability of a rear-end collision of the vehicle is predicted based on signals from the collision detection unit, a drive signal is outputted from the control unit to the inflator at a predicted occurrence time of collision, expanded gas jets from the inflator, and the airbag 30 inflates and develops between the elastic installation supporting members 27 and the rear part 33 of the outer layer 31 as illustrated in FIG. 27. Thus, rearward movement, due to a rear-end collision, of the upper body Pb of the seated person Pf on the front seat 10 is elastically received by the airbag 30 via the outer layer 31, the seat pad 28, and the elastic installation supporting members 27, and so the rearward movement is regulated.

On the other hand, the seated person Pr on the rear seat 60 may be moved forward and, for example, the knees Pn may come into contact with the rear board 90 of the front seat 10. At this point, the knees Pn are elastically received via the outer layer 31 and the rear board 90 by the airbag 30 which has expanded and developed between the elastic installation supporting members 27, and the rear part 33 of the outer layer 31, the rear board 90, and thus forward movement is restrained and the upper body Pb of the seated person Pf on the front seat 10 avoids receiving the impact force F1 from the knees Pn of the seated person Pr on the rear seat 60. Similarly, the knees Pn and the upper body of the seated person Pr moving forward on the rear seat 60 are elastically received and protected by the airbag 30 which has inflated and developed.

Also when the rear board 90 is damaged due to an impact, the airbag 30 is held by the outer layer 31 and the development behavior and development pattern of the inflation and development of the airbag 30 are controlled, and stable inflation development pattern is maintained.

Thus, according to each of the third to fifth implementations described above, with a simple configuration in which the airbag disposed between the seat pad and the rear board within the seat back inflates and develops to push the rear board rearward, the airbag, which is supported by the rear board and inflates and develops, makes it possible to elastically receive rearward movement of a seated person due to a collision by uniform pressure over a wide area and to protect the seated person against an impact from the rear, thereby enabling direct protection of a seated person by the airbag at the time of a collision and accurate reduction of an impact from the rear of the seat back.

In the above description, the case is taken as an example in which the airbag 30 is caused to inflate and develop by a single inflator. However, the airbag 30 may be caused to inflate and develop in multiple steps in a suitable manner to a seated person. For example, the airbag 30 is caused to inflate and develop in multiple steps using a plurality of inflators in a suitable manner to a seated person so that the development state of the airbag 30, such as an inflation development pressure and a development time may also be controlled.

Sixth Implementation

Figure 28:
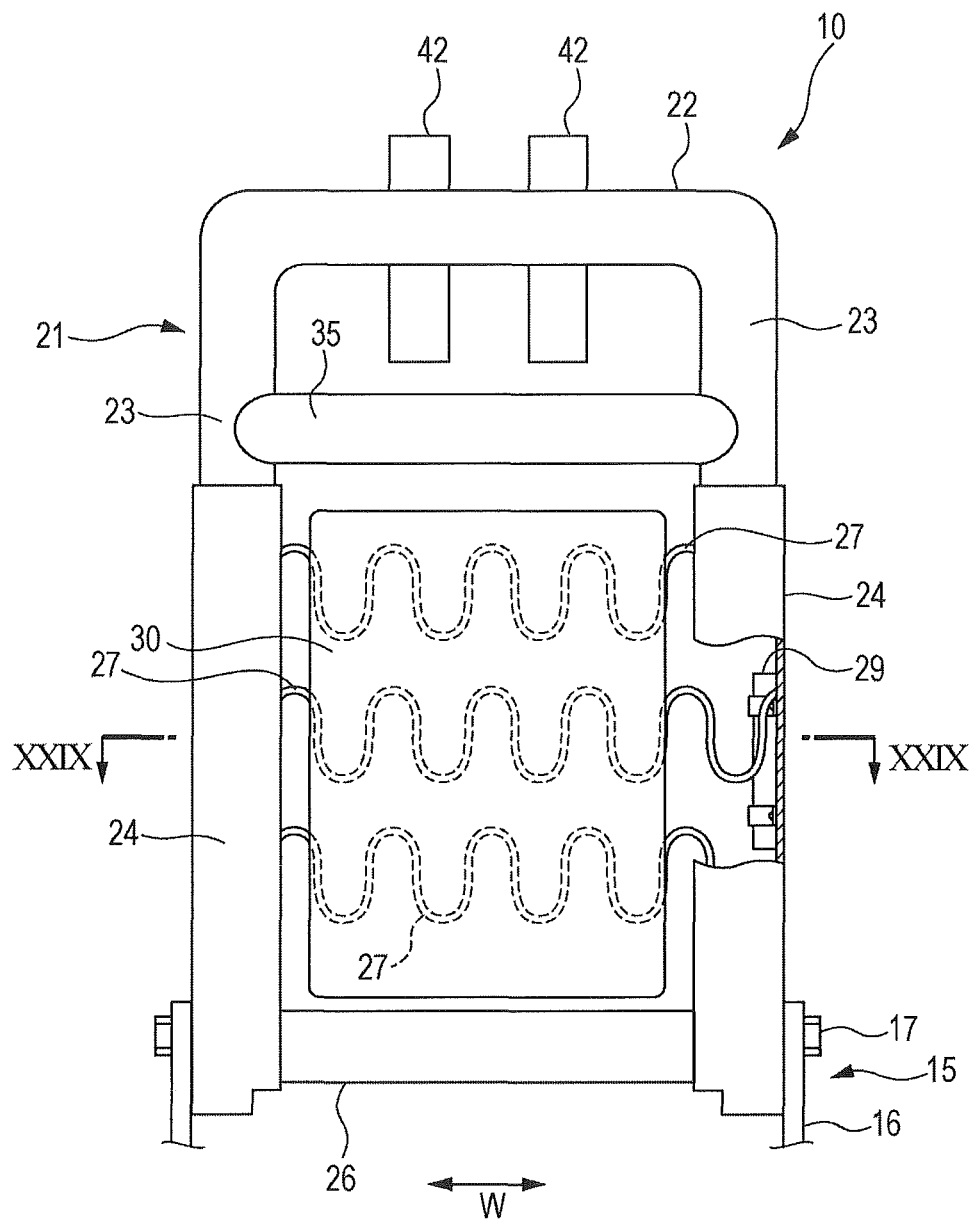
FIG. 28 is a schematic rear view with partial cutaway for explaining a sixth implementation.
Figure 29:
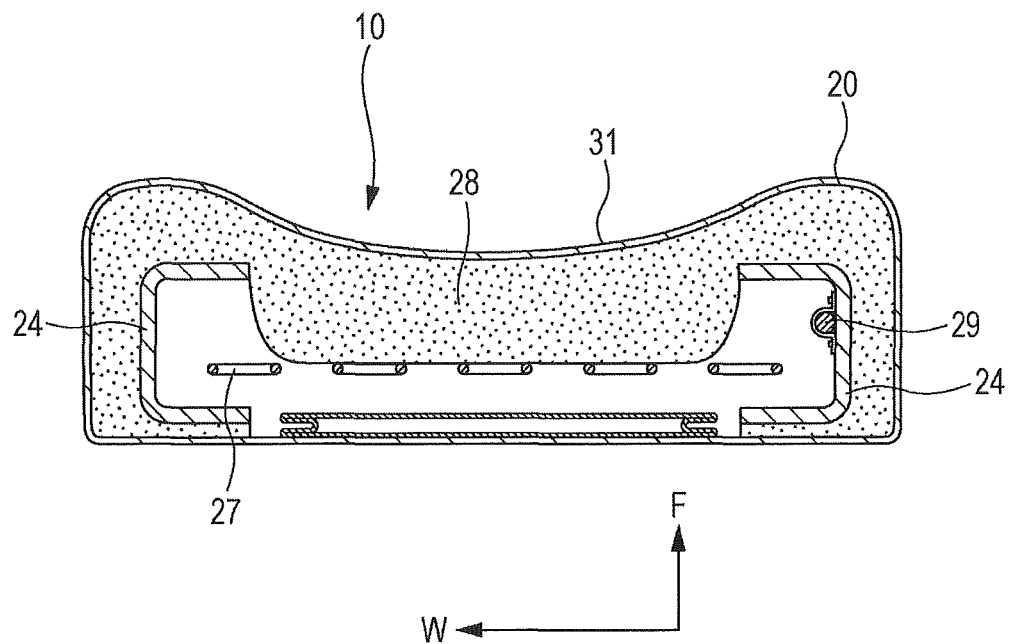
FIG. 29 is a cross-sectional view of FIG. 28 taken along line XXIX-XXIX.

A sixth implementation will be described with reference to FIGS. 28 and 29. FIG. 28 is a schematic rear view with partial cutaway illustrating the outline of the present implementation; and FIG. 29 is a cross-sectional view of FIG. 28 taken along line XXIX-XXIX. It is to be noted that the components corresponding to those in the first implementation are denoted by the same symbols as in FIGS. 1 to 5 and detailed description of the components is omitted.

As illustrated in FIGS. 28 and 29, the inflator 29 is attached to a side frame 23 or a side bracket 24 outwardly in the vehicle body so as to located inwardly of the seat back frame 21. As illustrated in FIG. 29, the inflator 29 is disposed so as to be located forward of the airbag 30 with the elastic installation supporting members 27 interposed therebetween in the fore-and-aft direction of the vehicle body.

With this configuration, in the case where the airbag 30 inflates and develops within the seat back 20 due to a collision, the reactive force is received by the elastic installation supporting members 27, and thus prevention effect on interference between the airbag 30 and the inflator 29 is obtained.

Seventh Implementation

Figure 30:
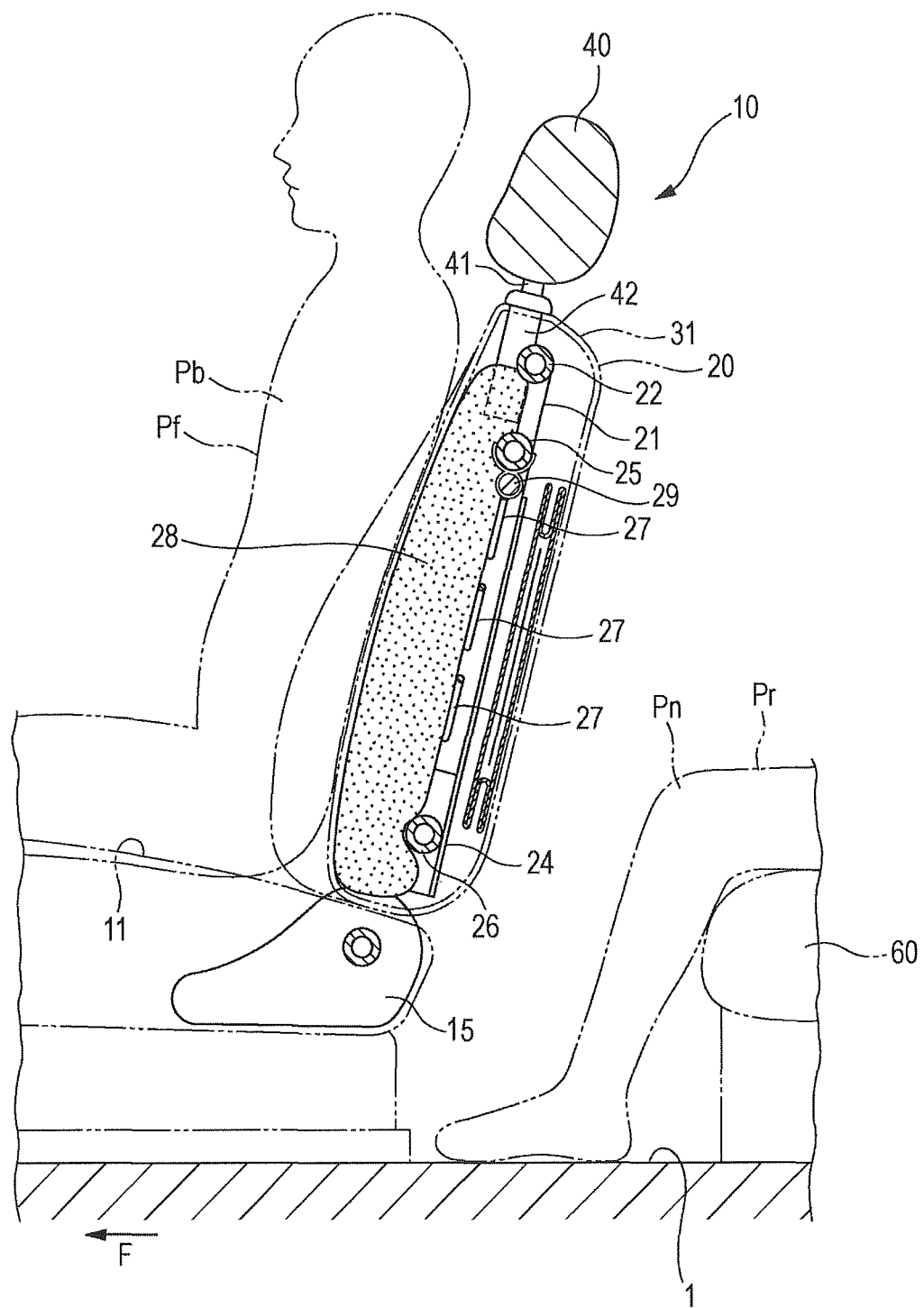
FIG. 30 is a schematic cross-sectional view of a vehicle seat according to a seventh implementation.
Figure 31:
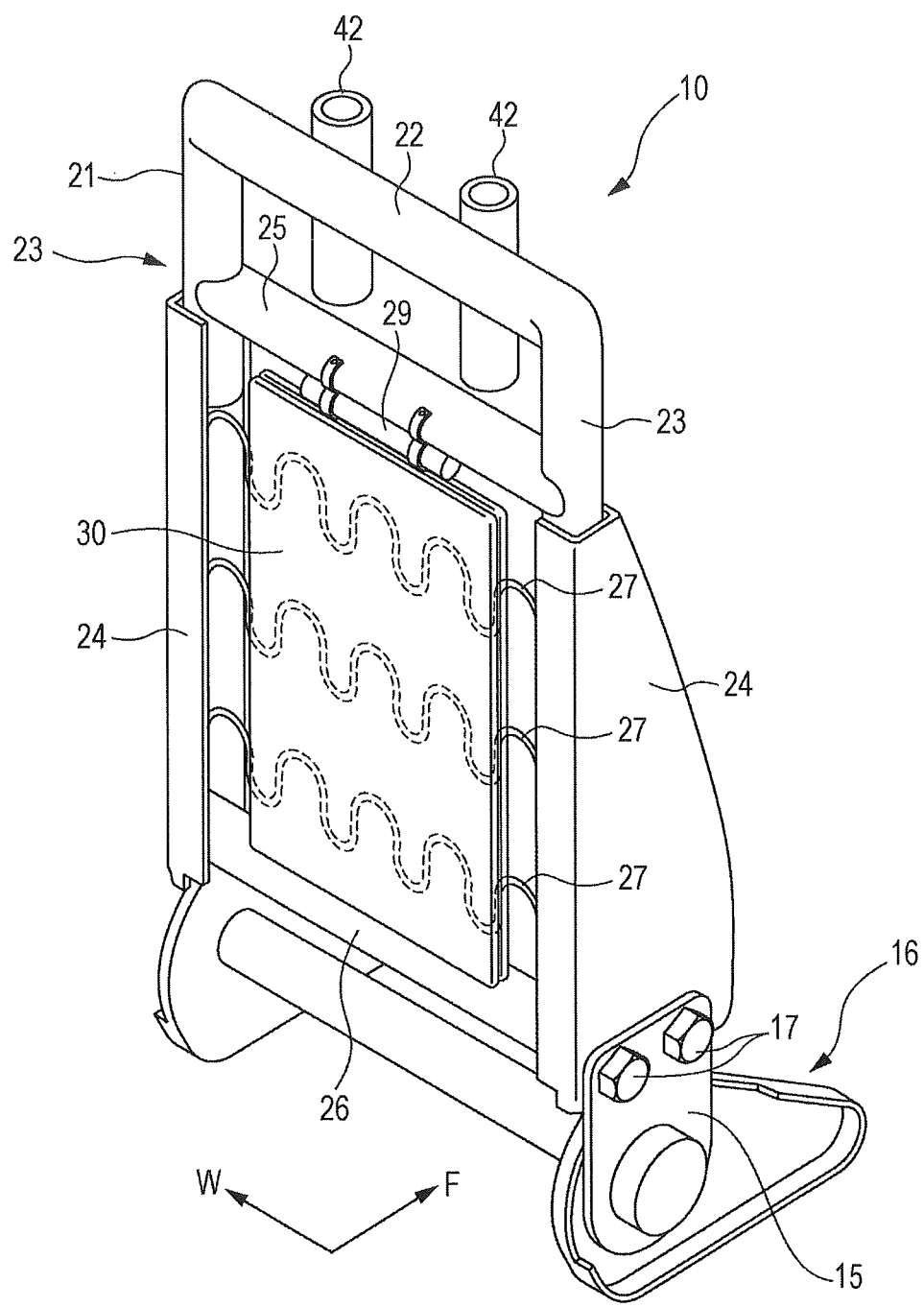
FIG. 31 is a schematic perspective view with partial cutaway of the vehicle seat as seen from the rear.
Figure 32:
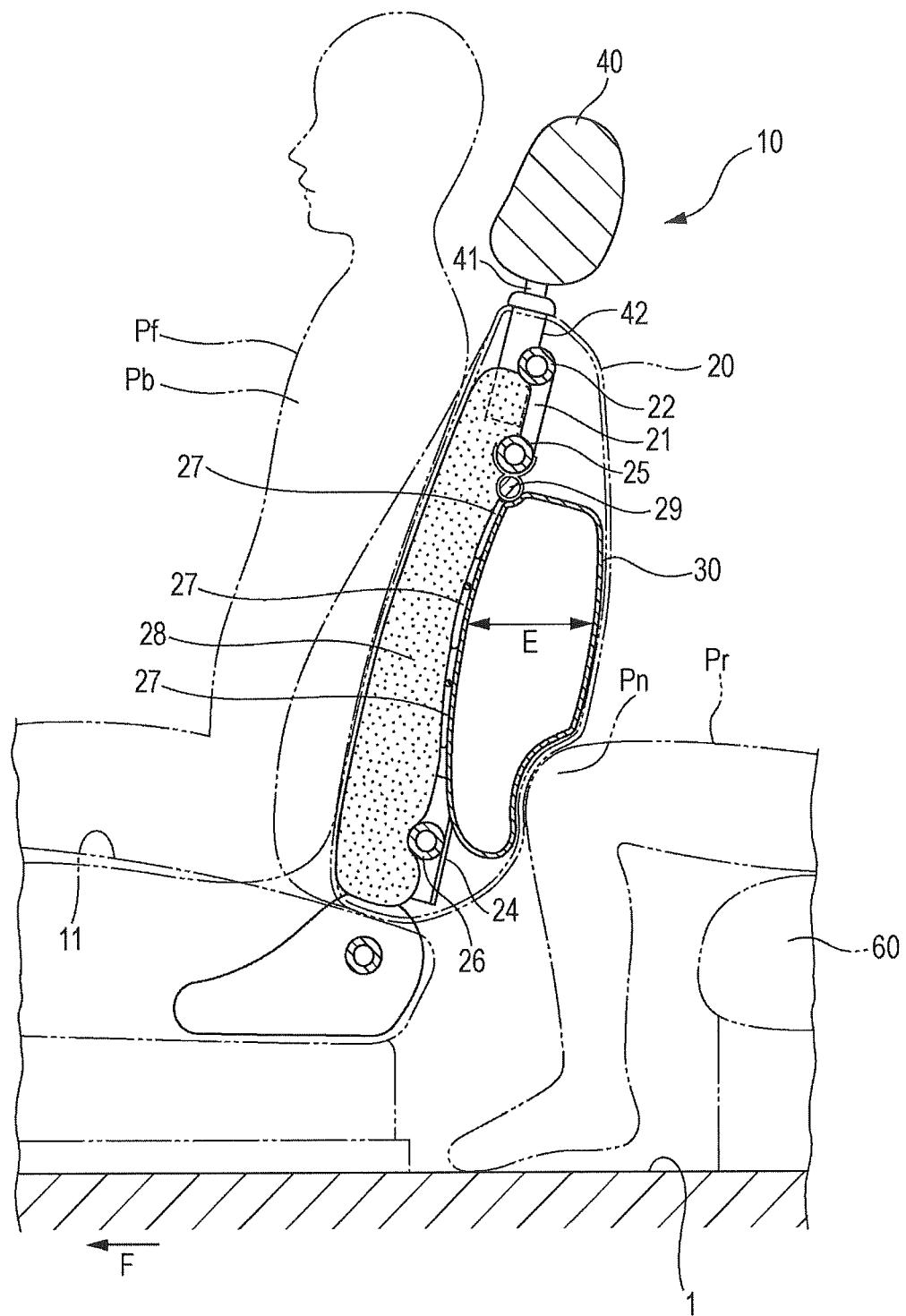
FIG. 32 is an operation explanatory diagram of the vehicle seat when an impact occurs.

A seventh implementation will be described with reference to FIGS. 30 to 32. FIG. 30 is a schematic cross-sectional view of the front seat 10; FIG. 31 is a schematic perspective view with partial cutaway of the front seat 10 as seen from the rear; and FIG. 32 is an operation explanatory diagram of the front seat 10 when an impact occurs. It is to be noted that the components corresponding to those in the first implementation are denoted by the same symbols as in FIGS. 1 to 5 and detailed description of the components is omitted. In the present implementation, the inflator 29 is not attached to a side bracket 24. As illustrated in FIGS. 30 and 31, the inflator 29 is disposed in parallel to the upper cross member 25 and fixed thereto so that the circumferential surface of the inflator 29 is in contact with substantially the central position of the upper cross member 25 in the extending direction. Therefore, the inflator 29 is attached within the seat back frame 21 and to an upper portion of the seat back frame 21.

In the case where another vehicle collides with a vehicle having the front seat 10, the inflator 29 is ignited by an operation of a collision detection unit or collision information predicted by a collision prediction unit, and expanded gas from the inflator 29 causes the airbag 30 to instantly inflate and develop between the elastic installation supporting members 27 and the rear surface of the seat back 20 as illustrated in FIG. 32.

In this process, the front of the airbag 30 is covered with flexible materials such as the elastic installation supporting member 27, the seat pad 28, and the outer layer 31, and thus due to the inflation and development of the airbag 30, as illustrated in FIG. 32, these flexible materials exhibit slight deformation in the forward direction of the vehicle body, whereas the outer layer 31, which covers the rear of the airbag 30 as a flexible material, exhibits significantly protruding deformation in the rearward direction of the vehicle body.

With the front seat 10, the deformation behavior of the flexible members and flexible materials in front and in rear of the airbag 30 allows the volume E of development of the airbag 30 in the fore-and-aft direction of the vehicle body to be ensured, and also allows the energy absorbing stroke of the seat back 20 in the fore-and-aft direction of the vehicle body to be sufficiently ensured.

That is, as illustrated in FIG. 32, rearward movement, due to an impact of a rear-end collision, of the upper body Pb of the front seat person Pf is elastically received by the outer layer 31 at the front of the seat back 20, the seat pad 28, the elastic installation supporting members 27, and the inflated and developed airbag 30, and thus the upper body Pb of the front seat person Pf is protected against the impact to be received when being pressed against the seat back 20.

On the other hand, due to an impact of a rear-end collision, the rear seat person Pr is pressed against the rear seat 60, and is moved forward by subsequent rebound. Due to the rebound, the knees Pn of the rear seat person Pr moving forward is elastically received by the outer layer 31 on the rear of the seat back and the airbag 30, and thus the upper body Pb of the seated person Pf on the front seat 10 is protected against the collision impact of the knees Pn of the rear seat person Pr.

In this process, the airbag 30 is restrained to some extent by the internal geometry within the seat back 20 located immediately rearward of the upper body Pb of the seated person Pf on the front seat 10, and development behavior and development pattern are controlled and the airbag 30 is caused to stably inflate and develop. Consequently, rearward movement of the upper body Pb of the seated person Pf may be reliably received, and the impact due to forward movement of the knees Pn of the rear seat person Pr may be reliably absorbed, and thus proper protection for the seated person Pf may be achieved.

In addition, such protection of the seated person Pf is achieved by the airbag 30 that inflates and develops within the seat back 20 and disposition of the flexible materials in front and in rear of the airbag 30 (that is, the outer layer 31, the seat pad 28, and the elastic installation supporting members 27), and thus the configuration is significantly simplified.

Furthermore, because the supporting rigidity of the inflator 29 is ensured due to the fixing thereof to the upper cross member 25, and the upper cross member 25 is located in the upper portion of the seat back frame 21, the internal space of the seat back for the airbag 30 to inflate and develop is not interfered by the inflator 29, and thus an airbag development space for absorbing an impact at the time of a collision is ensured.

Moreover, the inflator 29 is disposed within the seat back frame 21 which is formed in a substantially rectangular frame shape, and thus the inflator 29 is protected against an external force by the seat back frame 21 and protrusion of the inflator 29 outwardly of the seat back frame 21 is avoided. Moreover, the inflator 29 may be integrally formed with the airbag 30 which is provided within the seat back frame 21.

Eighth Implementation

Next, an eighth implementation will be described with reference to FIGS. 33 and 34. In the seventh implementation, the case has been described where an inflator is used and an airbag is caused to inflate and develop. However, in the eighth seventh implementation, the case will be described where two inflators are used and an airbag is caused to inflate and develop.

Figure 33:
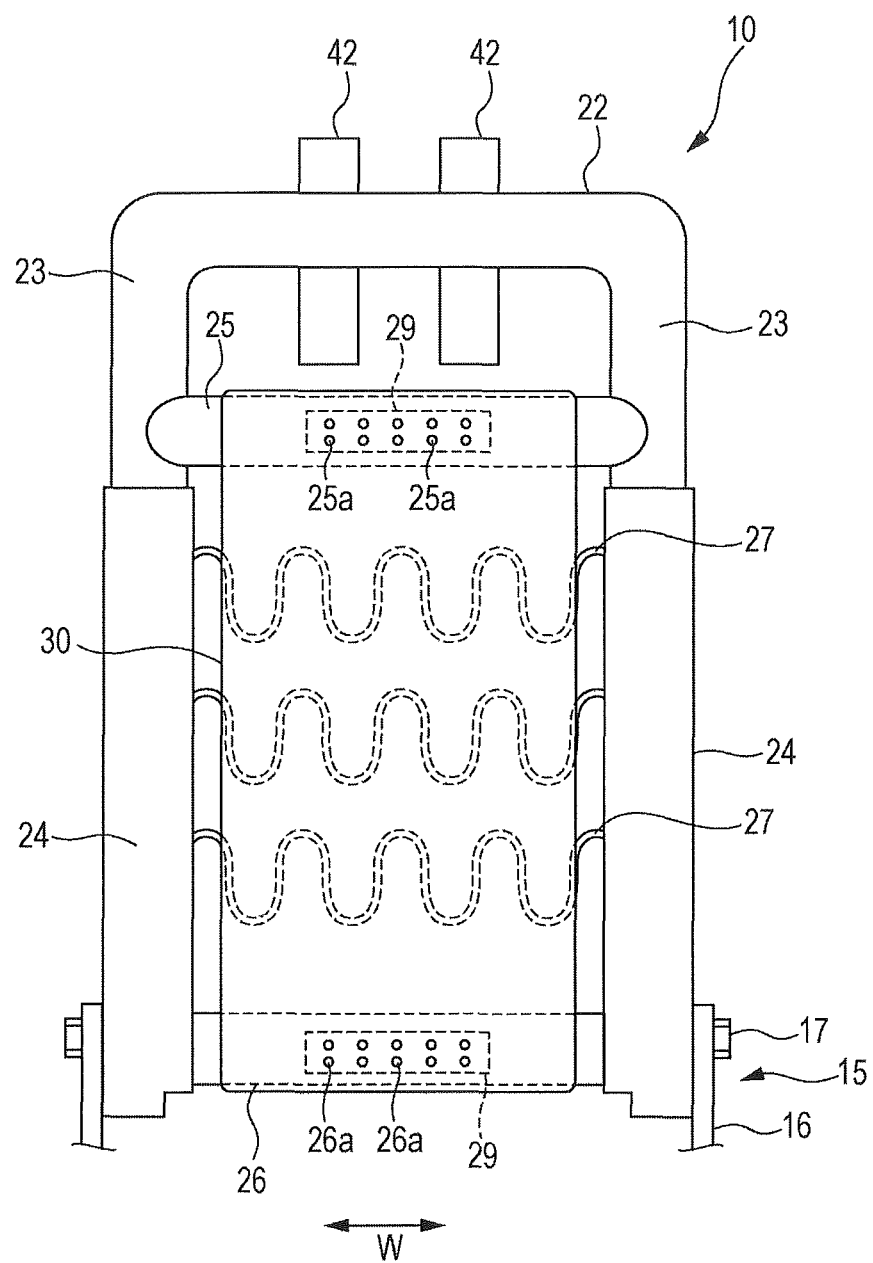
FIG. 33 is a schematic perspective view with partial cutaway of a vehicle seat as seen from the rear according to an eighth implementation.
Figure 34:
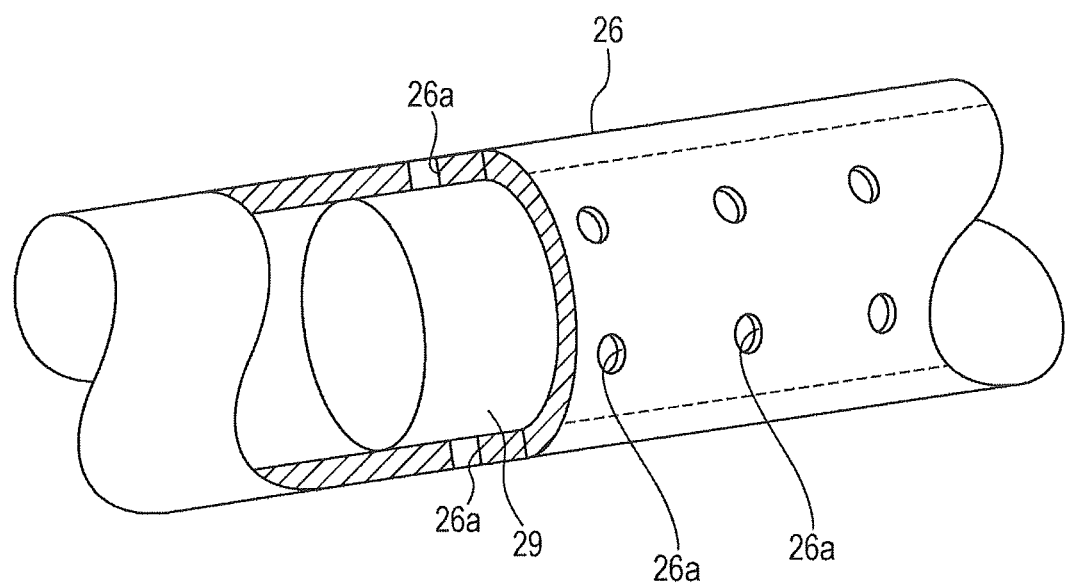
FIG. 34 is a fragmentary perspective view with partial cutaway of the vehicle seat.

FIG. 33 is a schematic perspective view with partial cutaway of the front seat 10 as seen from the rear; and FIG. 34 is a fragmentary perspective view with partial cutaway of the front seat 10. As illustrated in FIG. 33, in the front seat 10 according to the present implementation, the entire configuration of the seat back 20 is the same as that of the seventh implementation except for the configuration of the inflator, and thus detailed description is omitted.

As illustrated in FIGS. 33 and 34, the inflator 29 is fixedly mounted within each of the cylindrical upper cross member 25 and the cylindrical lower cross member 26.

As illustrated in FIG. 34, the mounting of the inflator 29 within the lower cross member 26 is achieved by having the outer circumferential surface of the cylindrical inflator 29 in contact with the inner circumferential surface of the lower cross member 26 and firmly fixing them together with a fixing bracket (not illustrated).

As illustrated in FIG. 34, the portion of the outer circumferential surface of the inflator 29 corresponding to the lower cross member 26 is provided with a plurality of small holes 26a, and a gas suction inlet (not illustrated) is provided so that expanded gas from the inflator 29 passes through the small holes 26a and is introduced into the airbag 30.

The mounting of the inflator 29 within the upper cross member 25 is achieved similarly to the mounting within the lower cross member 26 and description is omitted. Expanded gas jets through the small holes 25a opened in the upper cross member 25.

According to the present implementation, in the case where another vehicle collides with a vehicle having the front seat 10, the airbag 30 which has inflated and developed due to an operation of each inflator 29, the outer layer 31 on the rear of the seat back 20, the seat pad 28, and the elastic installation supporting members 27 elastically receive rearward movement of the upper body Pb of the front seat person Pf, and thus the upper body Pb of the seated person Pf is protected.

On the other hand, the knees Pn of the rear seat person Pr moving forward due to a rear-end collision of a vehicle is elastically received by the outer layer 31 on the rear of the seat back 20 and the inflated and developed airbag 30, and thus the upper body Pb of the front seat person Pf is protected against the collision impact of the knees Pn of the rear seat person Pr. Therefore, similarly to the seventh implementation, proper protection for the seated person Pf is achieved and the configuration is significantly simplified.

Also, because each inflator 29 is fixed within the upper cross member 25 and the lower cross member 26, part of the bending strength and torsion strength of the upper cross member 25 and the lower cross member 26 is provided by the inflator 29, and thus the bending rigidity and torsion rigidity of the cross members 25, 26 are reinforced. Therefore, as a result, the seat back frame 21 is reinforced and torsion and strain of the seat back 20 is reduced.

Furthermore, the inflator 29 does not protrude from the seat back frame 21, and thus even when the inflator 29 is mounted in the seat back frame 21, a driver does not feel uncomfortable while being seated, and inflation and development of the airbag 30 is not prevented by the inflator 29.

Moreover, with this configuration, the inflators 29 disposed above and below may be operated with a time lag. By operating of the inflators 29 with a time lag, the inflation and development state of the airbag 30 may be continued longer compared with the case where the inflators 29 are operated simultaneously or the case where an inflator with a single step is operated. Thus energy absorbing effect of the airbag may last for a longer time.

Figure 35:
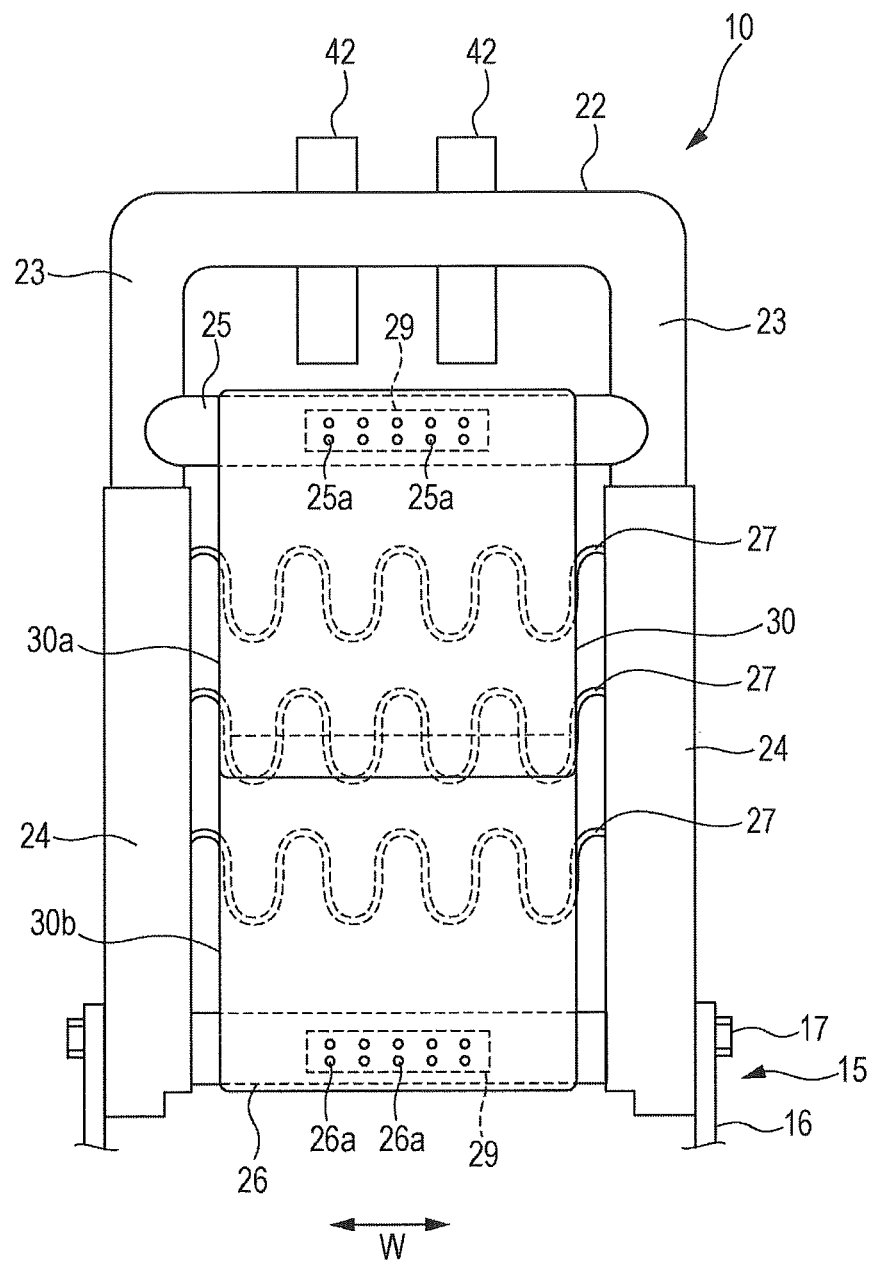
FIG. 35 is a schematic rear view with partial cutaway for explaining a modification of the eighth implementation.
Figure 36:
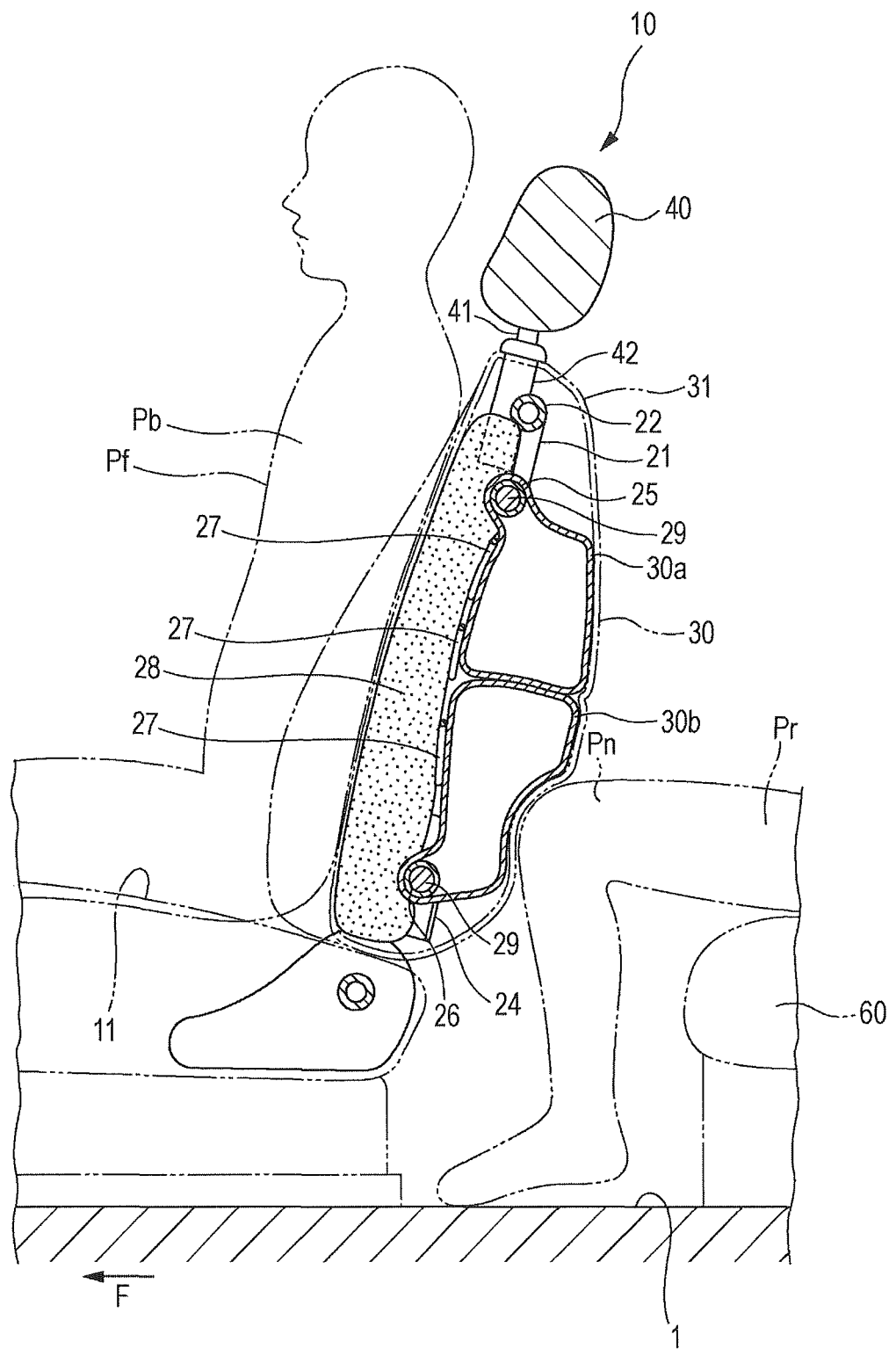
FIG. 36 is an operation explanatory diagram of the vehicle seat when an impact occurs according to a modification of the eighth implementation.

Although the present implementation adopts a configuration in which one airbag 30 is used, two airbags may be used. FIG. 35 is a schematic rear view with partial cutaway for explaining a modification of the present implementation;

and FIG. 36 is an operation explanatory diagram of the front seat 10 when an impact occurs according to the modification.

As illustrated in FIG. 35, in the present modification, the airbag 30 includes an upper airbag 30a and a lower airbag 30b, the upper airbag being disposed on the upper side of the space between the elastic installation supporting members 27 and the outer layer 31 on the rear of the seat back 20 within the seat back 20, the lower airbag being disposed on the lower side of the space. Each airbag is inflatably and developably retained, for example, on the outer layer 31 by a retaining unit (not illustrated).

The upper airbag 30a has upper and lower ends, the upper end being located at the height of the upper cross member 25, the lower end being located at the height of approximately the midpoint between the upper cross member 25 and the lower cross member 26. The upper airbag 30a is a bag body which is a substantially rectangular shape in a plan view and has a width with crosswise ends located close to the right and left side frames 23 and side brackets 24, the bag body being compressed and folded in the fore-and-aft direction of the seat back 20.

The lower airbag 30b has upper and lower ends, the lower end being located at the height of the lower cross member 26, the upper end being located at the height of approximately the midpoint between the upper cross member 25 and the lower cross member 26. The lower airbag 30b is a bag body having a width similar to the width of the upper airbag 30a, the bag body also being compressed and folded in the fore-and-aft direction of the seat back 20.

Both airbags 30a, 30b are disposed so as to be partially overlapped with each other to prevent a space therebetween when the both airbags inflate and develop.

With this configuration, when both upper and lower inflators 29 are operated, even when the position of the knees Pn of the rear seat person Pr is varied to some extent, the knees may be reliably received by the airbags 30a, 30b located above and below as illustrated in FIG. 36, and thus an impact from the rear may be received more reliably compared with the case where one airbag is used.

In addition, the inflation and development pattern of the entire airbag 30 is controllable by controlling on and off of the ignition of the inflators 29.

Ninth Implementation

Figure 37:
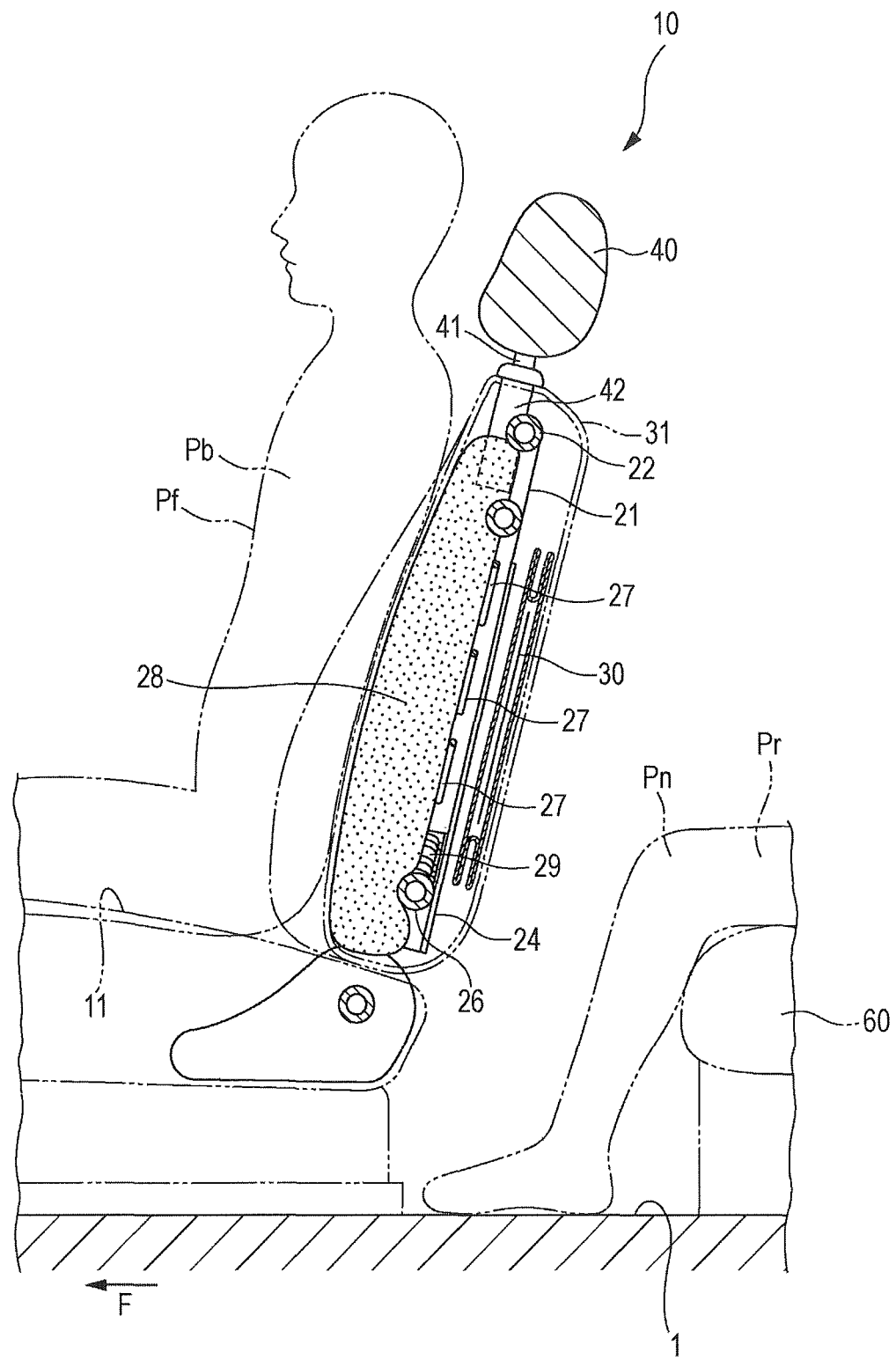
FIG. 37 is a schematic cross-sectional view of a vehicle seat according to a ninth implementation.
Figure 38:
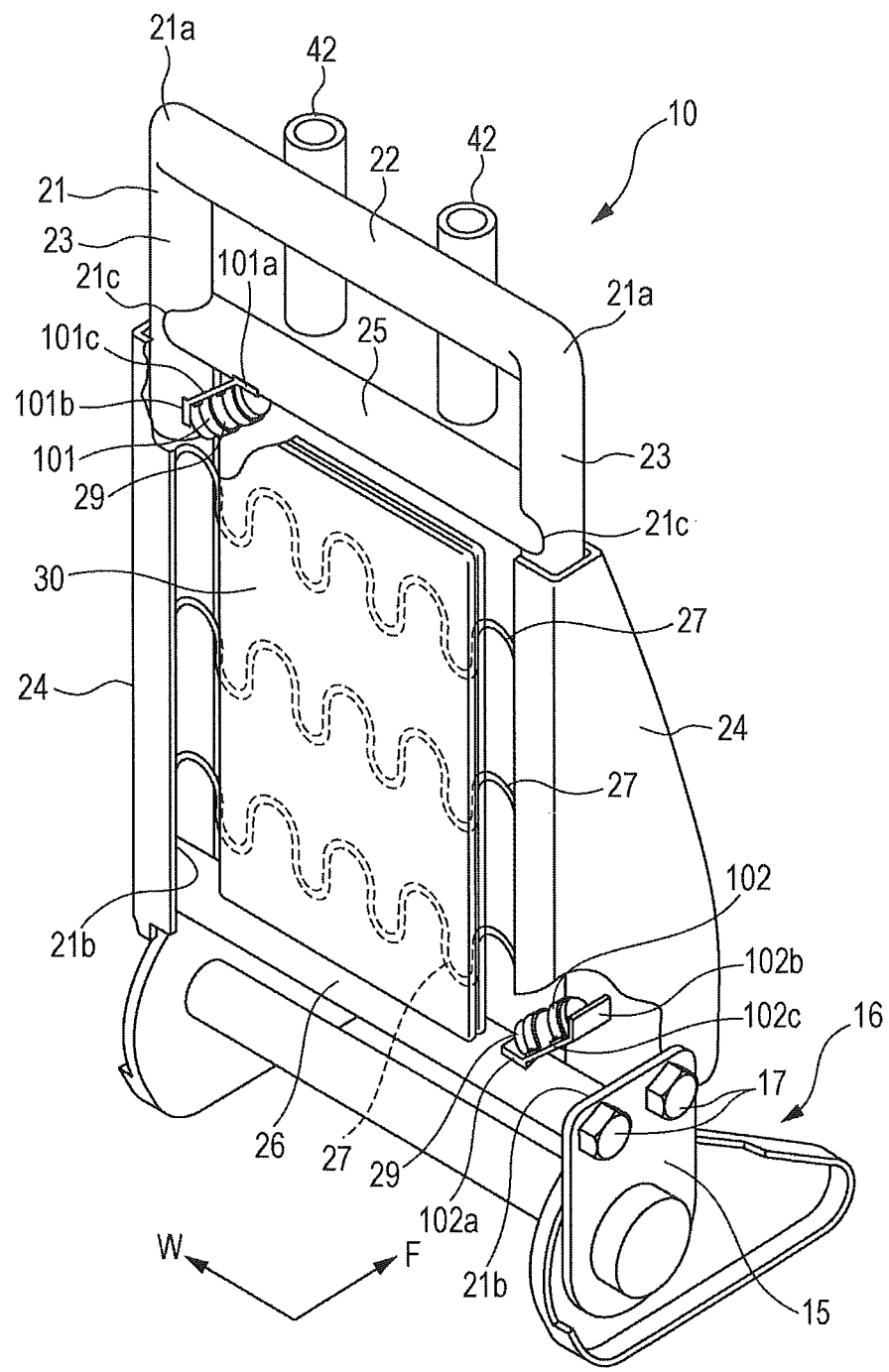
FIG. 38 is a schematic perspective view with partial cutaway of the vehicle seat as seen from the rear.
Figure 39:
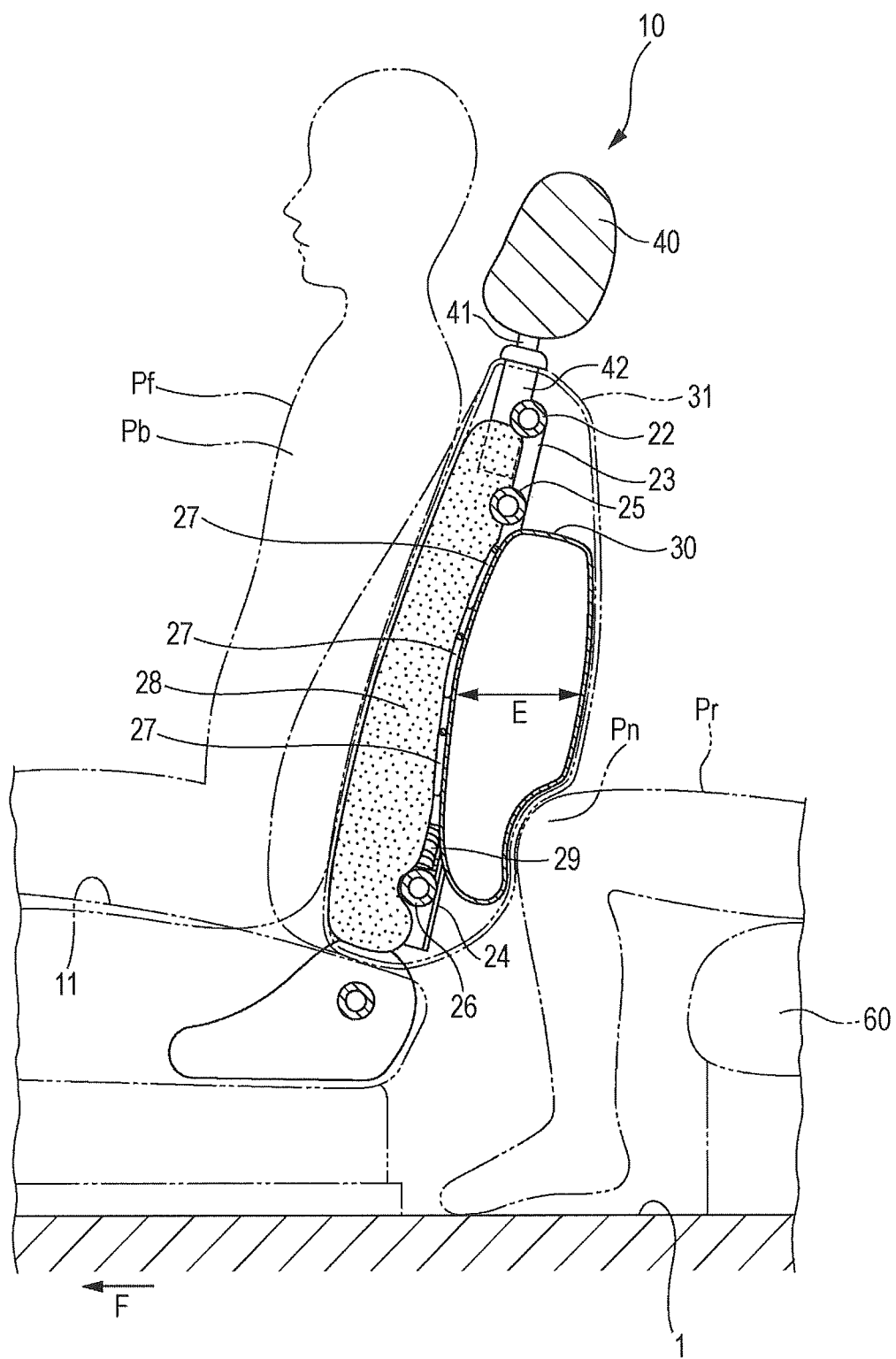
FIG. 39 is an operation explanatory diagram of the vehicle seat when an impact occurs.

A ninth implementation will be described with reference to FIGS. 37 to 39. FIG. 37 is a schematic explanatory cross-sectional view of the front seat 10; FIG. 38 is a schematic perspective view with partial cutaway of the front seat 10 as seen from the rear; and FIG. 39 is an operation explanatory diagram when an impact occurs.

The disposition and configuration of the inflator 29 according to the present implementation will be described. As illustrated in FIG. 37, bending portions between the upper frame 22 and the side frames 23 in the seat back frame 21 are each a corner or curved portion 21a which is obtained by curving or bending a tube frame. The connecting portion between each side bracket 24 and the lower cross member 26 is a corner portion 21b which is created when the lower cross member 26 is installed between the side brackets 24. Also, the connecting portion between each side frame 23 and the upper cross member 25 is a corner portion 21c which is created when the upper cross member 25 is installed between the side frames 23.

As illustrated in FIG. 38, two inflators 29 are mounted in the upper portion and the lower portion of the seat back frame 21, respectively. The inflator 29 mounted in the upper portion of the seat back frame 21 has one end 101a and the other end 101b, the one end 101a being fixed to the upper cross member 25 in the vicinity of one corner portion 21c, the other end 101b being fixed to a linear portion 101c of a bracket 101 which is secured to the side frame 23 in the vicinity of the corner portion 21c.

Similarly, the inflator 29 mounted in the lower portion of the seat back frame 21 has one end 102a and the other end 102b, the one end 102a being fixed to the lower cross member 26 in the vicinity of one corner portion 21b, the other end 102b being fixed to a linear portion 102c of a bracket 102 which is secured to the side bracket 24 in the vicinity of the corner portion 21b.

Thus, both inflators 29 are respectively provided in the corner portions 21c, 21b which are on the diagonal of a rectangular shape including the upper cross member 25, the side frames 23, the side brackets 24, and the lower cross member 26.

In a vehicle having the front seat 10 according to the present implementation having the above configuration, each inflator 29 is ignited by an operation of a collision detection unit or collision information predicted by a collision prediction unit, and expanded gas from the inflator 29 thereby causes the airbag 30 to instantly inflate and develop between the elastic installation supporting members 27 and the rear surface of the seat back 20 as illustrated in FIG. 39.

In this process, the front of the airbag 30 is covered with flexible materials such as the elastic installation supporting member 27, the seat pad 28, and the outer layer 31, and thus due to the inflation and development of the airbag 30, these flexible materials exhibit slight deformation in the forward direction of the vehicle body in FIG. 39, whereas the outer layer 31, which covers the rear of the airbag 30 as a flexible material, exhibits significantly protruding deformation in the rearward direction of the vehicle body.

In this process, the above-mentioned deformation behavior of the flexible members and flexible materials in front and in rear of the airbag 30 allows the volume E of development of the airbag 30 in the fore-and-aft direction of the vehicle body to be ensured, and also allows the energy absorbing stroke of the seat back 20 in the fore-and-aft direction of the vehicle body to be sufficiently ensured.

That is, as illustrated in FIG. 32, rearward movement, due to an impact of a rear-end collision, of the upper body Pb of the seated person Pf on the front seat 10 is elastically received by the outer layer 31 at the front of the seat back 20, the seat pad 28, the elastic installation supporting members 27, and the inflated and developed airbag 30, and thus the upper body of the seated person Pf on the front seat 10 is protected against the impact to be received when being pressed against the seat back 20 of the seat due to a rear-end collision.

On the other hand, due to an impact of a rear-end collision, the person Pr on the rear seat 60 is pressed against the rear seat, and is moved forward by subsequent rebound. Due to the rebound, the knees Pn of the rear seat person Pr moving forward is elastically received by the outer layer 31 on the rear of the seat back 20 and the airbag 30, and thus the upper body Pb of the seated person Pf on the front seat 10 is protected against the collision impact of the knees Pn of the rear seat person Pr.

In this process, the airbag 30 is controlled by the internal geometry within the seat back 20 located immediately rearward of the upper body Pb of the seated person Pf on the front seat 10, and is caused to stably inflate and develop. Consequently, rearward movement of the upper body Pb may be reliably received, and the impact due to forward movement of the knees Pn of the rear seat person Pr may be reliably absorbed, and thus proper protection for the seated person Pf may be achieved.

In addition, such protection of the seated person Pf is achieved by the airbag 30 that inflates and develops within the seat back 20 and disposition of the flexible materials in front and in rear of the airbag 30 (that is, the outer layer 31, the seat pad 28, and the elastic installation supporting members 27), and thus the configuration is significantly simplified.

In addition, because the inflators 29 are mounted in the corner portions 21c and 21b of the seat back frame 21 in a substantially frame shape, inflation and development of the airbag 30 is not prevented by the inflators 29, and the torsion rigidity of the corner portions 21c and 21b, which are likely to receive a stress at the time of a vehicle collision, is reinforced by the inflators 29.

Furthermore, the inflators 29 are bridged between both side positions (that is, between a position of the upper cross member 25 and a position of the side frame 23, and a position of the lower cross member 26 and a position of the side bracket 24) of the seat back frame 21 via the brackets 101 and 102 across the corner portions 21c and 21b, and thus a reactive force to the jet of gas from each inflator 29 may be effectively distributed from both side positions of the seat back frame 21 to the entire seat back frame 21.

Also, each inflator 29 is located at a corner of the rectangular shape including the upper cross member 25, the side frames 23, the side brackets 24, and the lower cross member 26, and so even when the seat back 20 is equipped with a side air bag or an active headrest mechanism, the inflators 29 may be disposed at positions that do not interfere with the side air bag or the active headrest mechanism.

Furthermore, with this configuration, the inflators 29 disposed in the upper portion and the lower portion of the seat back frame 21 may be operated with a time lag. By operating of the inflators 29 with a time lag, the airbag 30 may be caused to inflate and develop at a slower speed compared with the case where the inflators 29 are operated simultaneously or the case where an inflator with a single step is operated. Thus, load to a passenger due to development of the airbag may be reduced.

Moreover, the inflation and development state of the airbag may be continued longer compared with the case where the inflators are operated simultaneously or the case where an inflator with a single step is operated. Thus energy absorbing effect of the airbag may last for a longer time.

Tenth Implementation

Next, a tenth implementation will be described with reference to FIGS. 40 and 41. In the ninth implementation, the case has been described where two inflators are used and an airbag is caused to inflate and develop. However, in the tenth seventh implementation, the case will be described where four inflators are used and four airbags are caused to inflate and develop.

Figure 40:
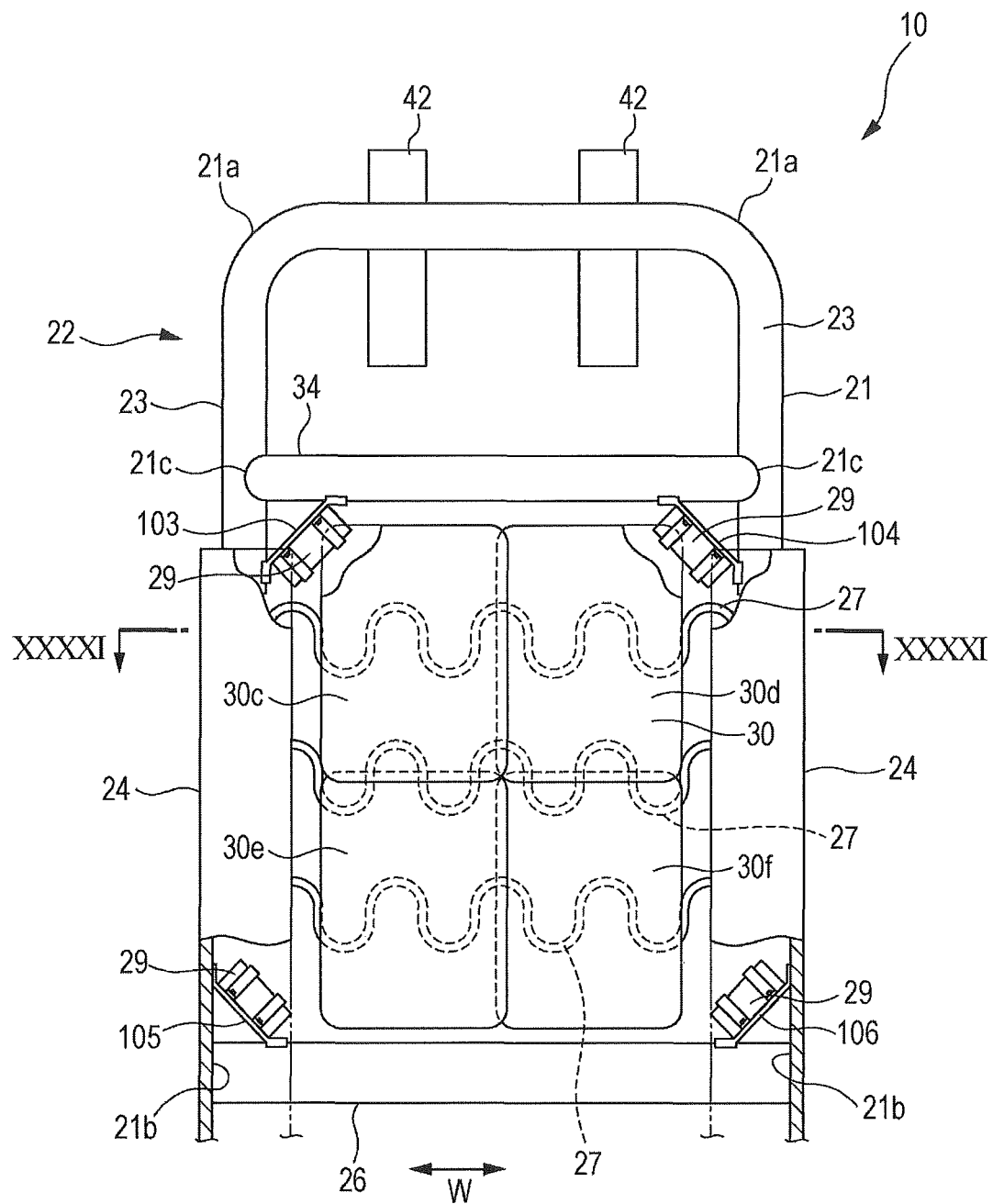
FIG. 40 is a schematic perspective view with partial cutaway of a vehicle seat as seen from the rear according to a tenth implementation.
Figure 41:
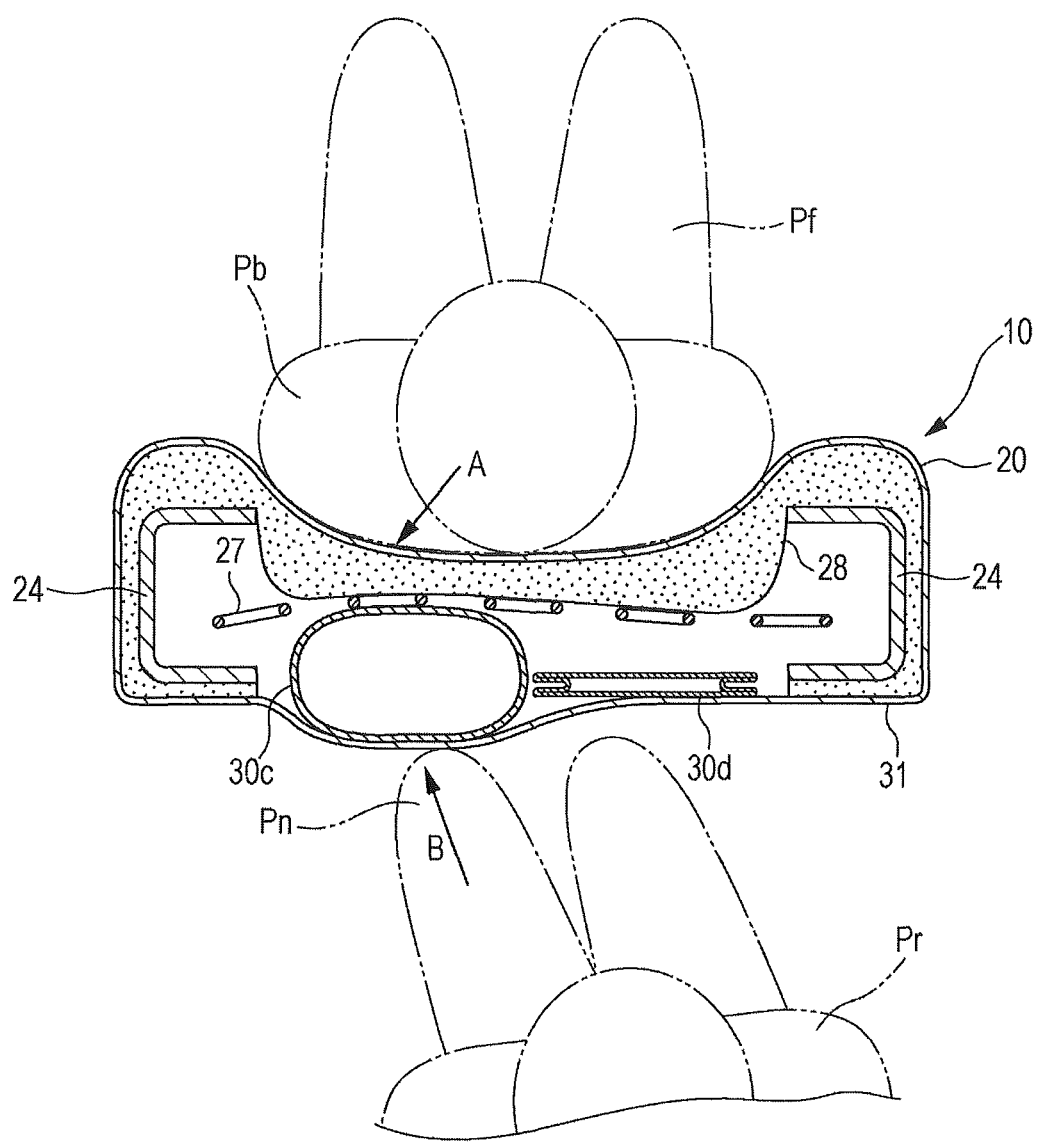
FIG. 41 is a schematic cross-sectional view of an operation state of the vehicle seat at the time of an offset collision, the cross-sectional view corresponding to a cross-section along line XXXXI-XXXXI in FIG. 40.

FIG. 40 is a schematic perspective view with partial cutaway of the front seat 10 as seen from the rear; and FIG. 41 is a schematic cross-sectional view of the operation state of the front seat 10 at the time of an offset collision, the cross-sectional view corresponding to a cross-section along line XXXXI-XXXXI in FIG. 40.

As illustrated in FIG. 40, in the front seat 10, the entire configuration of the seat back 20 is the same as that of the ninth implementation except for the configuration of the inflators and air bags, and thus detailed description is omitted.

As illustrated in FIG. 40, the inflators 29 are in all the respective corners (that is, the corner portions 21c and 21b at four corners) of the rectangular shape including the upper cross member 25, the side frames 23, the side brackets 24, and the lower cross member 26 via brackets 103, 104, 105, and 106. These brackets have the same configuration as that of the brackets 101 and 102 according to the ninth implementation.

Four airbags 30 (hereinafter denoted as airbags 30c, 30d, 30e, and 30f) are disposed which are obtained by dividing a rectangular shape into four equal rectangular-shaped parts by the midpoints of the frames and the cross members in a rear view, the rectangular shape including the upper cross member 25, the side frames 23, the side brackets 24, and the lower cross member 26 within the substantially rectangular frame-shaped seat back frame 21. Each airbag is inflatably and developably retained, for example, on the outer layer 31 by a retaining unit (not illustrated).

The airbags 30c, 30d, 30e, and 30f are connected to the respective inflators 29 located at four corners of the above-mentioned rectangular shape in the seat back frame 21 via respective gas suction inlets (not illustrated), and are disposed so as to be partially overlapped with each other to some extent to prevent a space between airbags 30 when all the airbags 30 inflate and develop.

The front seat 10 allows, for example, the above-mentioned collision detection unit (not illustrated) or collision prediction unit to detect collision information, and according to the information, causes a control unit (not illustrated) to control a inflator 29 to be ignited, and appropriate airbag(s) out of four airbags are selectively caused to inflate and develop at the time of a collision. If some of the airbags 30 have a higher load, the load may be reliably absorbed. This is effective for example when an offset collision occurs.

As a specific example, the case will be described where a vehicle experiences a rear-end collision from the rear left. First, when a vehicle experiences a rear-end collision from the rear left, the vehicle exhibits yawing to the forward right, and the upper body Pb of the seated person Pf on the front seat 10 is pressed against the seat back 20 to the rear left. Similarly, the upper body of the seated person Pr on the rear seat is pressed against to the rear left, then the knees are thrown to the forward left by subsequent rebound.

In this process, the collision detection unit (not illustrated) or the collision prediction unit recognizes a rear-end collision from the rear left, and the inflators 29 to be ignited are limited to the two inflators 29 located inwardly along the vehicle width in the seat back 20 by a control unit (not illustrated) based on recognized collision information. As illustrated in FIG. 41, two airbags 30c and 30d are caused to inflate and develop, thereby making it possible to reliably receive movement of the upper body Pb of the seated person Pf to the rear left (that is, in the direction of arrow A) and movement of the knees Pn of the seated person Pr to the forward left (that is, in the direction of arrow B).

Therefore, with the front seat 10 according to the present implementation, it is possible to individually control multiple airbags 30 in conjunction with a collision, and only necessary airbags 30 are selectively caused to inflate and develop according to the type of a collision as described above, and thus an impact may be absorbed accurately.

Furthermore, a truss structure may be constructed in which each of the inflators 29 is bridged over a corresponding one of the four corners of the rectangular shape of the seat back frame 21, and thus the inflation and development of each airbag 30 is not prevented by the structure and the rigidity of the seat back frame 21 is reinforced.

The four airbags 30 disposed within a substantially rectangular shape of the seat back frame 21 are each caused to inflate and develop by an individual inflator 29, and thus a larger reactive force of the airbag may be ensured compared with the case where the volume corresponding to the combined volume of the four airbags 30*c* to 30*f* is caused to inflate and develop with an inflator 29.

It is to be noted that the present disclosure is not limited to the above-described implementations, and various modifications may be made without departing from the scope of the present disclosure. For example, the first implementation adopts a configuration in which the inflator 30 is mounted on the side bracket 24 outwardly in the vehicle body width. However, it is also possible to mount the inflators 30 both on the side bracket 24 outwardly in the vehicle body width and on the side bracket 24 inwardly in the vehicle body width. With this configuration, operating the inflators 29 with a time lag makes it possible to change the duration of inflation and development and the amount of inflation and development of each airbag.

Furthermore, in each implementation, the vehicle has the front seat 10 and the rear seat 60 that are arranged side by side. However, the rear seat 60 is not a required component. For example, the rear of the front seat 10 may serve as a loading bed. Also in this case, it is possible to protect a seated person on the vehicle seat 10 against an impact by the inflation and development of the airbag 30, the impact being generated by a loaded object on the loading bed, which is moved forward due to a vehicle collision to collide with the rear of the seat back 30.

In the eighth implementation, a configuration has been illustrated in which the inflator 29 is mounted to the upper cross member 25. However, the inflator 29 may be disposed at a location outwardly in the vehicle width direction of the positions in the upper frame 22, at which the cylindrical stay brackets 42 are formed, the location being outward of the seat back frame 21. With this configuration, interference between the airbag 30 which inflates and develops and each inflator is completely avoidable, and thus stable development of the airbag 30 is ensured.

When an inflator is mounted in the upper portion of the seat back frame 21, it is also optional to use an inflator which causes an airbag for active headrest to inflate and develop.

In the ninth implementation, the inflator 29 is mounted in the corner portions 21*c* or 21*b*. However, without being limited to these portions, the inflator 29 may be mounted to one of the corner or curved portions 21*a* between the upper frame 22 and the side frames 23, the corner or curved portions 21*a* being obtained by curving or bending a tube frame.

What is claimed is:

1. A vehicle seat airbag system, comprising:
    an airbag which is caused by a vehicle seat airbag system to inflate and develop within a seat back,
    wherein the airbag is disposed between a seat pad and a rear board provided in a rear of the seat back,
    wherein inflatable and developable airbag is supported by the rear board from a rear part side, and inflates and develops two-dimensionally within a rear board range such that a uniform pressure is applied for an upper body of a seated person on a front seat, and
    wherein inflation and development of the airbag in the seat back is configured to allow the airbag to elastically support the upper body of the seated person on the front seat, and causes the rear board to be pushed rearwardly to allow the airbag to elastically receive an impact force which is applied to the rear board.

2. The vehicle seat airbag system according to claim 1, wherein the rear board is supported on the rear of the seat back swingably in a direction away from the rear of the seat back.

3. The vehicle seat airbag system according td claim 1, wherein the rear board is removed from the rear of the seat back by pushing.

4. The vehicle seat airbag system according claim 1, wherein the rear board is removably fixed to the rear of the seat back and includes:
    a collision prediction unit that predicts a collision to a vehicle; and
    a fixing release mechanism that releases fixing based on information of collision occurrence which is predicted by the collision prediction unit.

5. The vehicle seat airbag system according to claim 1, wherein an outer layer is interposed between the airbag and the rear board, the outer layer being caused by the inflated and developed airbag to expand rearwardly, and the outer layer being provided with the rear board.

6. The vehicle seat airbag system according to claim 1, wherein the rear board includes a fragile part.

7. The vehicle seat airbag system according to claim 1, further comprising:
    a control unit that controls the inflation and development of the airbag; and
    a collision detection unit that detects a collision to a vehicle,
    wherein the control unit causes the airbag to inflate and develop after a predetermined time delay since the collision detection unit detects a collision.

8. The vehicle seat airbag system according to claim 1, further comprising:
    a control unit that controls the inflation and development of the airbag; and
    a collision prediction unit that predicts a collision to a vehicle,
    wherein the control unit starts to cause the airbag to inflate and develop at a time which is determined based on a time of collision occurrence predicted by the collision prediction unit.

9. The vehicle seat airbag system according to claim 1, wherein the airbag inflates and develops in multiple steps within the seat back.

10. The vehicle seat airbag system according to claim 1, wherein, after the airbag is inflated, a bottom portion of the rear board departs from a lower portion of the seat back in a direction away from the rear of the seat back.

11. The vehicle seat airbag system according to claim 1, wherein, after the airbag is inflated, a bottom portion of the rear board completely spaces apart from a lower portion of the seat back in a direction away from the rear of the seat back.

12. The vehicle seat airbag system according to claim 1, wherein, after the airbag is inflated, an upper portion of the rear board remains attached to the rear of the seat back.

13. The vehicle seat airbag system according to claim 1, wherein, after the airbag is inflated, an upper portion of the rear board rotates away from an upper portion of the rear of the seat back, while the upper portion of the seat pad remains attached to the rear of the seat back.

14. The vehicle seat airbag system according to claim 1, wherein, after the airbag is inflated, an uppermost portion of the rear board remains attached to the rear of the seat back.

15. The vehicle seat airbag system according to claim 1, wherein the rear board is arranged such that, after the airbag is inflated, at least a bottom portion of the rear board detaches from the rear of the seat back.

* * * * *